(12) United States Patent
Nagasaka et al.

(10) Patent No.: US 11,733,113 B2
(45) Date of Patent: Aug. 22, 2023

(54) STRAIN ELEMENT, STRAIN ELEMENT MANUFACTURING METHOD, AND PHYSICAL QUANTITY MEASURING SENSOR

(71) Applicant: SINTOKOGIO, LTD., Nagoya (JP)

(72) Inventors: Masahiko Nagasaka, Aichi (JP); Hiroyasu Makino, Aichi (JP)

(73) Assignee: SINTOKOGIO, LTD., Aichi (JP)

(*) Notice: Subject to any disclaimer, the term of this patent is extended or adjusted under 35 U.S.C. 154(b) by 353 days.

(21) Appl. No.: 17/052,922

(22) PCT Filed: Jun. 3, 2019

(86) PCT No.: PCT/JP2019/021940
§ 371 (c)(1),
(2) Date: Nov. 4, 2020

(87) PCT Pub. No.: WO2019/239938
PCT Pub. Date: Dec. 19, 2019

(65) Prior Publication Data
US 2021/0231514 A1    Jul. 29, 2021

(30) Foreign Application Priority Data
Jun. 14, 2018   (JP) ................................ 2018-113889

(51) Int. Cl.
*G01L 5/00* (2006.01)
*G01L 5/1627* (2020.01)
(Continued)

(52) U.S. Cl.
CPC .......... *G01L 5/1627* (2020.01); *G01L 1/2287* (2013.01); *B24C 1/10* (2013.01)

(58) Field of Classification Search
CPC ........ G01L 5/1627; G01L 1/2287; B24C 1/10
See application file for complete search history.

(56) References Cited

U.S. PATENT DOCUMENTS 4,197,360 A * 4/1980 Throop .................. B32B 15/017
                                                    428/654
4,640,138 A * 2/1987 Meyer ................... G01L 5/1627
                                                    73/862.045
(Continued)

FOREIGN PATENT DOCUMENTS

CN      101821059 A    9/2010
CN      102636301 A    8/2012
(Continued)

OTHER PUBLICATIONS

"Manufacture craft and its mechanism analysis about strain load cell," Science—Technology & Application vol. 36, No. 2, 2007.
(Continued)

*Primary Examiner* — Max H Noori
(74) *Attorney, Agent, or Firm* — Harness, Dickey & Pierce, P.L.C.

(57) ABSTRACT

A strain element (10), which is configured such that a frame portion (11) and a central portion (12) are connected by arm portions (20) to (22), is masked except for the arm portions (20) to (22) where a strain gauge (A1) and the like are to be disposed, and then peening is carried out. With this, a compressive residual stress layer is formed on four sides of each of the arm portions (20) to (22). When the strain element (10) receives a load resulting from an external force, the arm portions (20) to (22) elastically deform; however, due to the compressive residual stress layer thus formed, the arm portions (20) to (22) are less prone to fatigue failure. When projection of a shot material is carried out as peening, the surface roughness of the arm portions (20) to (22) increases, the adhesion of strain gauges improves, detection accuracy improves, and stable measurement can be ensured.

9 Claims, 32 Drawing Sheets

(51) Int. Cl.
*G01L 1/22* (2006.01)
*B24C 1/10* (2006.01)

(56) References Cited

U.S. PATENT DOCUMENTS

| | | | | |
|---|---|---|---|---|
| 6,050,138 | A * | 4/2000 | Lynch | G01N 3/10 |
| | | | | 73/827 |
| 7,636,151 | B2 * | 12/2009 | Kothari | G01L 5/0047 |
| | | | | 356/519 |
| 11,527,629 | B2 * | 12/2022 | Nogami | H01L 23/3171 |
| 2002/0180605 | A1 * | 12/2002 | Ozguz | H01L 21/6836 |
| | | | | 600/509 |
| 2007/0177129 | A1 * | 8/2007 | Kothari | G02B 26/001 |
| | | | | 359/291 |
| 2007/0190680 | A1 * | 8/2007 | Fukuda | B81B 3/0072 |
| | | | | 438/50 |
| 2008/0264175 | A1 | 10/2008 | Leman et al. | |
| 2009/0001974 | A1 | 1/2009 | Sheiretov et al. | |
| 2010/0300168 | A1 | 12/2010 | Ishikura et al. | |
| 2011/0085768 | A1 * | 4/2011 | Nakanishi | C03B 37/02727 |
| | | | | 264/1.27 |
| 2011/0226066 | A1 * | 9/2011 | Anand | G01B 7/18 |
| | | | | 252/502 |
| 2011/0314935 | A1 * | 12/2011 | Krippner | G01L 3/1457 |
| | | | | 29/890.07 |
| 2015/0135856 | A1 * | 5/2015 | Kim | G01L 1/22 |
| | | | | 73/862.045 |
| 2015/0377721 | A1 | 12/2015 | Sato | |
| 2017/0069579 | A1 * | 3/2017 | Kim | H01L 23/562 |
| 2018/0019726 | A1 * | 1/2018 | Han | H03H 9/172 |
| 2018/0148820 | A1 | 5/2018 | Komaki et al. | |
| 2018/0217016 | A1 | 8/2018 | Inamori et al. | |
| 2018/0315962 | A1 * | 11/2018 | Walker | H01L 51/56 |
| 2019/0177828 | A1 * | 6/2019 | Shi | C23C 4/134 |

FOREIGN PATENT DOCUMENTS

| | | |
|---|---|---|
| CN | 103076122 A | 5/2013 |
| CN | 103374719 A | 10/2013 |
| CN | 103439036 A | 12/2013 |
| CN | 104919291 A | 9/2015 |
| CN | 107860507 A | 3/2018 |
| DE | 10121845 A1 | 11/2002 |
| JP | 57-171470 | 10/1982 |
| JP | H57171470 A | 10/1982 |
| JP | 62-274230 | 11/1987 |
| JP | H62274230 A | 11/1987 |
| JP | 01-213532 | 8/1989 |
| JP | H1213532 A | 8/1989 |
| JP | 01-223321 | 9/1989 |
| JP | H1223321 A | 9/1989 |
| JP | 01-262430 | 10/1989 |
| JP | H1262430 A | 10/1989 |
| JP | 06-180257 | 6/1994 |
| JP | H6180257 A | 6/1994 |
| JP | 07-128167 | 5/1995 |
| JP | H7128167 A | 5/1995 |
| JP | 10/339676 | 12/1998 |
| JP | 2004/045048 A | 2/2004 |
| JP | 200445044 A | 2/2004 |
| JP | 2011209178 A | 10/2011 |
| JP | 2013/019727 A | 1/2013 |
| JP | 201670673 A | 5/2016 |
| JP | 2017-146163 A | 8/2017 |
| WO | WO-9927338 A1 | 6/1999 |
| WO | WO-2015/143281 A1 | 9/2015 |
| WO | WO-2015/143281 A1 | 9/2015 |
| WO | WO-2017/057459 A1 | 9/2016 |

OTHER PUBLICATIONS

Xiao-wei et al., The Study on Surface Integrity and Its Measurement Methods,,Journal of Qilu University of Technology vol. 30 No. 2 Apr. 2016.
The Study on Surface Integrity and Its Measurement Methods, Science—Technology & Application vol. 36, No. 2, 2007.
H. Iwasaki, M. Tsumura, "The principle and application of six-axis Force/Torque sensor", Automatic Control Joint Lecture Meeting, 49th, held under the sponsorship of The Institute of Systems, Control and Information Engineers and others, Nov. 25 and 26, 2006.
International Preliminary Report on Patentability dated Dec. 15, 2020.
International Search Report dated Feb. 7, 2019.
Wang Haijun, "Roughening treatment on the substrate", Guide for thermal spraying engineers(Aug. 31, 2018).
Chinese Office Action and English translation thereof dated Jan. 12, 2022.
International Search Report PCT/ISA/210 for International Application No. PCT/JP2019/021940 dated Jul. 2, 2019.

* cited by examiner

FIG. 11

(a) BRIDGE CIRCUIT I

| | A1 | A1' | A2 | A2' | CH-I |
|---|---|---|---|---|---|
| Fx | 0 | 0 | 0 | 0 | 0 |
| Fy | + | − | + | − | − |
| Fz | + | + | + | + | 0 |
| Mx | − | + | + | − | − |
| My | 0 | 0 | 0 | 0 | 0 |
| Mz | 0 | 0 | 0 | 0 | 0 |

41

(b) BRIDGE CIRCUIT II

| | B1 | B1' | B2 | B2' | CH-II |
|---|---|---|---|---|---|
| Fx | 0 | 0 | 0 | 0 | 0 |
| Fy | 0 | 0 | 0 | 0 | 0 |
| Fz | + | + | + | + | 0 |
| Mx | − | + | − | + | − |
| My | 0 | 0 | 0 | 0 | 0 |
| Mz | 0 | 0 | 0 | 0 | 0 |

42

(c) BRIDGE CIRCUIT III

| | C1 | C1' | C2 | C2' | CH-III |
|---|---|---|---|---|---|
| Fx | 0 | 0 | 0 | 0 | 0 |
| Fy | + | − | + | − | − |
| Fz | + | 0 | + | − | − |
| Mx | + | 0 | + | − | − |
| My | 0 | 0 | 0 | 0 | 0 |
| Mz | 0 | 0 | 0 | 0 | 0 |

43

(d) BRIDGE CIRCUIT IV

| | A3 | A3' | A4 | A4' | CH-IV |
|---|---|---|---|---|---|
| Fx | − | − | − | + | − |
| Fy | + | + | + | − | − |
| Fz | 0 | 0 | 0 | 0 | 0 |
| Mx | 0 | 0 | 0 | 0 | 0 |
| My | 0 | 0 | 0 | 0 | 0 |
| Mz | + | + | − | − | − |

44

(e) BRIDGE CIRCUIT V

| | B3 | B3' | B4 | B4' | CH-V |
|---|---|---|---|---|---|
| Fx | + | − | − | − | − |
| Fy | 0 | 0 | 0 | 0 | 0 |
| Fz | 0 | 0 | 0 | 0 | 0 |
| Mx | 0 | 0 | 0 | 0 | 0 |
| My | 0 | 0 | 0 | 0 | 0 |
| Mz | + | + | − | − | − |

45

(f) BRIDGE CIRCUIT VI

| | C3 | C3' | C4 | C4' | CH-VI |
|---|---|---|---|---|---|
| Fx | − | − | + | + | − |
| Fy | 0 | 0 | + | + | − |
| Fz | 0 | 0 | 0 | 0 | 0 |
| Mx | 0 | 0 | 0 | 0 | 0 |
| My | + | + | 0 | 0 | 0 |
| Mz | 0 | 0 | − | − | − |

46

HOW TO READ TABLES
CHANGE IN RESISTANCE OF STRAIN GAUGE: INCREASE <+>, DECREASE <−>, NO CHANGE <0>
CHANGE IN OUTPUT VOLTAGE CH: THERE IS UNBALANCED OUTPUT <1>, THERE IS NO UNBALANCED OUTPUT <0>

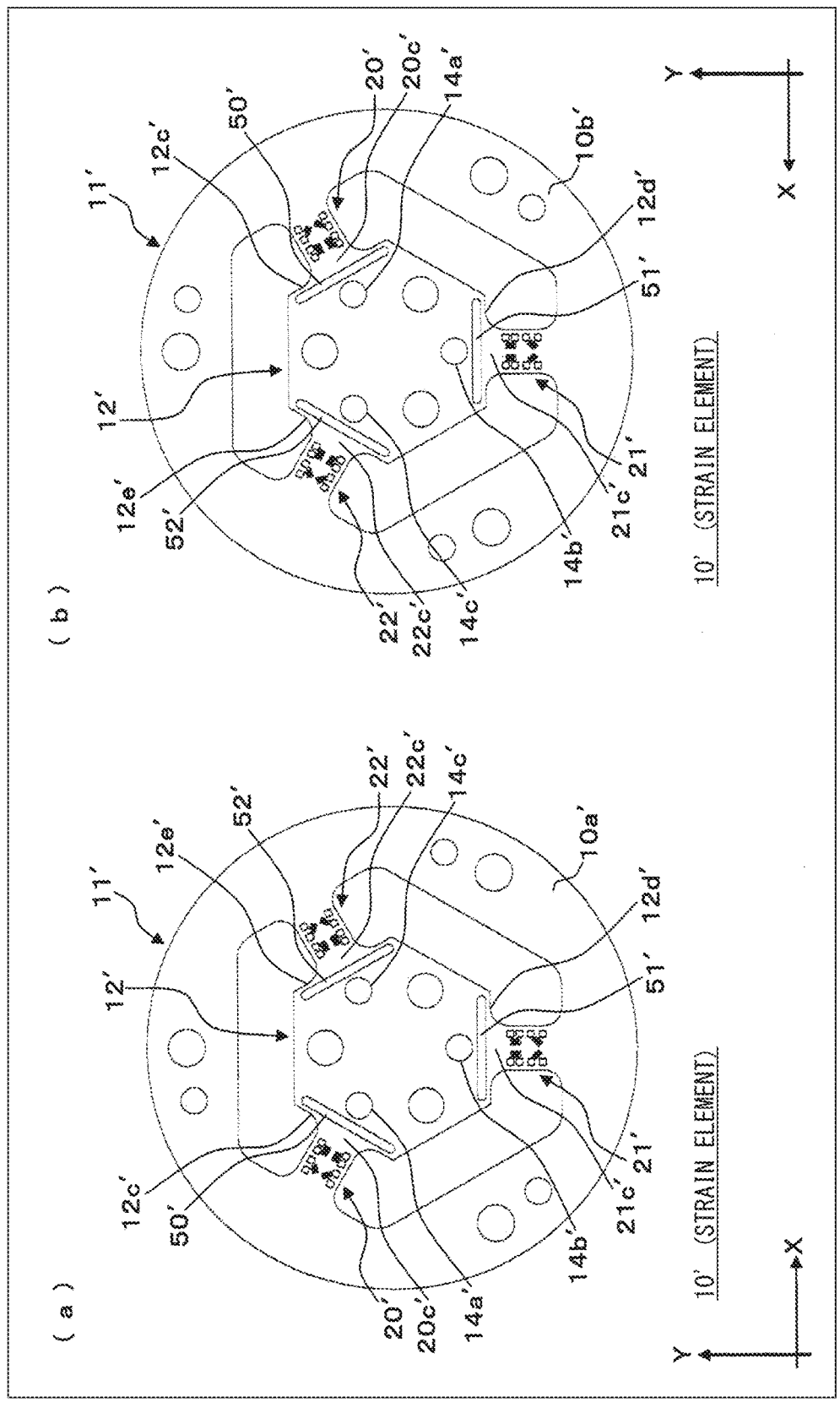

STRAIN ELEMENT, STRAIN ELEMENT MANUFACTURING METHOD, AND PHYSICAL QUANTITY MEASURING SENSOR

TECHNICAL FIELD

The present invention relates to a strain element and a physical quantity measurement sensor including the strain element. In particular, the present invention relates to a strain element, a method of producing a strain element, and a physical quantity measurement sensor in each of which the strain element has improved resistance to fatigue failure and ensures a long-term stable use.

BACKGROUND ART

There have conventionally been physical quantity measurement sensors such as a force sensor, a torque sensor, a load cell, and the like. A physical quantity measurement sensor detects, through use of a plurality of strain gauges, strain associated with elastic deformation caused by an external load (external force), and, from the results of the detection, measures the values of physical quantities regarding the external force, moment, and the like. Such a physical quantity measurement sensor generally includes a metal strain element that elastically deforms under an external force, and detects strain by disposing a plurality of strain gauges on this strain element. Note that specific examples of the physical quantity measurement sensor are disclosed in Patent Literatures 1 to 5 and Non-patent Literature 1 below.

CITATION LIST

Patent Literature

[Patent Literature 1]
Japanese Patent Application Publication Tokukai No. 2016-70673
[Patent Literature 2]
Japanese Patent Application Publication Tokukai No. 2011-209178
[Patent Literature 3]
Japanese Patent Application Publication Tokukaihei No. 1-262430
[Patent Literature 4]
Japanese Patent Application Publication Tokukai No. 2004-45044
[Patent Literature 5]
Japanese Patent Application Publication Tokukaihei No. 7-128167
[Non-Patent Literature 1]
H. Iwasaki, M. Tsumura, "The principle and application of six-axis Force/Torque sensor", Automatic Control Joint Lecture Meeting, 49th, held under the sponsorship of The Institute of Systems, Control and Information Engineers and others, Nov. 25 and 26, 2006

SUMMARY OF INVENTION

Technical Problem

A physical quantity measurement sensor is structured such that, as described earlier, a strain element elastically deforms under an external force; therefore, if the physical quantity measurement sensor is used over a long period of time, metal fatigue builds up in the elastically deformable area of the strain element. Therefore, there is a problem in that if the built-up metal fatigue passes a critical point, fatigue failure occurs in the strain element. Note that the strain element is produced generally by machining (for example, cutting). Depending on design specifications and the like, portions having a sharp shape and/or an acute angled corner shape may be generated. Such portions are likely to undergo stress concentration when receiving an external force, and, in such areas where stress concentrates, the risk of the foregoing fatigue failure is significant.

Furthermore, a strain gauge disposed on the strain element is, in some cases, bonded with an adhesive. In a case where the strain gauge is attached by bonding, depending on the degree of elastic deformation (e.g., compressive deformation or tensile deformation) of the strain element, the layer of the adhesive may not conform to the elastic deformation, and sliding may occur between the area where the strain gauge is attached and the strain gauge. If such sliding occurs, a problem arises in that strain associated with elastic deformation cannot be detected accurately by the strain gauge and that measurement accuracy decreases.

Moreover, a strain element employed in a force sensor disclosed in Patent Literature 1 includes a plurality of arm portions which connect a central portion with a frame portion. The strain element is configured such that elastic portions (flexures) are provided between the frame portion and the arm portions (see paragraphs 0019 and 0020 of Patent Literature 1), and that each of the arm portions has a plurality of strain gauges disposed thereon (see paragraphs 0024, 0025 and FIG. 1 and the like of Patent Literature 1). The manner in which the strain gauges are disposed, as shown in FIGS. 1 to 3 and FIGS. 7 to 10, 12 and 13 of Patent Literature 1, has a problem in that it is difficult to detect strain associated with deformation when an external force is exerted on the arm portions in specific directions. Specifically, there is a problem in accuracy of strain detection when an external force is exerted in directions Mz, Fx, and Fy shown in FIG. 11 of Patent Literature 1.

An aspect of the present invention was made in view of the above circumstances, and an object thereof is to provide a strain element, a method of producing a strain element, and a physical quantity measurement sensor in each of which the strain element has improved strength (resistance) to fatigue failure.

Another object of an aspect of the present invention is to provide a strain element, a method of producing a strain element, and a physical quantity measurement sensor in each of which, in a case where a strain gauge is bonded with an adhesive or the like, the strain gauge is good at conforming to elastic deformation of the strain element.

A further object of an aspect of the present invention is to provide a strain element, a method of producing a strain element, and a physical quantity measurement sensor in each of which, in a case where the strain element is configured such that a central portion and a frame portion are connected by arm portions and that elastic portions are provided between the frame portion and the arm portions, the accuracy of strain detection is ensured even if the arm portions receive an external force in directions such as the foregoing specific directions.

Solution to Problem

In order to attain the above object, an aspect of the present invention is directed to a strain element which is elastically deformable in response to a load and which is configured to have a strain gauge disposed thereon, the strain gauge being configured to detect strain associated with deformation, the strain element including a strain portion which corresponds to a region subject to strain and which includes an area for disposition of the strain gauge, the strain portion being provided with a residual stress layer having negative residual stress.

An aspect of the present invention is directed to a method of producing a strain element which is elastically deformable in response to a load and which is configured to have a strain gauge disposed thereon, the strain gauge being configured to detect strain associated with deformation, the method including the steps of: a) masking the strain element except for a strain portion which corresponds to a region subject to strain and which includes an area for disposition of the strain gauge; and b) projecting a shot material at the strain element which has been masked, the step b) including causing the shot material to collide with the strain portion and thereby producing the strain element in which the strain portion is provided with a residual stress layer having negative residual stress and in which the strain portion has a surface roughness rougher than a portion other than the strain portion.

Advantageous Effects of Invention

According to an aspect of the present invention, a residual stress layer having compressive residual stress is formed in a strain portion. It is therefore possible to improve the resistance to fatigue failure of a portion which elastically deforms and in which a strain gauge carries out detection. This makes it possible to achieve a long-term stable use of a physical quantity measurement sensor in which the strain element in accordance with an aspect of the present invention is employed.

According to an aspect of the present invention, a shot material is projected under the condition in which a strain element is masked except for the strain portion. Therefore, a residual stress layer can be formed in the strain portion which is left unmasked. Furthermore, it is also possible to increase the surface roughness of the strain portion. This makes it possible to efficiently produce a strain element which is highly resistant to fatigue failure and in which a strain gauge of a bonded type is better at conforming to deformation because of the anchor effect provided by an adhesive.

(a) to (f) of FIG. 11 are tables showing results of detection by respective bridge circuits included in the strain gauge circuit.

FIG. 12 illustrates a strain element in accordance with a variation of Embodiment 1. (a) of FIG. 12 is a front view, and (b) of FIG. 12 is a back view.

Figure 13:
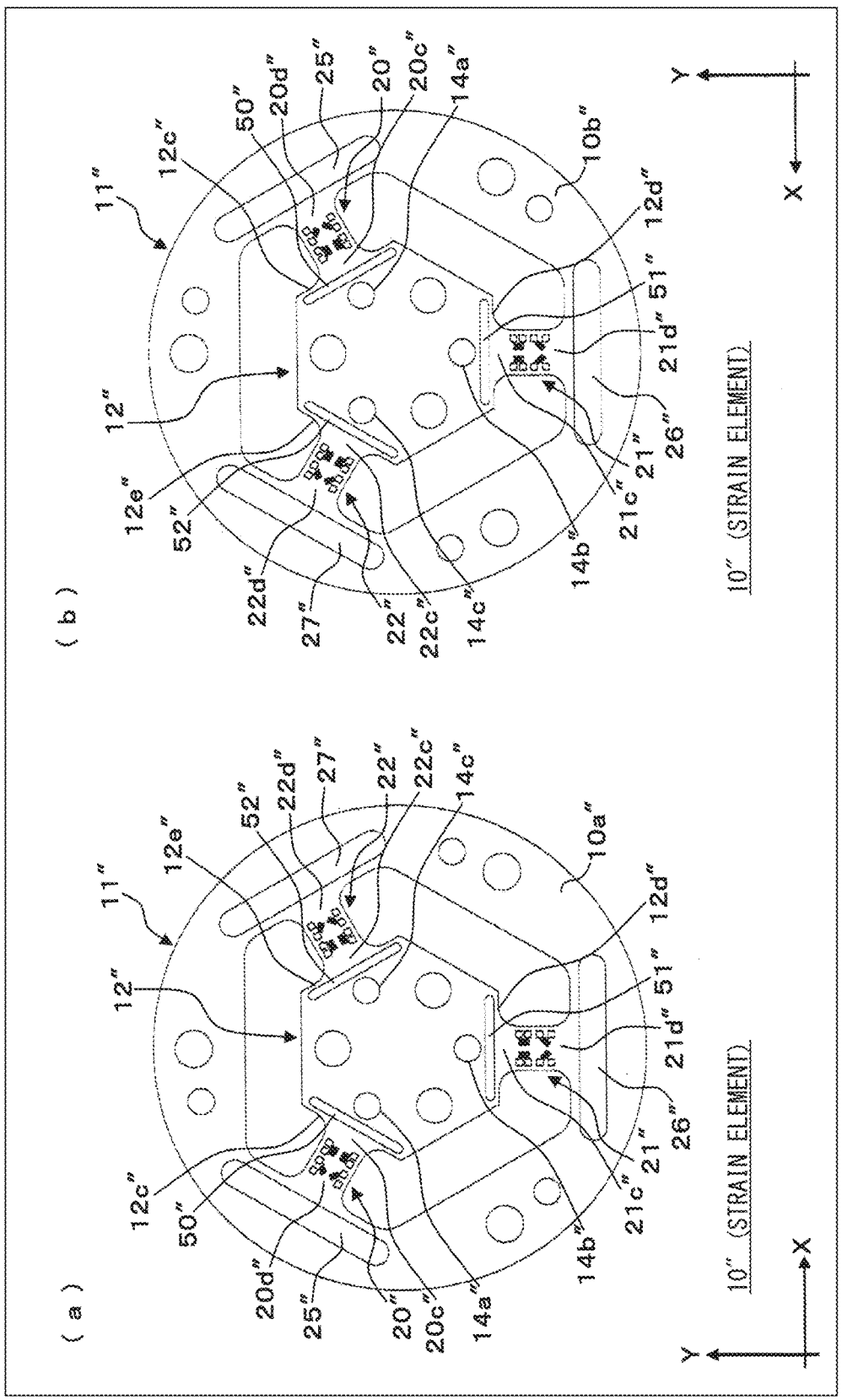

FIG. 13 illustrates a strain element in accordance with another variation of Embodiment 1. (a) of FIG. 13 is a front view, and (b) of FIG. 13 is a back view.

Figure 14:
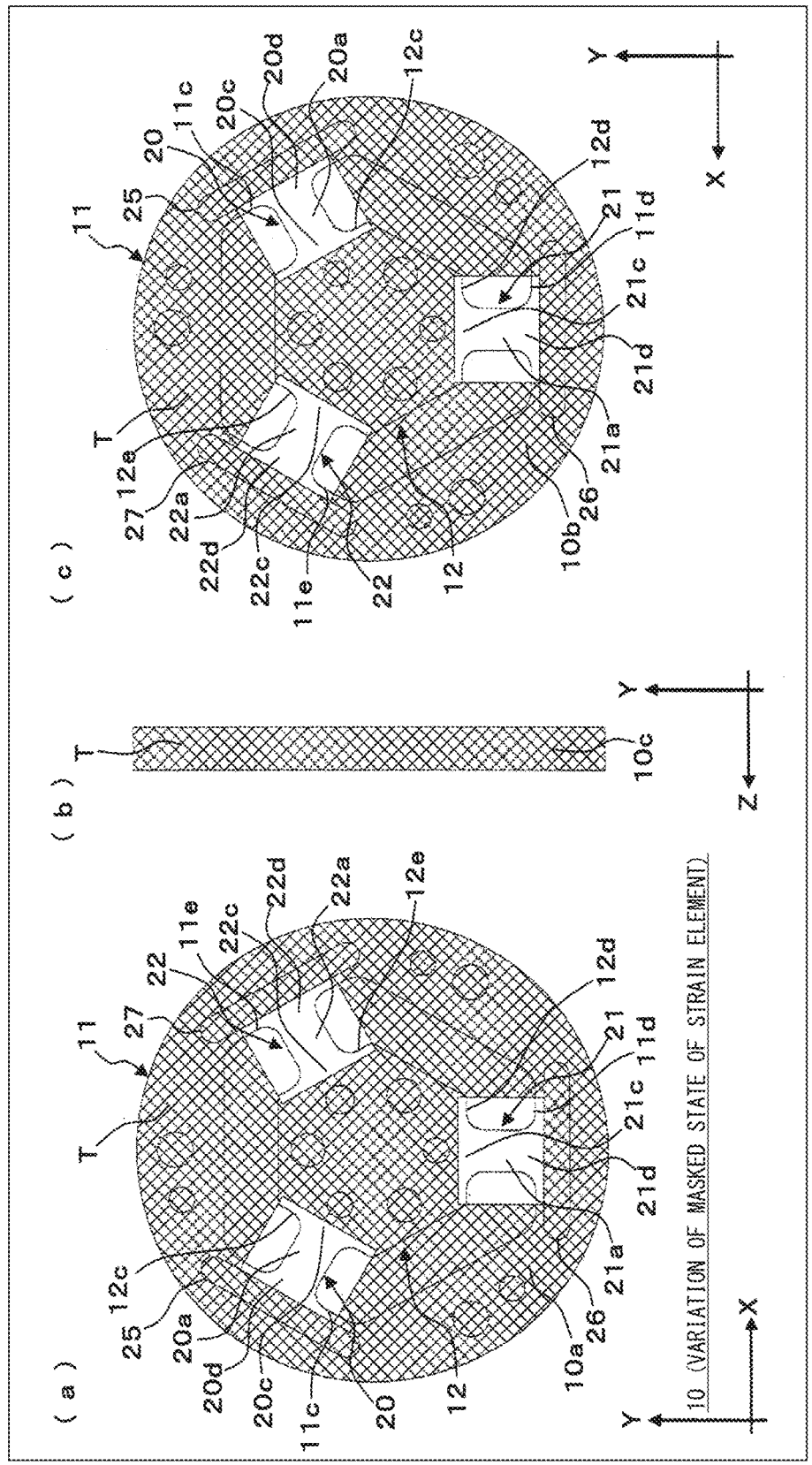

FIG. 14 illustrates a variation of masking of the strain element in accordance with Embodiment 1. (a) of FIG. 14 is a front view, (b) of FIG. 14 is a side view, and (c) of FIG. 14 is a back view.

Figure 15:
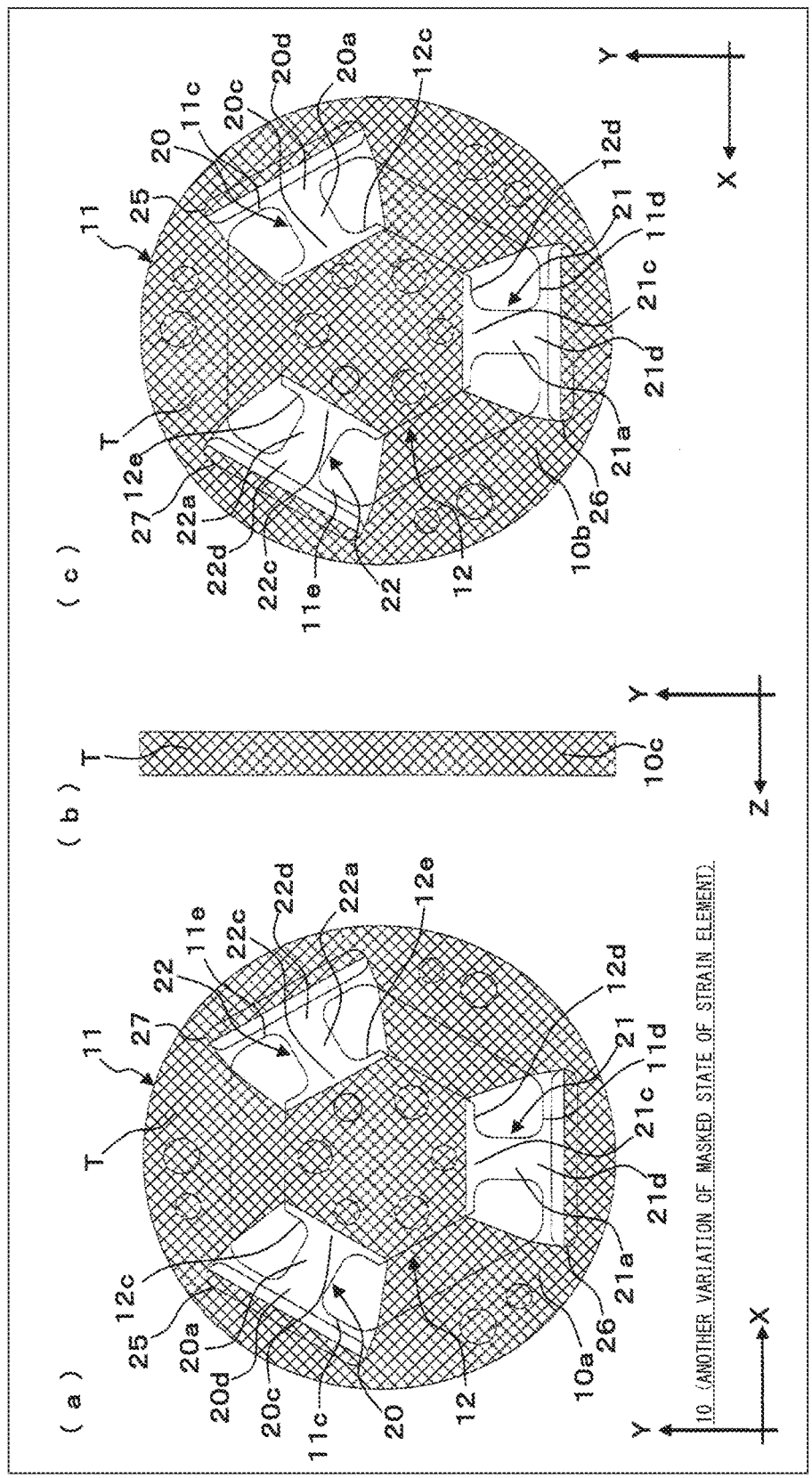

FIG. 15 illustrates another variation of masking of the strain element in accordance with Embodiment 1. (a) of FIG. 15 is a front view, (b) of FIG. 15 is a side view, and (c) of FIG. 15 is a back view.

Figure 16:
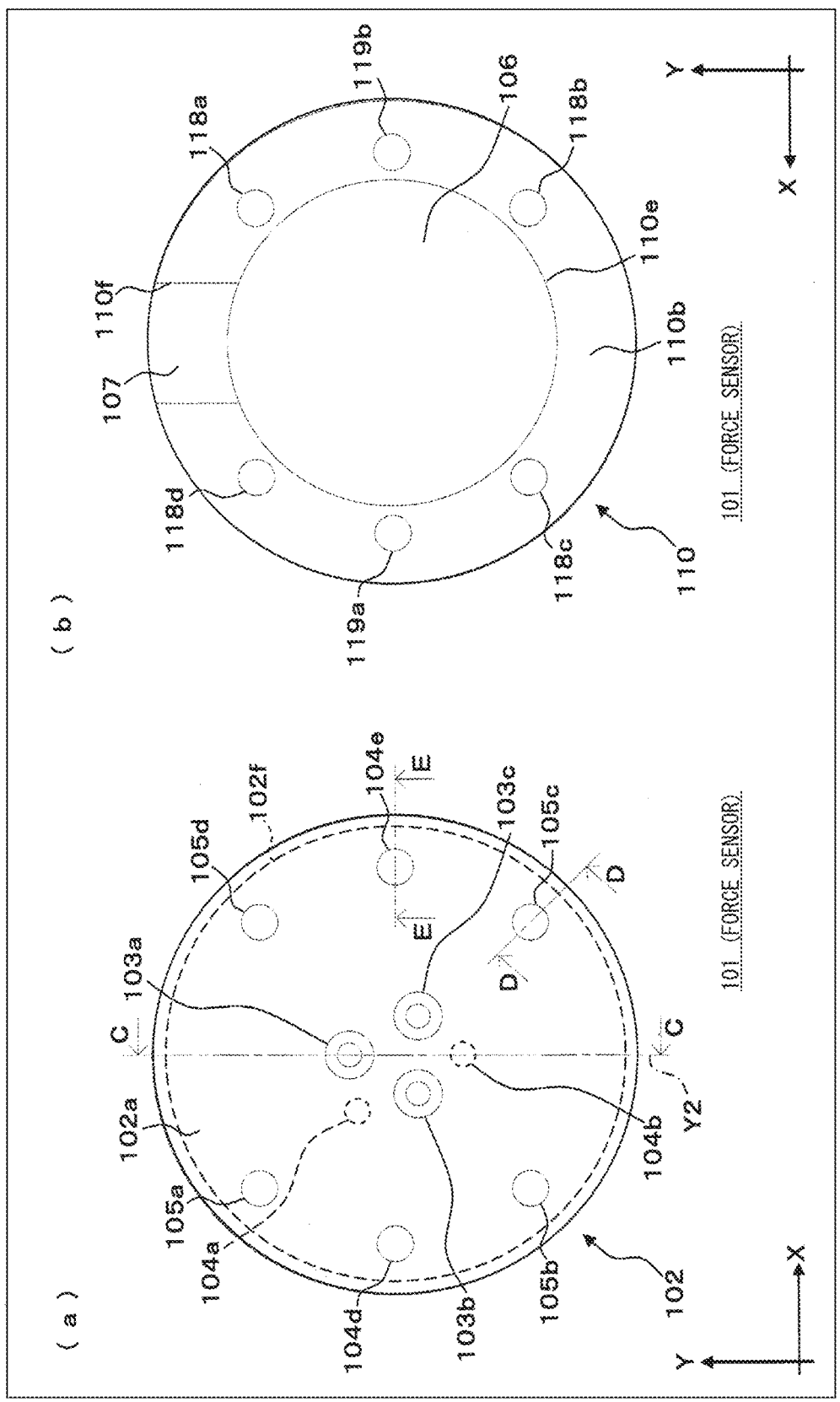

FIG. 16 illustrates a force sensor in accordance with Embodiment 2 of the present invention. (a) of FIG. 16 is a front view, (b) of FIG. 16 is a back view.

Figure 17:
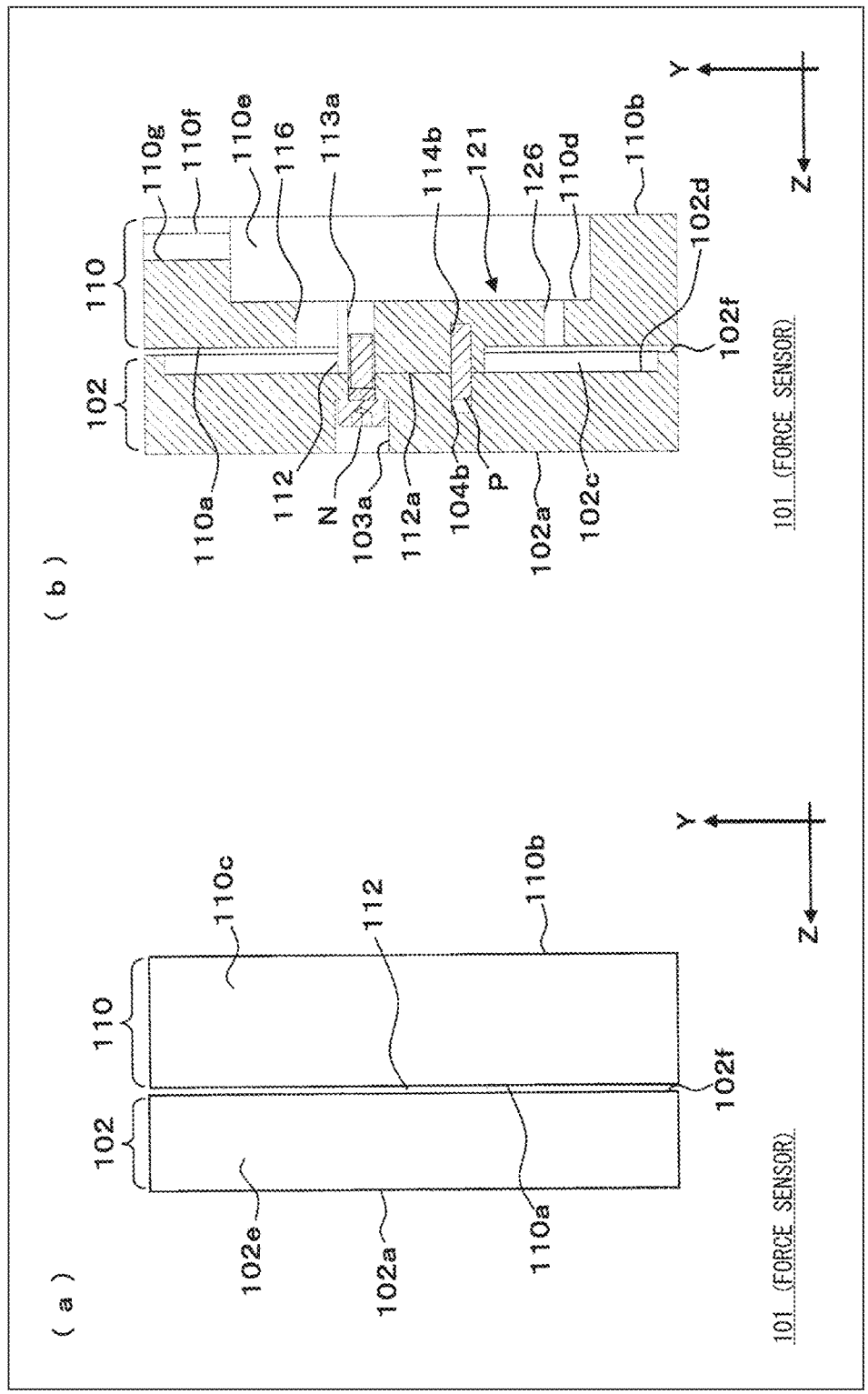

FIG. 17 illustrates the force sensor in accordance with Embodiment 2. (a) of FIG. 17 is a side view, and (b) of FIG. 17 is a cross-sectional view taken along line C-C in (a) of FIG. 16.

Figure 18:
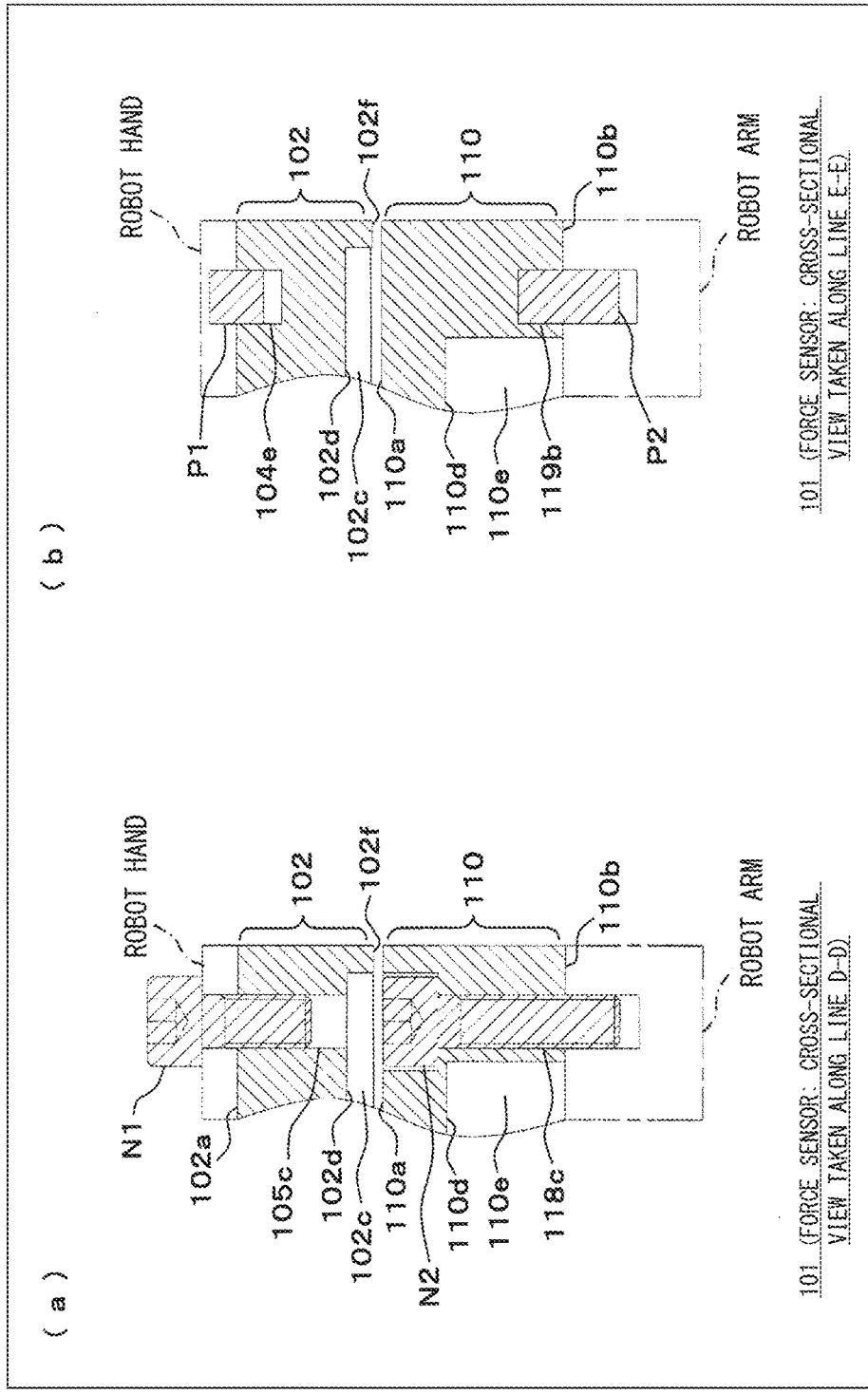

(a) of FIG. 18 is a cross-sectional view of the force sensor in accordance with Embodiment 2, taken along line D-D in (a) of FIG. 16. (b) of FIG. 18 is a cross-sectional view of the force sensor in accordance with Embodiment 2, taken along line E-E in (a) of FIG. 16.

Figure 19:
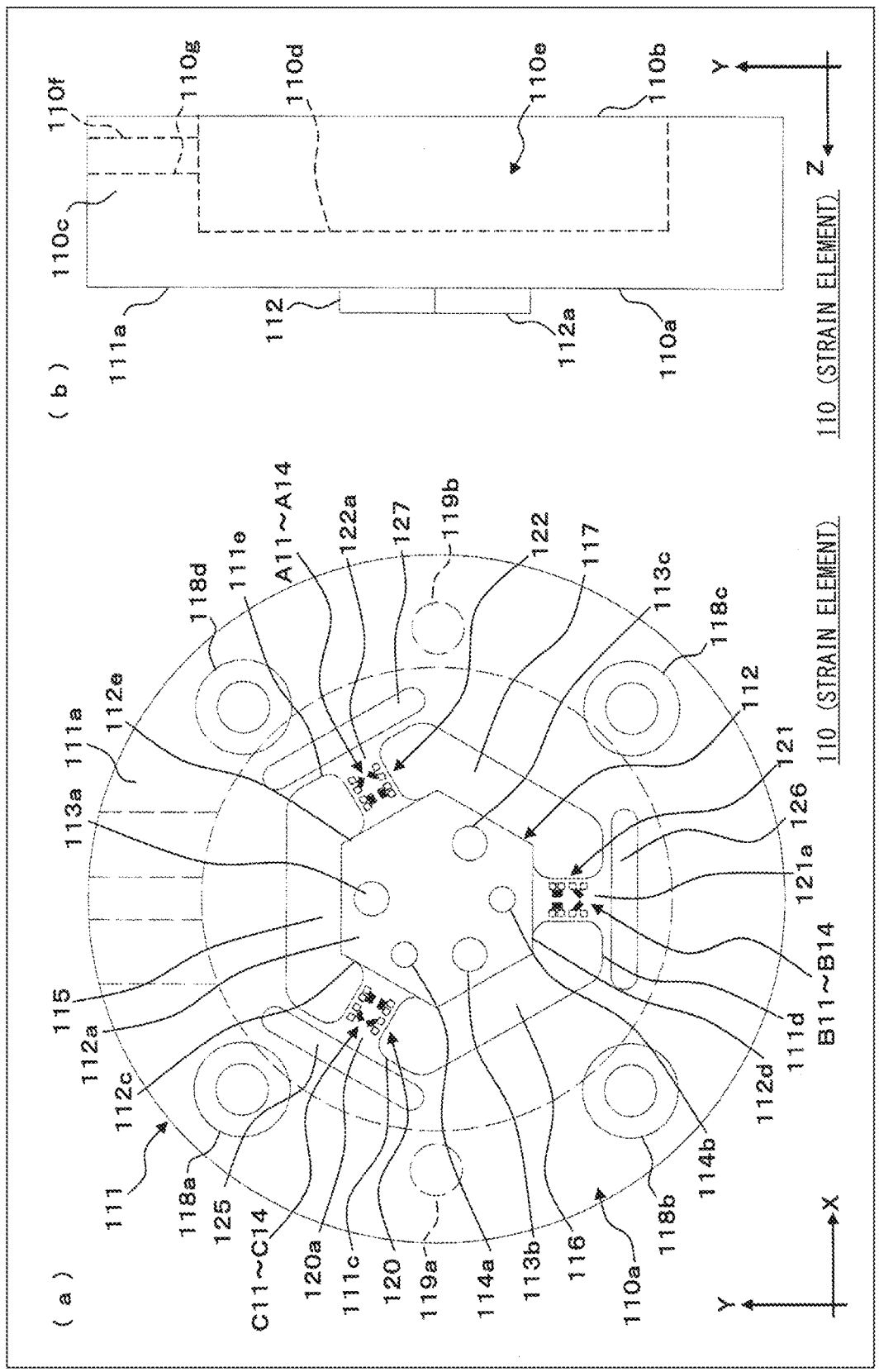

FIG. 19 illustrates a strain element in accordance with Embodiment 2. (a) of FIG. 19 is a front view, and (b) of FIG. 19 is a side view.

Figure 20:
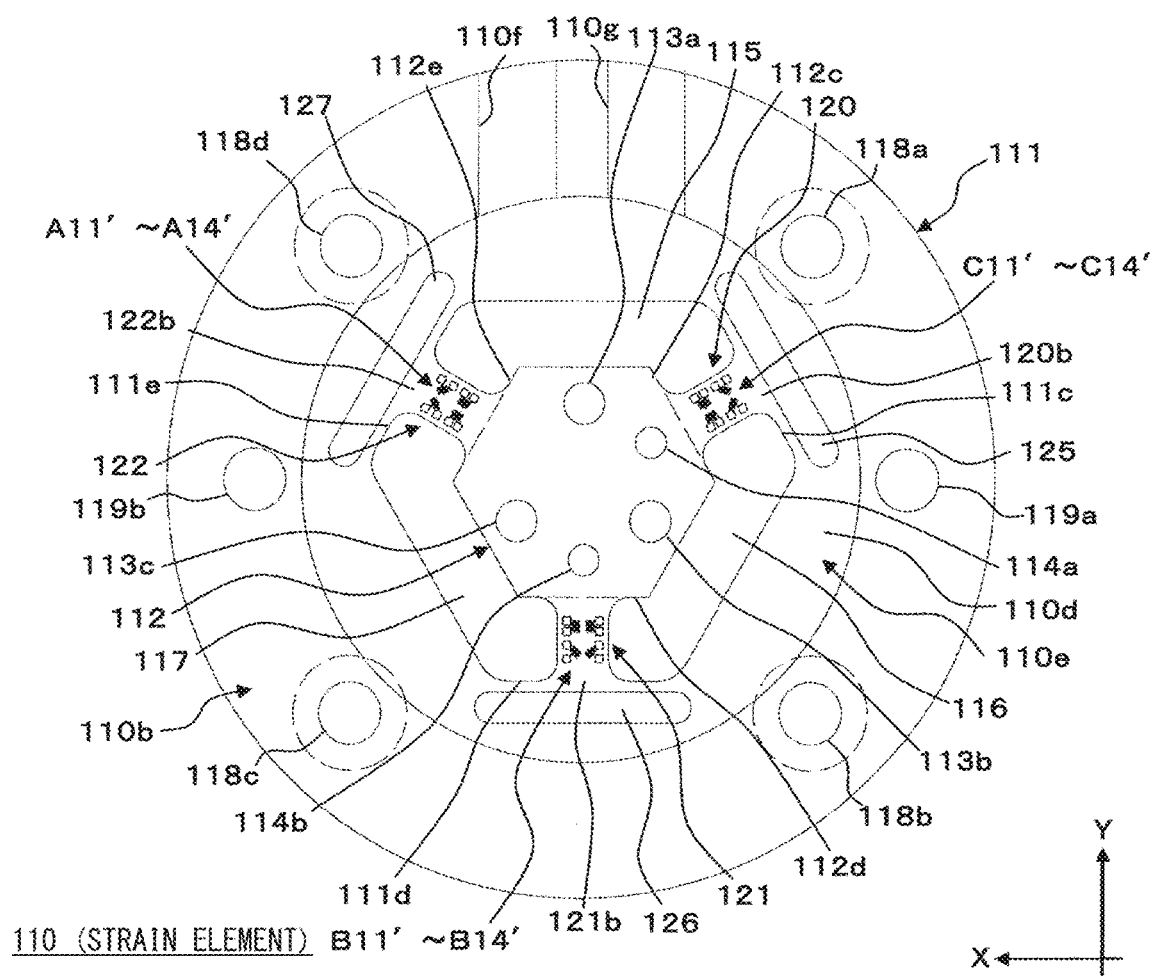

FIG. 20 is a back view of the strain element in accordance with Embodiment 2.

Figure 21:
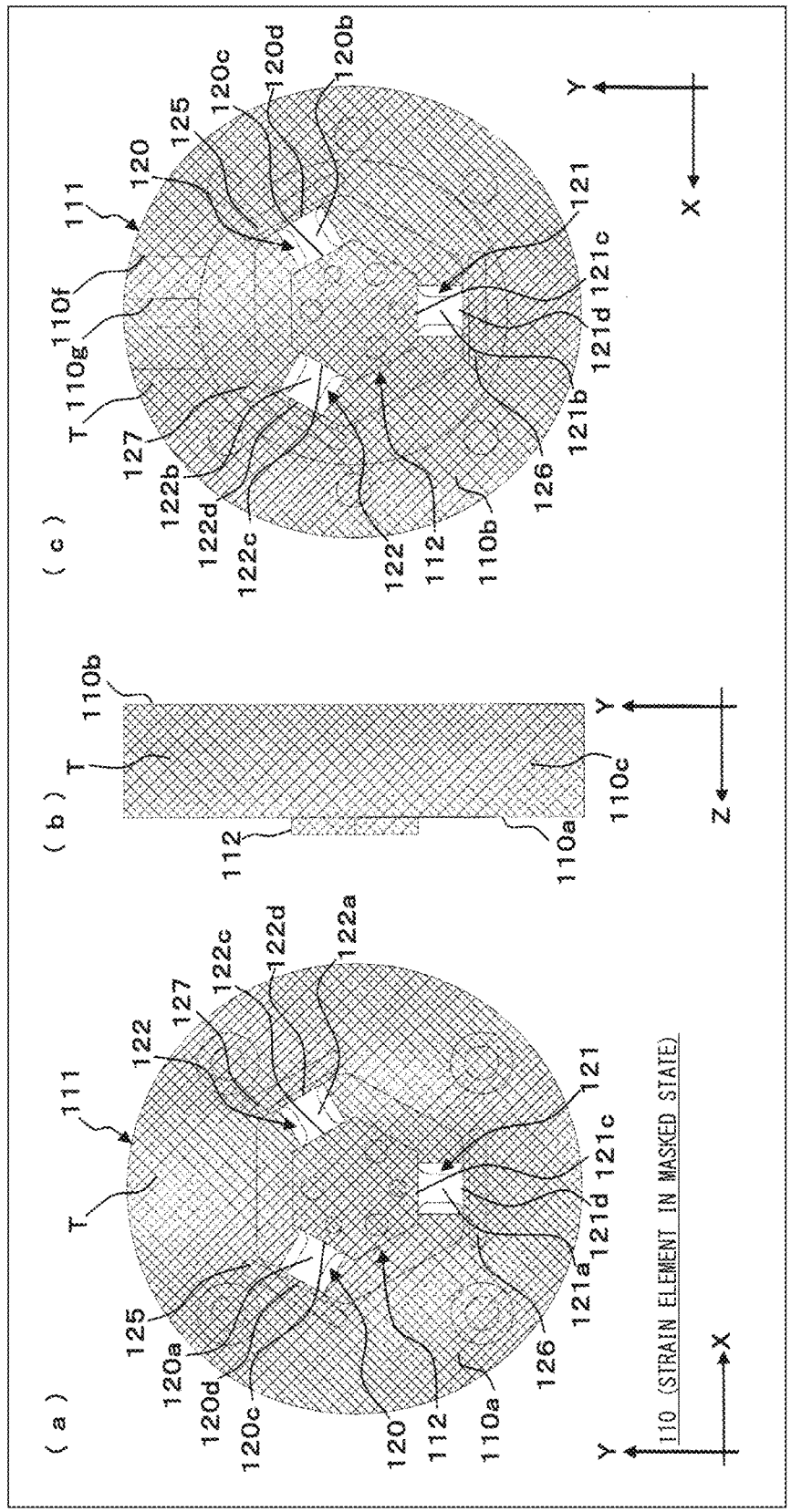

FIG. 21 illustrates the strain element in accordance with Embodiment 2 which has been masked. (a) of FIG. 21 is a front view, (b) of FIG. 21 is a side view, and (c) of FIG. 21 is a back view.

Figure 22:
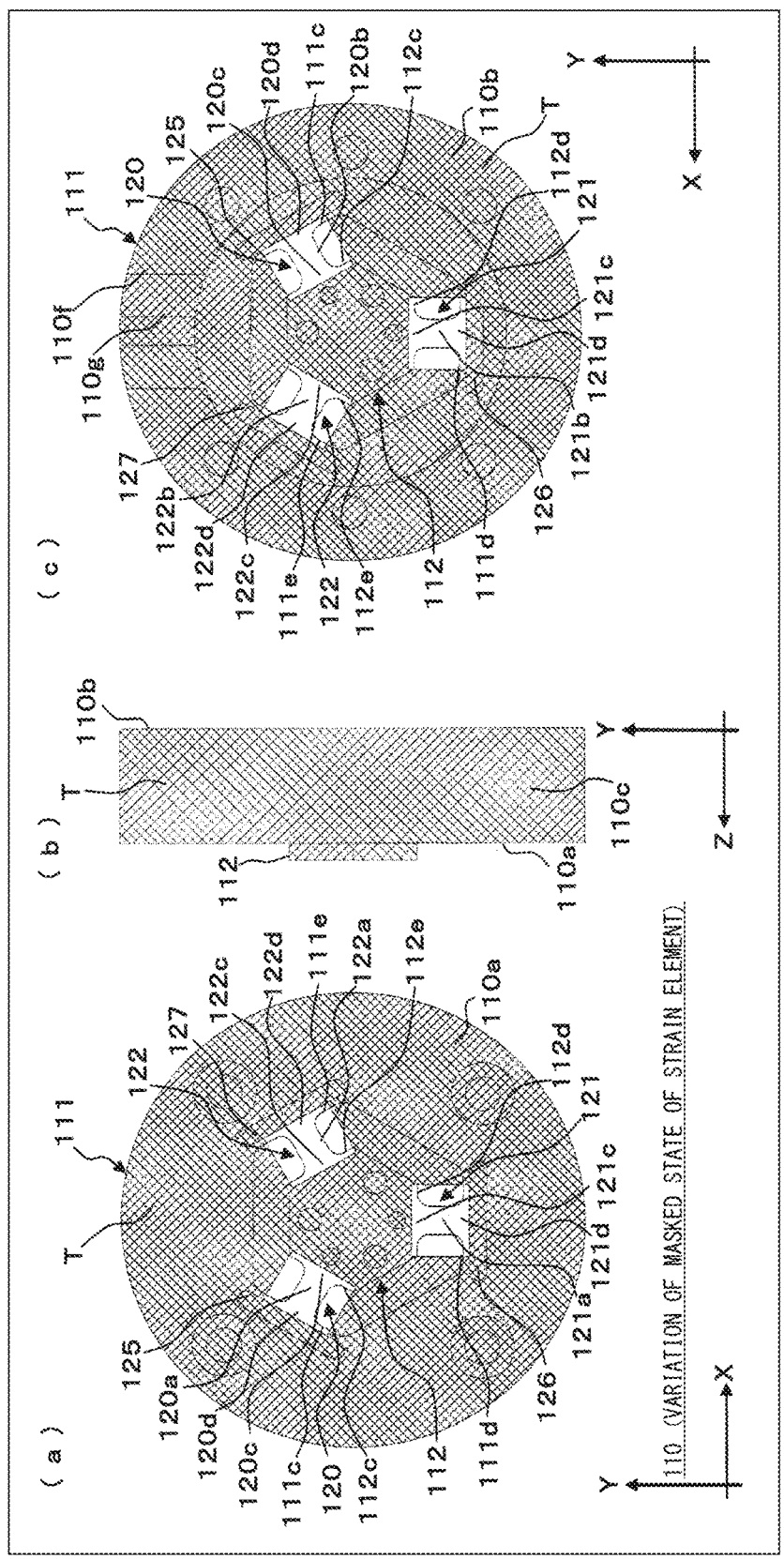

FIG. 22 illustrates a variation of masking of the strain element in accordance with Embodiment 2. (a) of FIG. 22 is a front view, (b) of FIG. 22 is a side view, and (c) of FIG. 22 is a back view.

Figure 23:
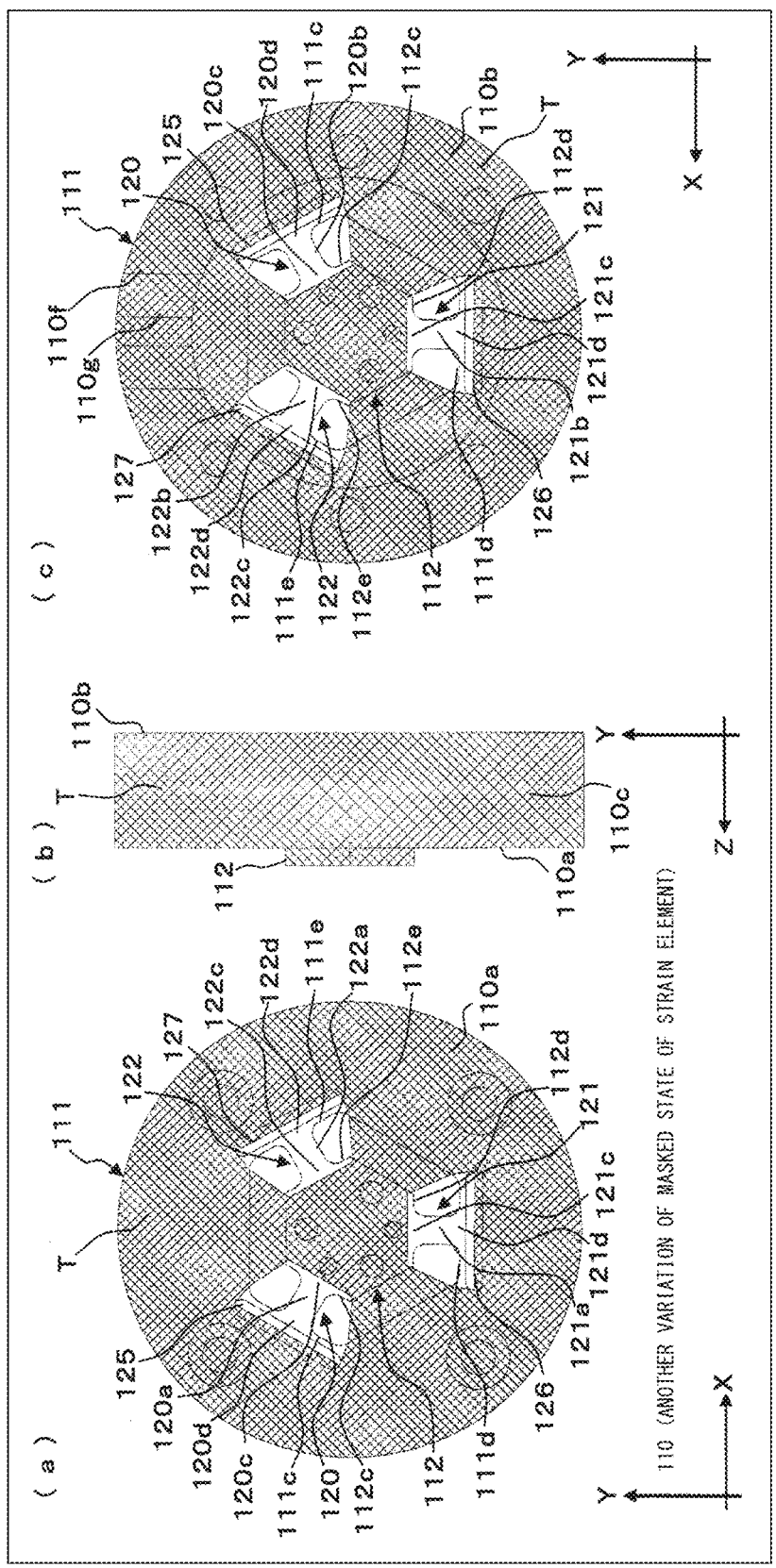

FIG. 23 illustrates another variation of masking of the strain element in accordance with Embodiment 2. (a) of FIG. 23 is a front view, (b) of FIG. 23 is a side view, and (c) of FIG. 23 is a back view.

Figure 24:
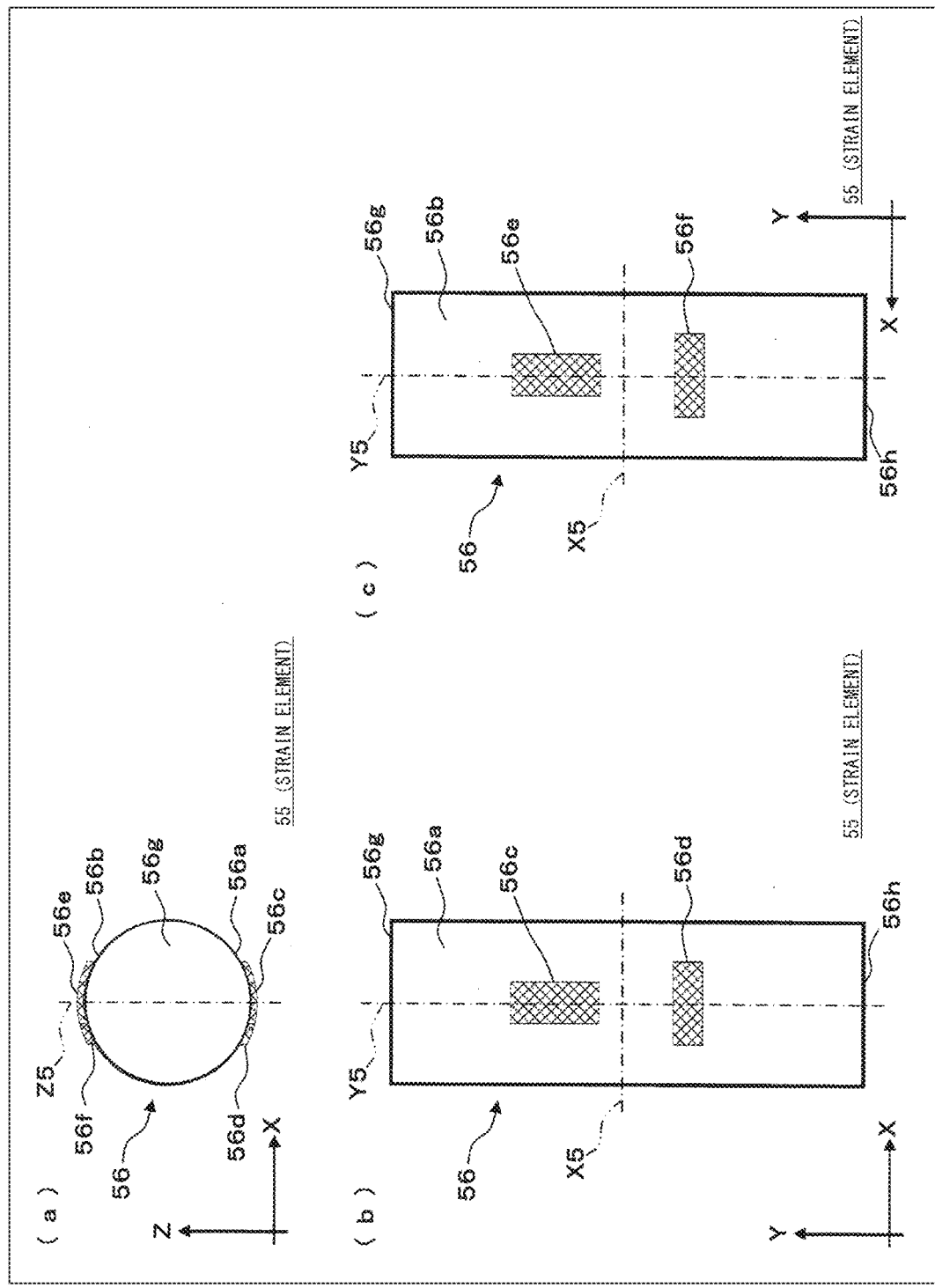

FIG. 24 illustrates a strain element in accordance with Embodiment 3. (a) of FIG. 24 is a top view (plan view), (b) of FIG. 24 is a front view, and (c) of FIG. 24 is a back view.

Figure 25:
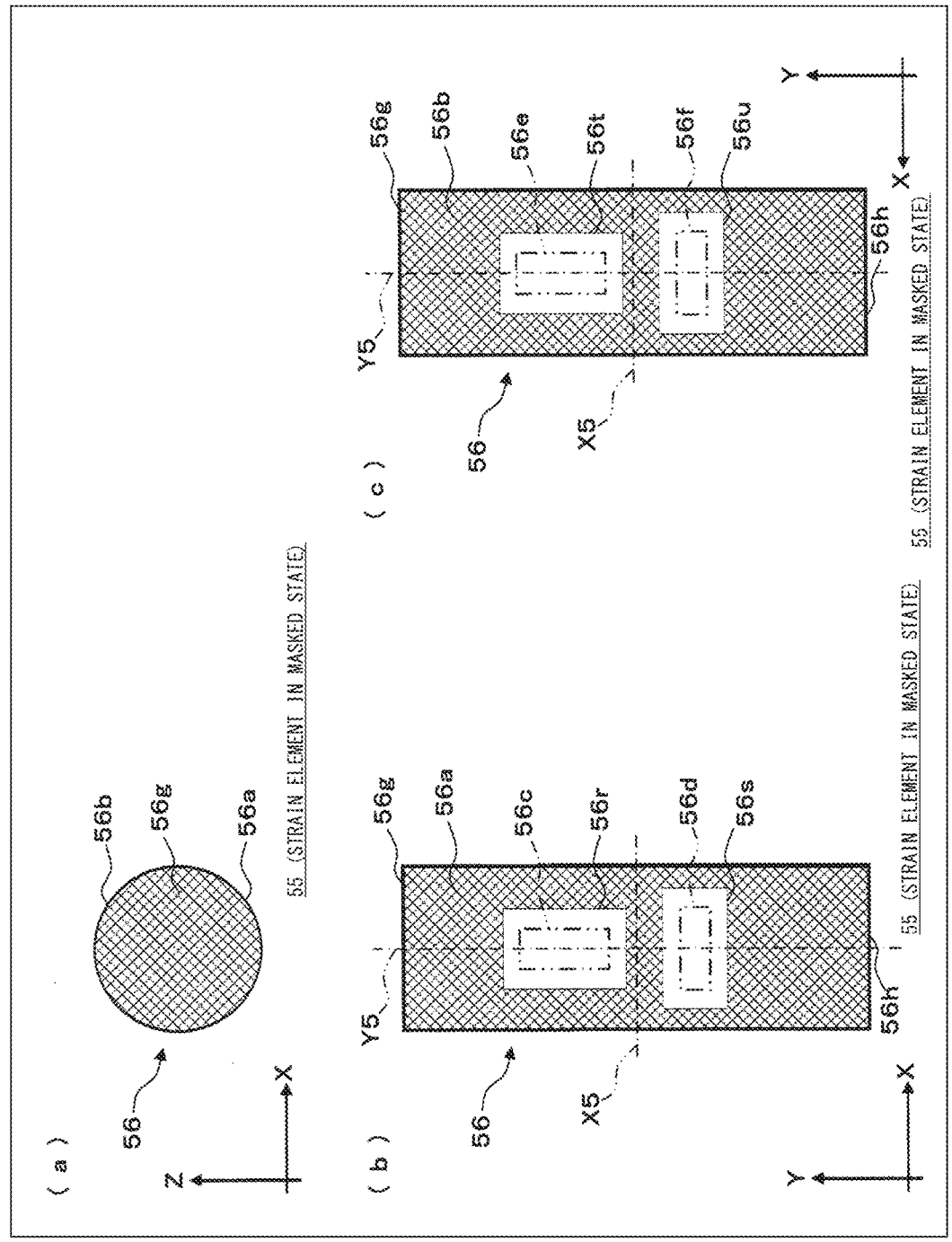

FIG. 25 illustrates the strain element in accordance with Embodiment 3 which has been masked. (a) of FIG. 25 is a top view (plan view), (b) of FIG. 25 is a front view, and (c) of FIG. 25 is a back view.

Figure 26:
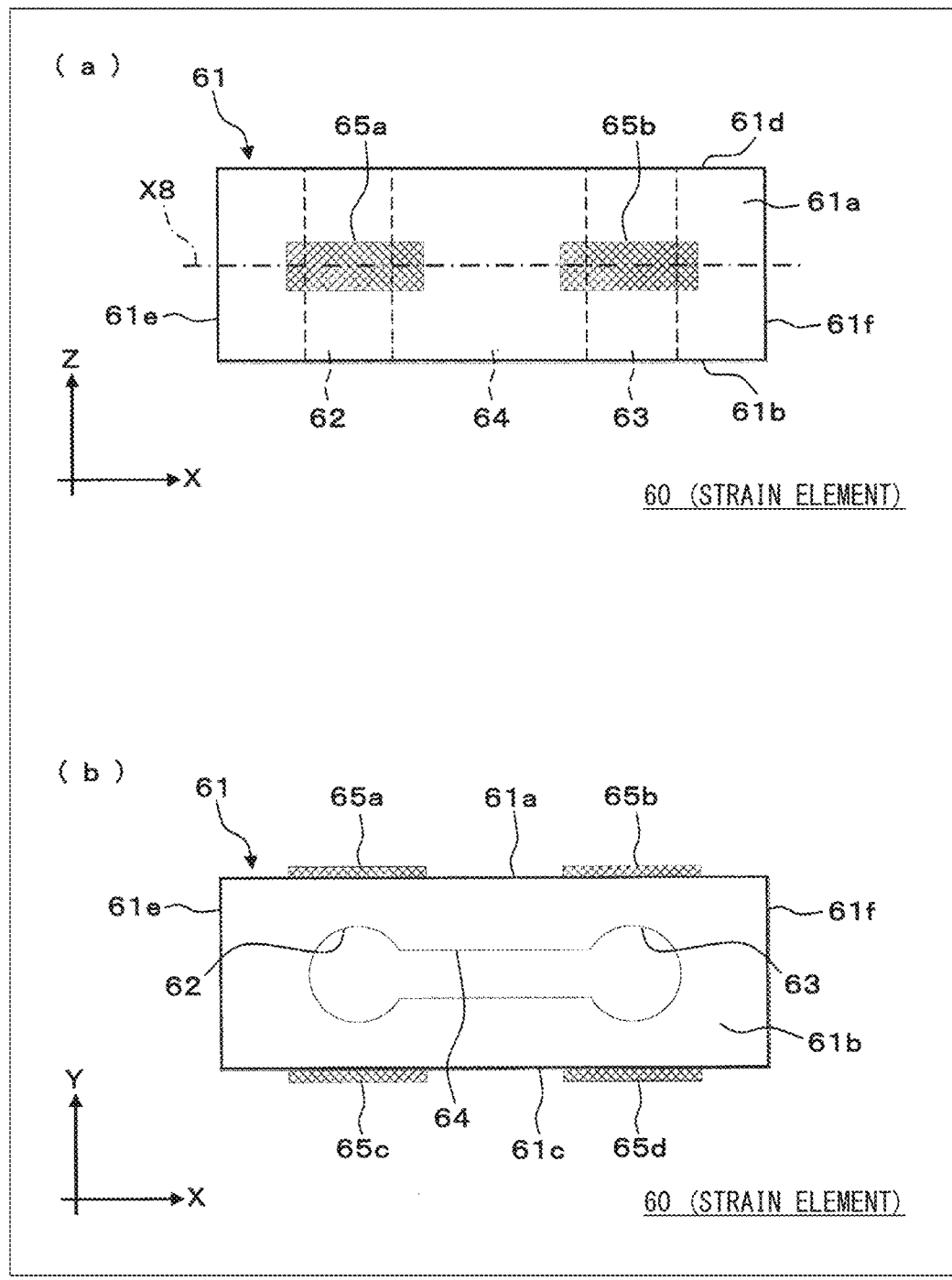

FIG. 26 illustrates a strain element in accordance with Embodiment 4. (a) of FIG. 26 is a top view (plan view), and (b) of FIG. 26 is a front view.

Figure 27:
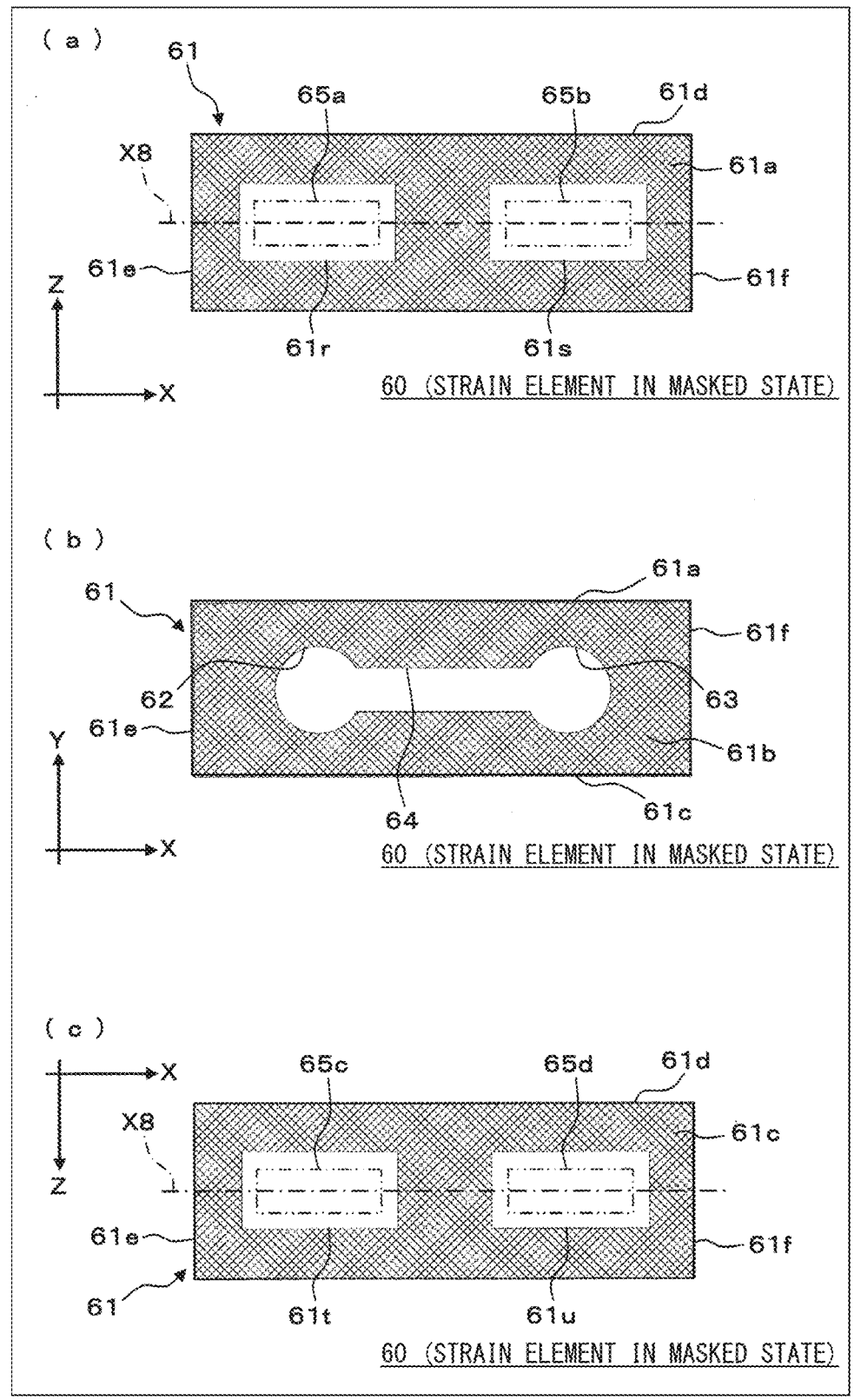

FIG. 27 illustrates the strain element in accordance with Embodiment 4 which has been masked. (a) of FIG. 27 is a top view (plan view), (b) of FIG. 27 is a front view, and (c) of FIG. 27 is a back view.

Figure 28:
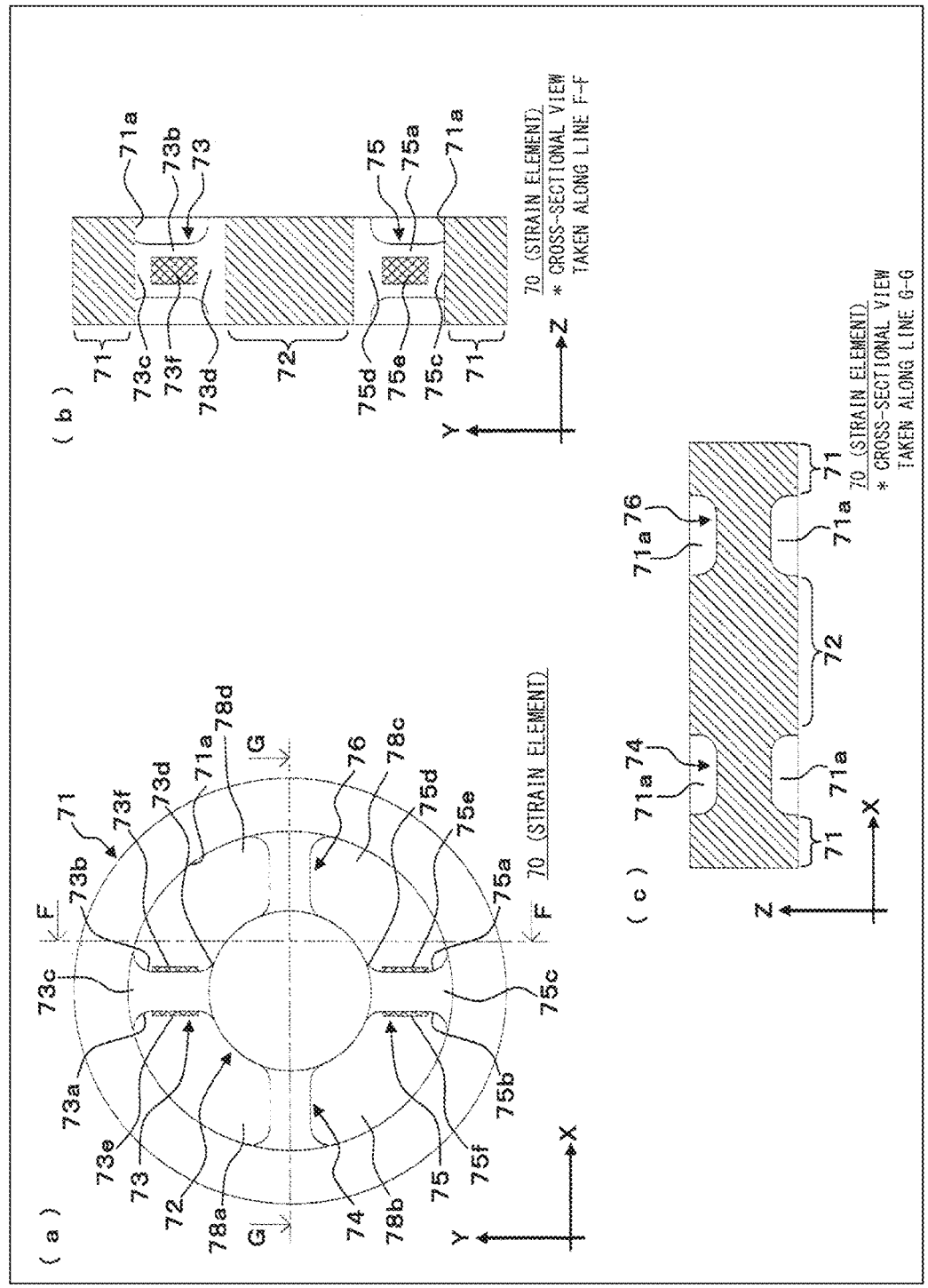

FIG. 28 illustrates a strain element in accordance with Embodiment 5. (a) of FIG. 28 is a front view, (b) of FIG. 28 is a cross-sectional view taken along line F-F in (a) of FIG. 28, and (c) of FIG. 28 is a cross-sectional view taken along line G-G in (a) of FIG. 28.

Figure 29:
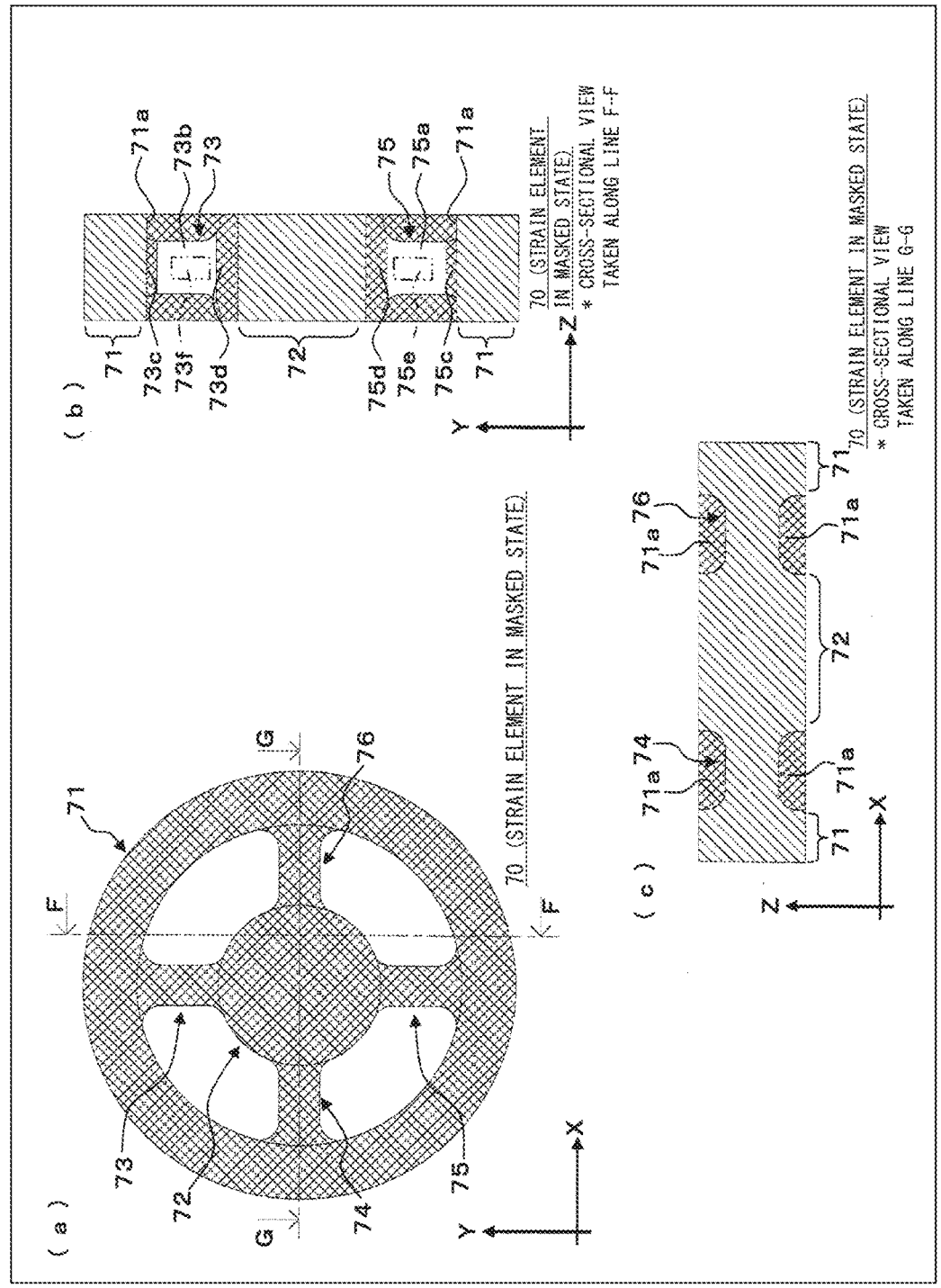

FIG. 29 illustrates the strain element in accordance with Embodiment 5 which has been masked. (a) of FIG. 29 is a front view, (b) of FIG. 29 is a cross-sectional view taken along line F-F in (a) of FIG. 29, and (c) of FIG. 29 is a cross-sectional view taken along line G-G in (a) of FIG. 29.

Figure 30:
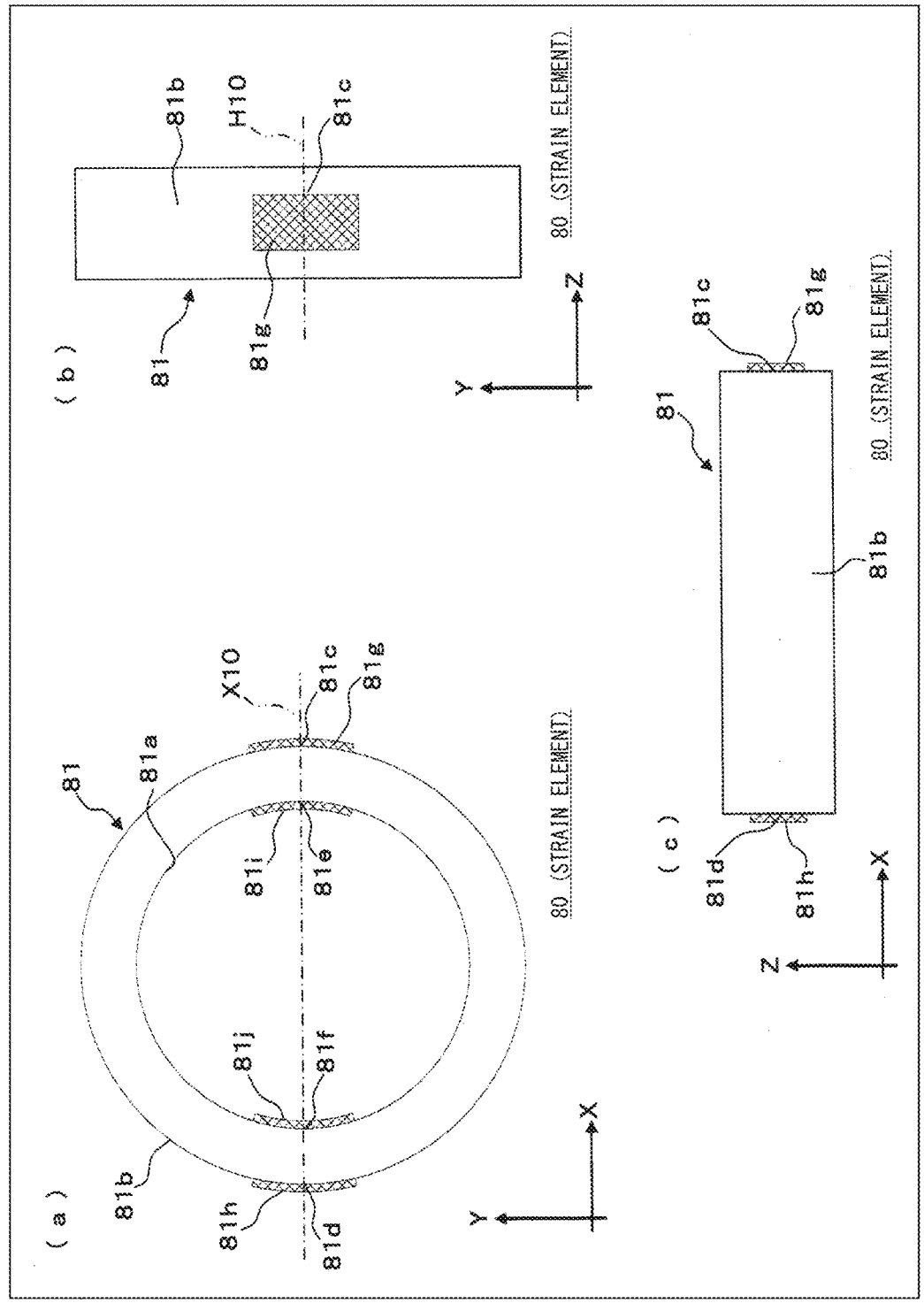

FIG. 30 illustrates a strain element in accordance with Embodiment 6. (a) of FIG. 30 is a front view, (b) of FIG. 30 is a side view, and (c) of FIG. 30 is a plan view.

Figure 31:
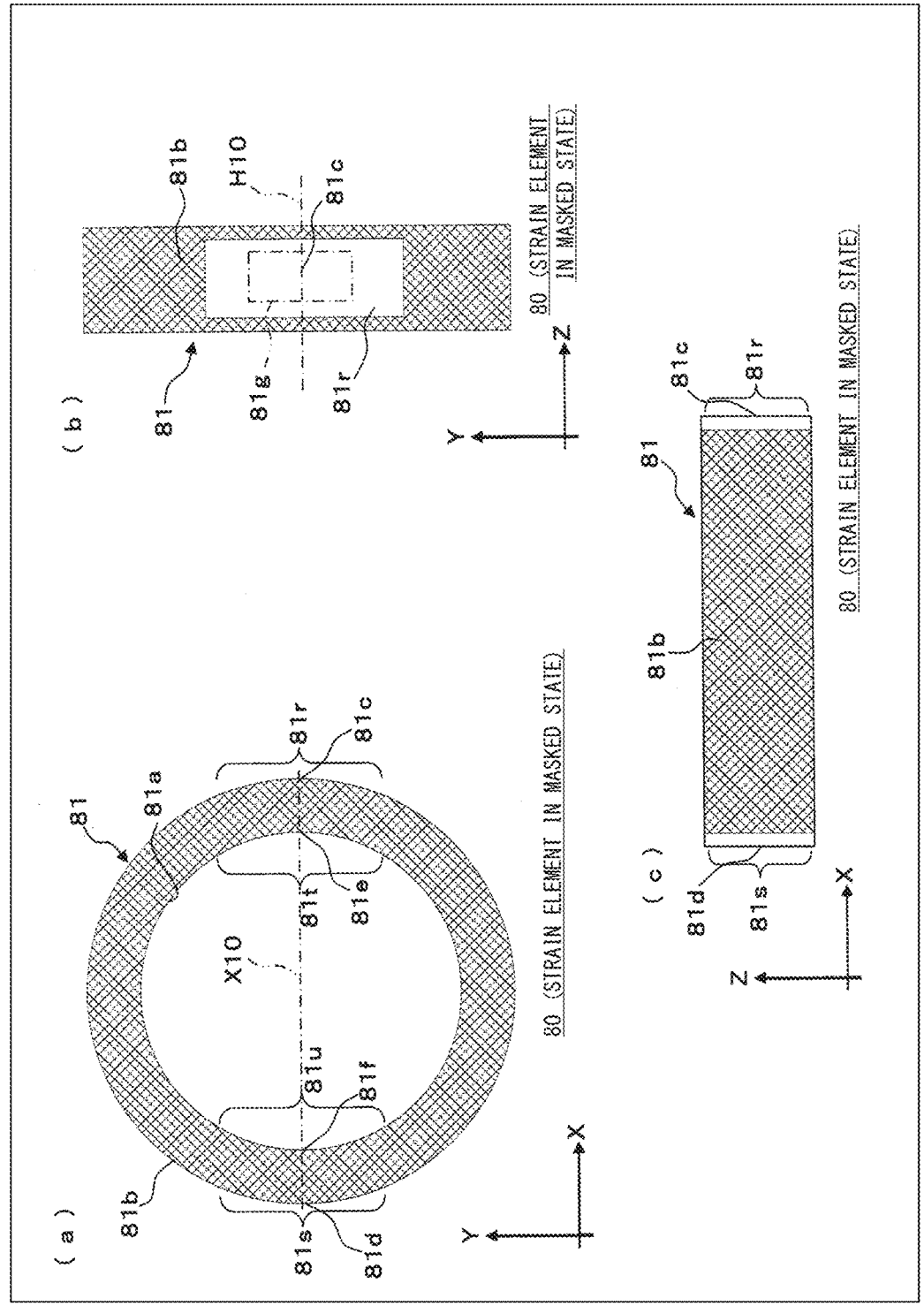

FIG. 31 illustrates the strain element in accordance with Embodiment 6 which has been masked. (a) of FIG. 31 is a front view, (b) of FIG. 31 is a side view, and (c) of FIG. 31 is a plan view.

Figure 32:
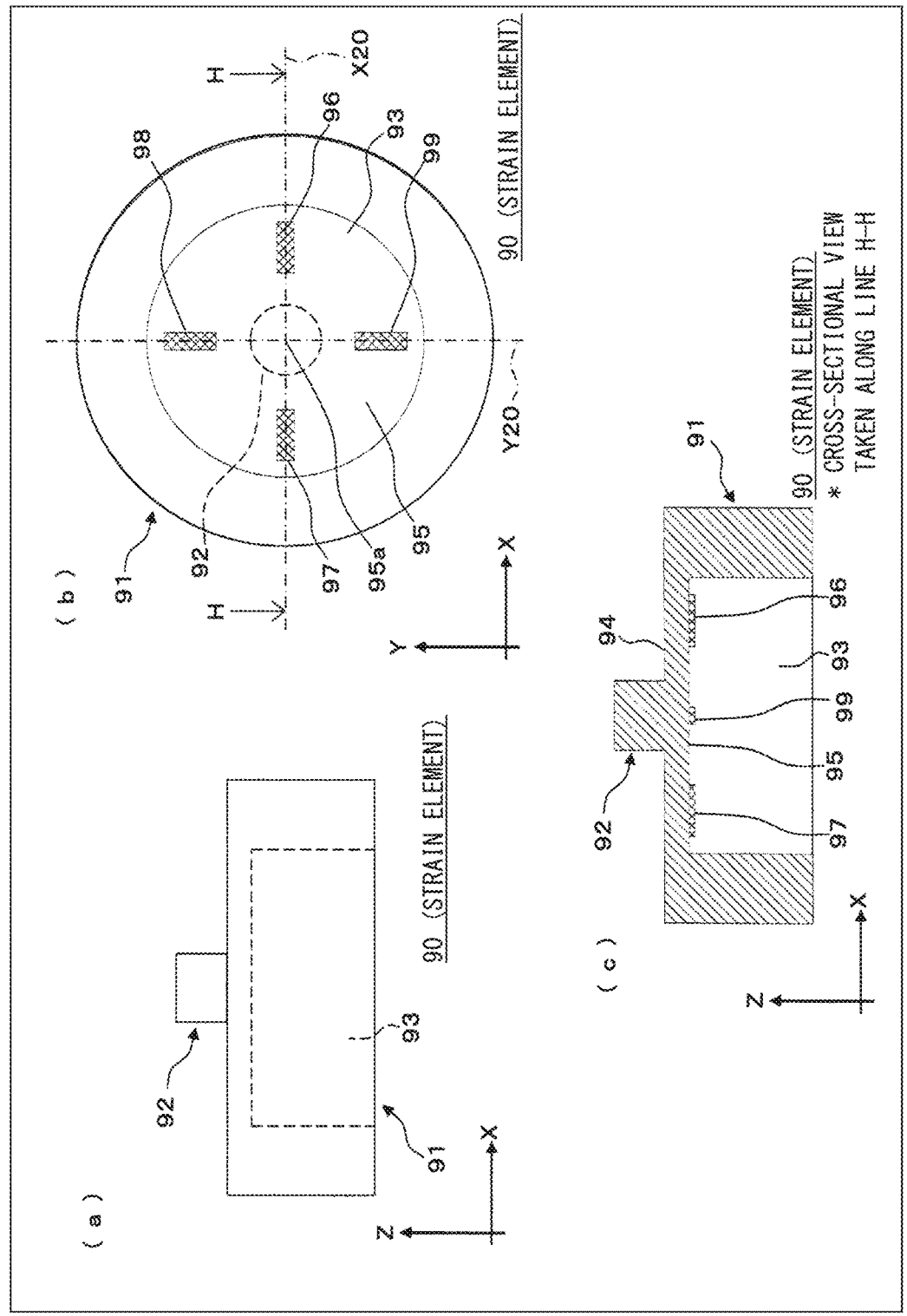

FIG. 32 illustrates a strain element in accordance with Embodiment 7. (a) of FIG. 32 is a front view, (b) of FIG. 32 is a bottom view, and (c) of FIG. 32 is a cross-sectional view taken along line H-H in (b) of FIG. 32

Figure 33:
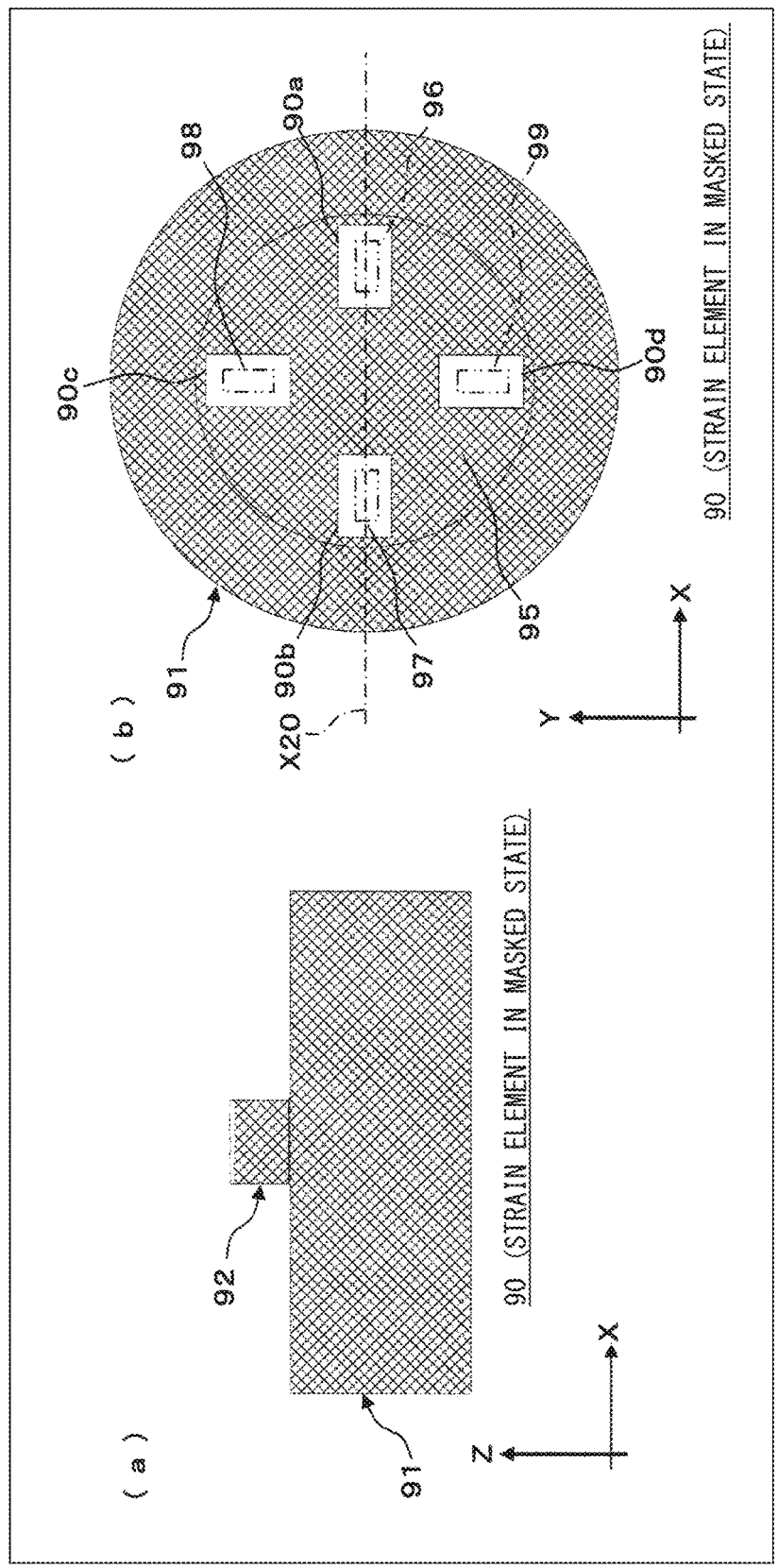

FIG. 33 illustrates the strain element in accordance with Embodiment 7 which has been masked. (a) of FIG. 33 is a front view, and (b) of FIG. 33 is a bottom view.

DESCRIPTION OF EMBODIMENTS

Embodiment 1

Figure 1:
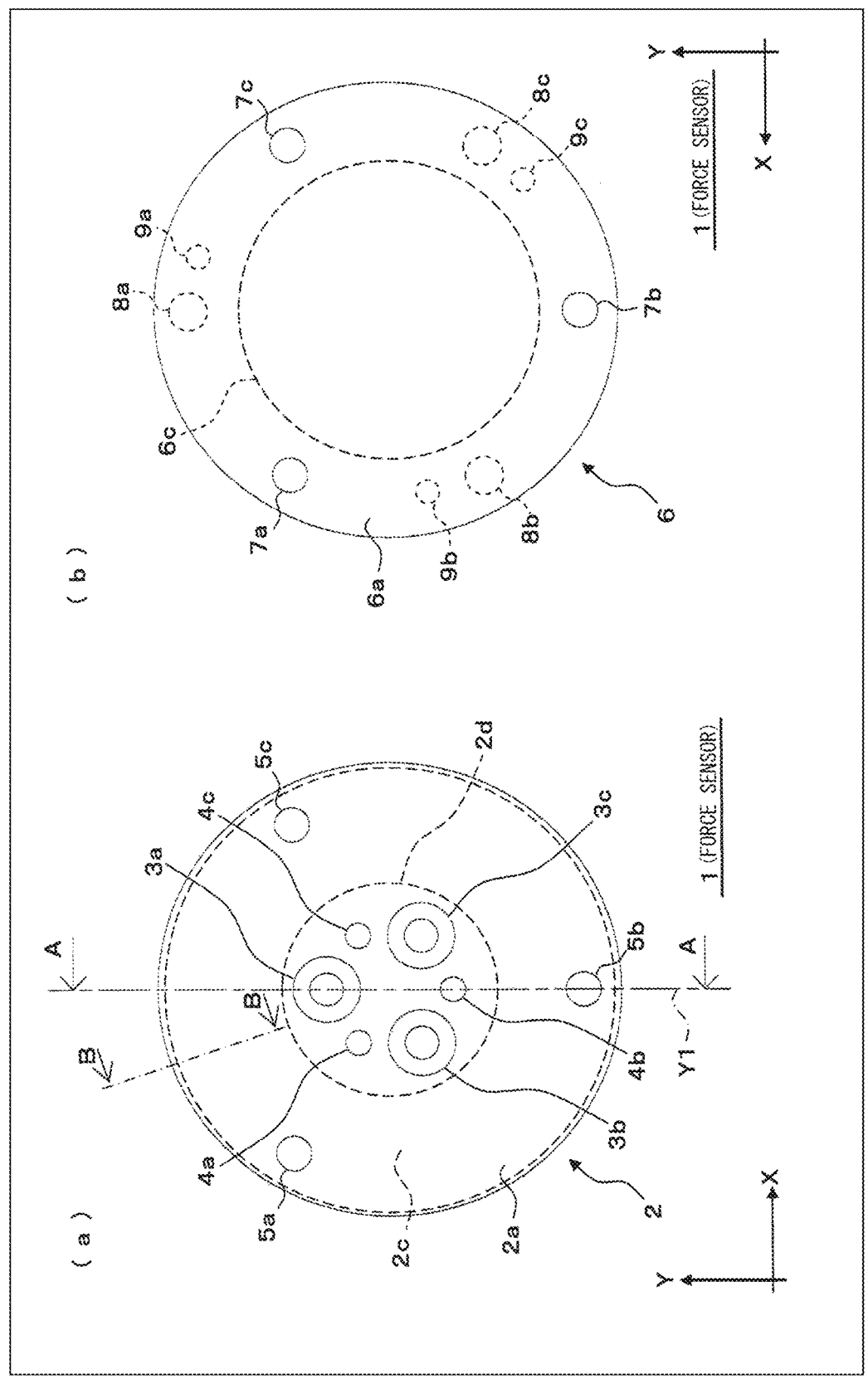
FIG. 1 illustrates a force sensor in accordance with Embodiment 1 of the present invention. (a) of FIG. 1 is a front view, and (b) of FIG. 1 is a back view.
Figure 2:
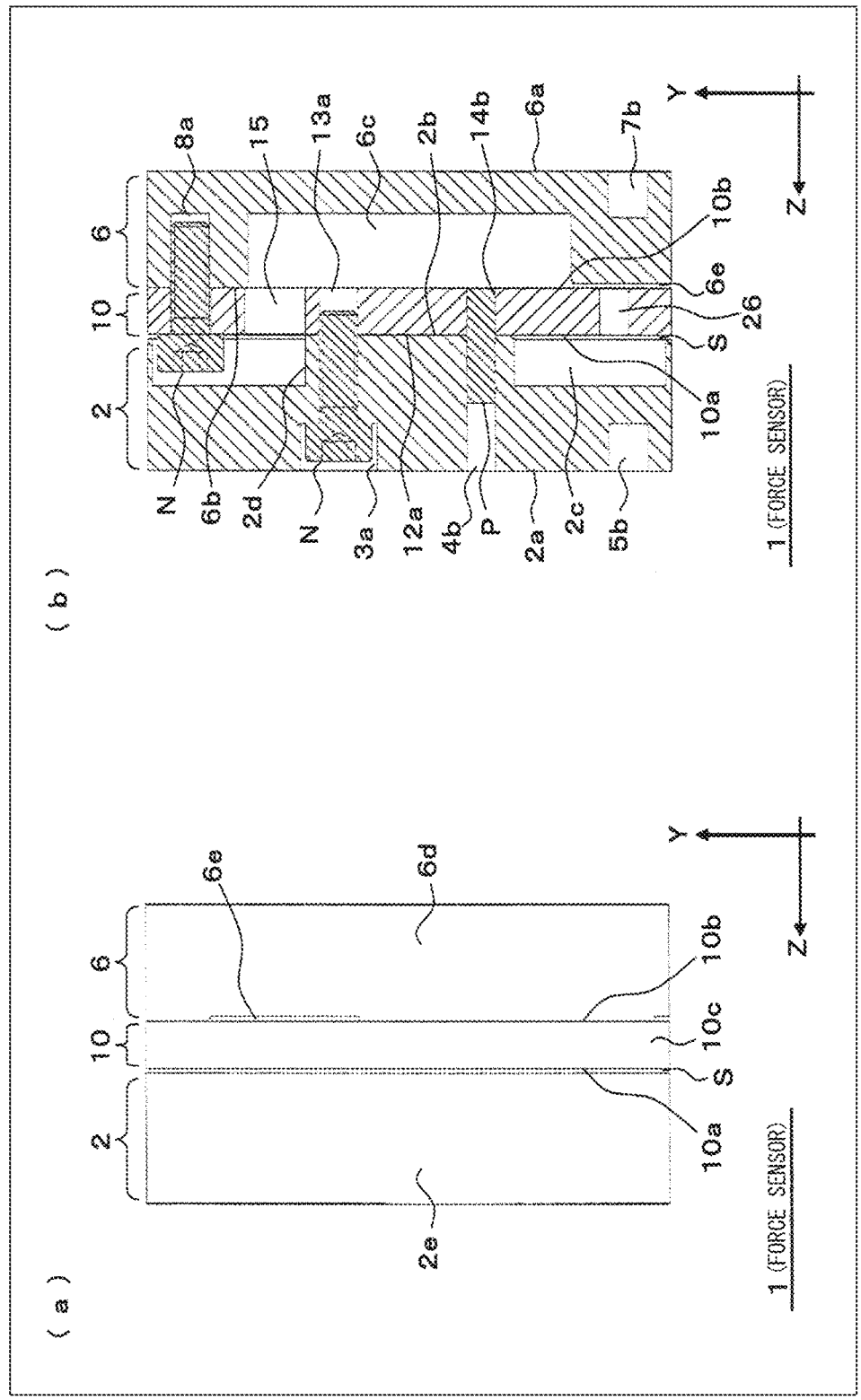
FIG. 2 illustrates the force sensor in accordance with Embodiment 1. (a) of FIG. 2 is a side view, and (b) of FIG. 2 is a cross-sectional view taken along line A-A in (a) of FIG. 1.
Figure 3:
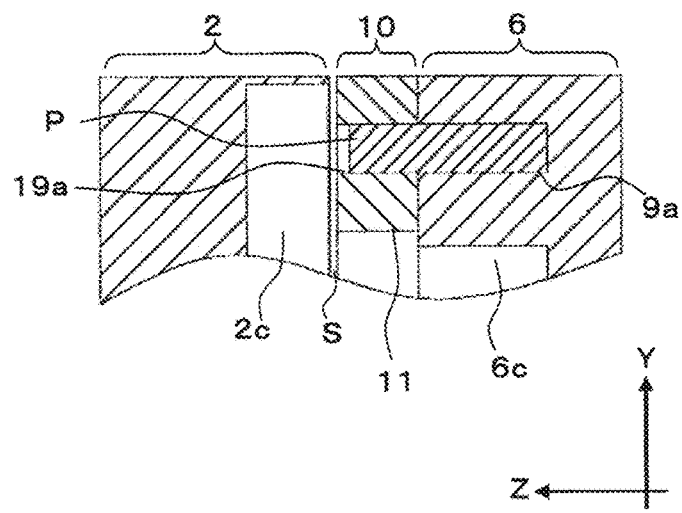
FIG. 3 is a cross-sectional view of the force sensor accordance with Embodiment 1, taken along line B-B in (a) of FIG. 1.

FIGS. 1 to 3 illustrate a force sensor 1, which is a specific example of a physical quantity measurement sensor in accordance with Embodiment 1 of the present invention. (a) of FIG. 1 is a front view of the force sensor 1, (b) of FIG. 1 is a back view of the force sensor 1, (a) of FIG. 2 is a side view of the force sensor 1, (b) of FIG. 2 is a cross-sectional view of the force sensor 1, and FIG. 3 is a cross-sectional view of main parts of the force sensor 1. The force sensor 1 illustrated in the drawings such as FIG. 1 is for application in an industrial robot arm. As illustrated in (a) of FIG. 2, the force sensor 1 has a structure in which three disk-shaped members are stacked together. Furthermore, as illustrated in (a) of FIG. 2, the force sensor 1 is configured such that a table block 2 is attached to a robot hand-side (front side) and a base block 6 is attached to a robot arm-side (back side), and such that the strain element 10 in accordance with Embodiment 1 of the present invention is sandwiched between the table block 2 and the base block 6.

The following description discusses X axis, Y axis, and Z axis shown in the drawings such as FIGS. 1 and 2. The X axis is an axis that is parallel to the horizontal direction (transverse direction) of the force sensor 1. The Y axis, which is orthogonal to the X axis, is an axis that is parallel to the vertical direction (height direction) of the force sensor 1. The Z axis, which is orthogonal to the X axis and the Y axis, is an axis that is parallel to the thickness direction of the force sensor 1 (the same applies to the following descriptions). The force sensor 1 in accordance with Embodiment 1 is capable of measuring values regarding external force in directions of the respective X, Y and Z axes and moments about the respective X, Y and Z axes through strain detection by a plurality of strain gauges provided on the strain element 10 (force sensor 1 corresponds to a six-axis force sensor).

As illustrated in (a) of FIG. 1, the table block 2 is in the shape of a circle when viewed from front side, and has many holes (through-holes) in a flat front face 2a corresponding to the front side. Specifically, the table block 2 has, in the vicinity of the center of a circle, bolt through-holes 3a, 3b, and 3c (countersunk through-holes for passage of bolts) which are arranged to form an equilateral triangle symmetrical with respect to center line Y1 in the height direction. The table block 2 also has locating through-holes 4a, 4b, and 4c (through-holes with fit tolerance) which are arranged to form an inverted equilateral triangle symmetrical with respect to the center line Y1. The table block 2 further has hand-attaching screw holes 5a, 5b, and 5c (internally threaded holes) which are arranged in the vicinity of the outer circumference to form an inverted equilateral triangle. These hand-attaching screw holes 5a, 5b, and 5c are used for attachment to the robot hand.

Furthermore, the table block 2 has, on a back face 2b opposite the foregoing front face 2a, a doughnut-shaped groove 2c around a center portion 2d which has the foregoing bolt through-holes 3a to 3c and locating through-holes 4a to 4c (see FIG. 1 and (b) of FIG. 2). The thickness (dimension along the Z axis direction) of the outer contour of the groove 2c is slightly less than the thickness of the center portion 2d, and thereby a shape in which the center portion 2d slightly protrudes is provided. With this, the back face 2b of the center portion 2d of the table block 2 makes contact with a front face 10a of the strain element 10, when the force sensor 1 is in an assembled state.

On the other hand, the base block 6 is also in the shape of a circle when seen from back side, as illustrated in (b) of FIG. 1. The base block 6 has arm-attaching screw holes 7a, 7b, and 7c (internally threaded holes) which are arranged in the vicinity of the outer circumference of a flat front face 6a corresponding to the back side to form an inverted equilateral triangle. The arm-attaching screw holes 7a, 7b, and 7c in the base block 6 are used for attachment to the robot arm. Furthermore, the back face 6b, opposite the front face 6a, has a hollow 6c in the center portion as also illustrated in (b) of FIG. 2. The back face 6b is provided with screw holes 8a, 8b, and 8c (internally threaded holes) which are arranged in the vicinity of the outer circumference to form an equilateral triangle. The back face 6b also has locating holes 9a to 9c such that the locating holes 9a to 9c are adjacent to the respective screw holes 8a to 8c (see holes represented by dashed lines in (b) of FIG. 1). Note that such table block 2 and base block 6 are each produced from a lightweight metal material (for example, aluminum-based material) in order not to greatly affect the weight capacity of an industrial robot arm to which the force sensor 1 is applied.

Figure 4:
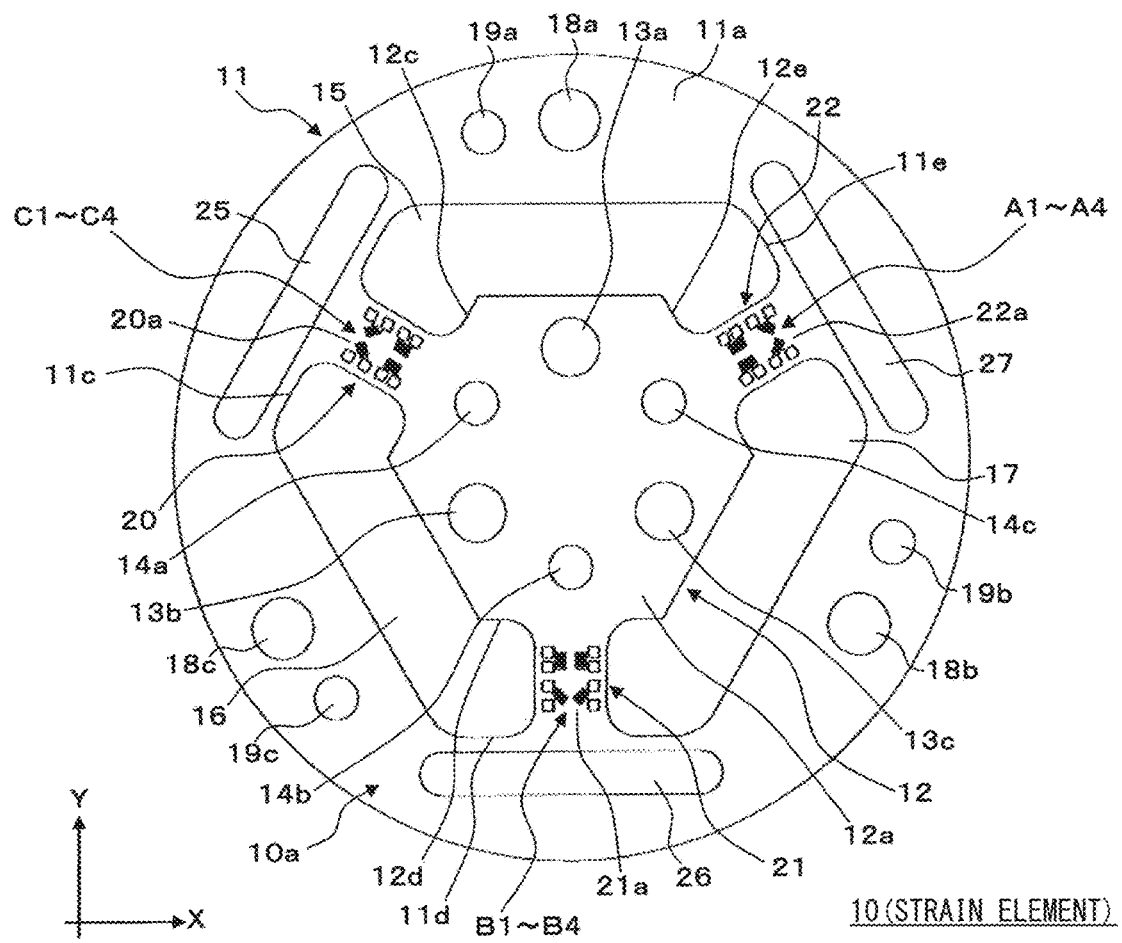
FIG. 4 is a front view of a strain element in accordance with Embodiment 1 of the present invention.
Figure 5:
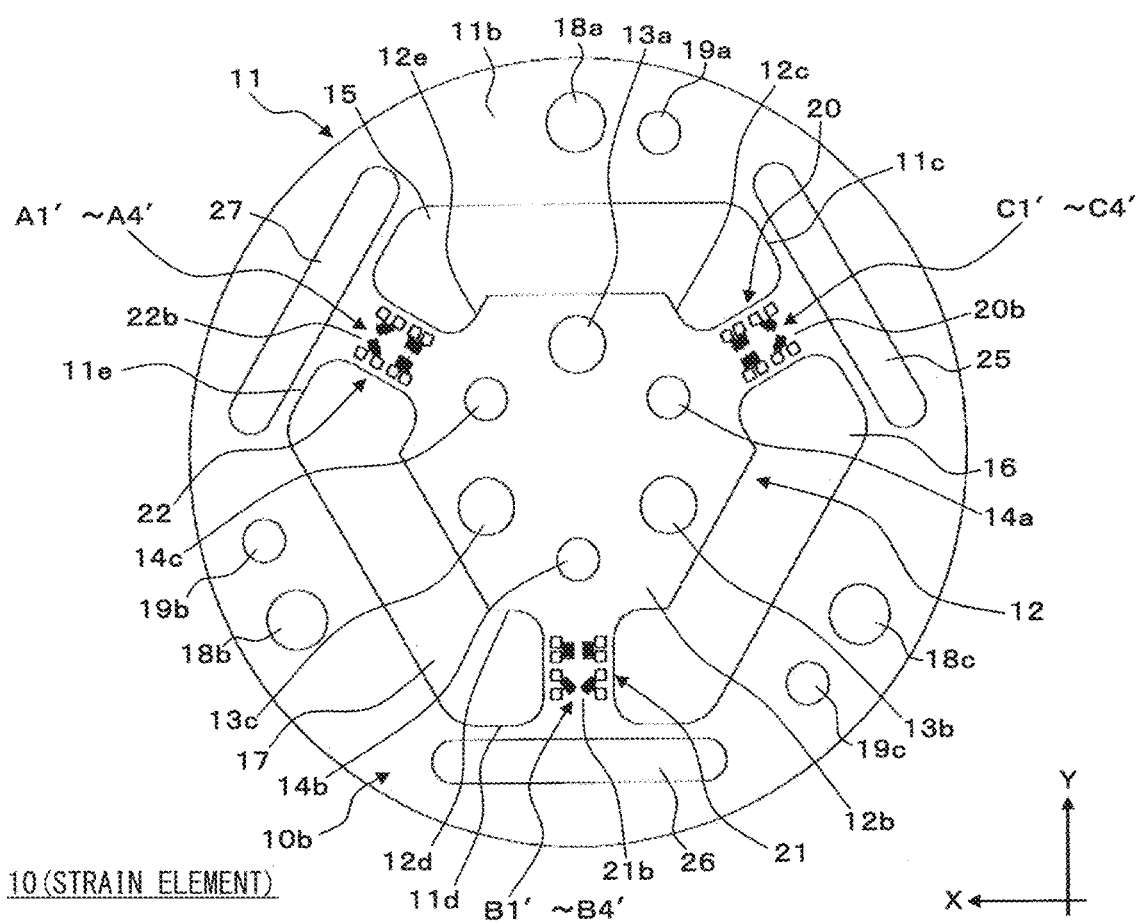
FIG. 5 is a back view of the strain element in accordance with Embodiment 1.

FIGS. 4 and 5 illustrate a front side and a back side of the strain element 10 in accordance with Embodiment 1 of the present invention. As illustrated in (a) of FIG. 2, the strain element 10 is a plate-like member which is smaller in dimension in the thickness direction (dimension in the Z axis direction) than the foregoing table block 2 and base block 6, and has a circular circumferential outline when seen from the front side and the back side. The strain element 10 includes: a peripheral frame portion 11; a central portion 12 which is located in a space defined by the frame portion 11 so as to be spaced apart from the frame portion 11; and three arm portions 20, 21 and 22 which connect the frame portion 11 and the central portion 12. Note that, in this example, the arm portions 20 to 22 are included in strain portions which correspond to regions subject to strain associated with elastic deformation.

The arm portions 20 to 22 radially extend outward from the center of the strain element 10, and are disposed along a circumferential direction of the strain element 10 having a circular outer circumference so as to be spaced apart from each other by 120 degrees. Each of such arm portions 20 to 22 is, because of the structure, less rigid than the frame portion 11 and the central portion 12, and each of the arm portions 20 to 22 is configured to elastically deform in response to an external load or moment.

The central portion 12 has an outer circumference substantially in the shape of an equilateral hexagon, and has, within the outer circumference, screw through-holes 13a, 13b, and 13c (internally threaded through-holes) which are arranged to form an equilateral triangle, and locating through-holes 14a, 14b, and 14c (through-holes with fit tolerance) which are arranged to form an inverted triangle. The screw through-holes 13a to 13c correspond to the bolt through-holes 3a to 3c of the foregoing table block 2, and the locating through-holes 14a to 14c correspond to the locating through-holes 4a to 4c of the foregoing table block 2. Furthermore, the central portion 12, whose outline is substantially in the shape of a hexagon, connects to the arm portions 20, 21, and 22 at middle portions of outer peripheral edge portions 12c, 12d, and 12e which are adjacent to and correspond to the locating through-holes 14a, 14b, and 14c.

The frame portion 11 has an outer contour in the form of a circle, and an inner contour in the form of a hexagon which is obtained by uniformly enlarging the contour of the foregoing central portion 12. The frame portion 11 has bolt through-holes 18a, 18b, and 18c which are arranged to from an equilateral triangle, and locating through-holes 19a to 19c which are arranged adjacent to the respective bolt through-holes 18a to 18c. The bolt through-holes 18a to 18c correspond to the screw holes 8a to 8c of the foregoing base block 6, and the locating through-holes 19a to 19c correspond to the locating holes 9a to 9c of the foregoing base block 6.

The frame portion 11 is connected to the arm portions 20, 21, and 22 at middle portions of inner peripheral edge portions 11c, 11d, and 11e located opposite the outer peripheral edge portions 12c, 12d, and 12e of the foregoing central portion 12. Because of the presence of such arm portions 20, 21, and 22, the space between the frame portion 11 and the central portion 12 is divided into three, resulting in formation of a first space 15, a second space 16, and a third space 17. The frame portion 11 further has three through-openings 25, 26, and 27 (each corresponding to first through-opening) in the junctions where the frame portion 11 connects to the respective arm portions 20 to 22. These through-openings 25 to 27 are in the shape of straight lines along the inner peripheral edge portions 11c, 11d, and 11e at the inner circumference in the form of a hexagon, and are equal to or slightly greater in length than the edges of the respective inner peripheral edge portions 11c, 11d, and 11e. Each of the through-openings 25 to 27 has a width that is set to a value within the range of about ⅛ to ⅕ of its length (in Embodiment 1, set to about 1/6.5).

The strain element 10 has the through-openings 25 to 27 in the frame portion 11, and is thereby arranged so that deformability in directions of stretch of the arm portions 20 to 22 is reduced and that strain of the arm portions 20 to 22 associated with elastic deformation, in directions other than the directions of stretch, is easily detected.

The arm portions 20 to 22, which are elastically deformable, each have, disposed on its arm front face 20a, 21a or 22a illustrated in FIG. 4 corresponding to the front side of the strain element 10, a set of four strain gauges (strain gauges C1 to C4, strain gauges B1 to B4, or strain gauges A1 to A4). Also, the arm portions 20 to 22 each have, disposed on its arm back face 20b, 21b, or 22b illustrated in FIG. 5 corresponding to the back side of the strain element 10, a set of four strain gauges C1' to C4', strain gauges B1' to B4', or strain gauges A1' to A4'.

Such strain gauges A1 to C4' carry out detection of strain associated with elastic deformation of the arm portions 20 to 22. The strain is detected from an electric change in resistance that occurs when the arm portions 20 to deform. The strain gauges A1 to C4' change their resistance in response to deformation of the arm portions. Therefore, strain is detected based on a change in output voltage of a bridge circuit illustrated in FIG. 9 (described later) associated with a change in resistance in the bridge circuit. Furthermore, the strain gauges A1 to C4' are capable of detecting strain in respective predetermined directions (hereinafter "detection directions"). By arranging the strain gauges A1 to C4' so that their detection directions are oriented as desired, detection suitable for strain such as bending, shearing, and/or the like of the arm portions 20 to 22 is carried out (see explanations for FIGS. 6 and 7 provided later).

The strain gauges A1 to C4' are each composed of: a thin metal film containing Cu—Ni as a main material and including a pattern; and a flexible resin film (polyimide-and-epoxy-based resin) that covers the thin metal film. Note that the main material for the strain gauges A1 to C4' is not limited to the above mentioned main material. Besides the above-mentioned main material, also Cu, Ni, Al, Ti, Cr, Ge, Ni—Cr, Si semiconductor, Cr—O, Cr—N, and the like can be used as the main material. Furthermore, the strain gauges A1 to C4' used in Embodiment 1 are of a type in which a base material for a strain gauge is coated with a strain gauge main material.

Figure 6:
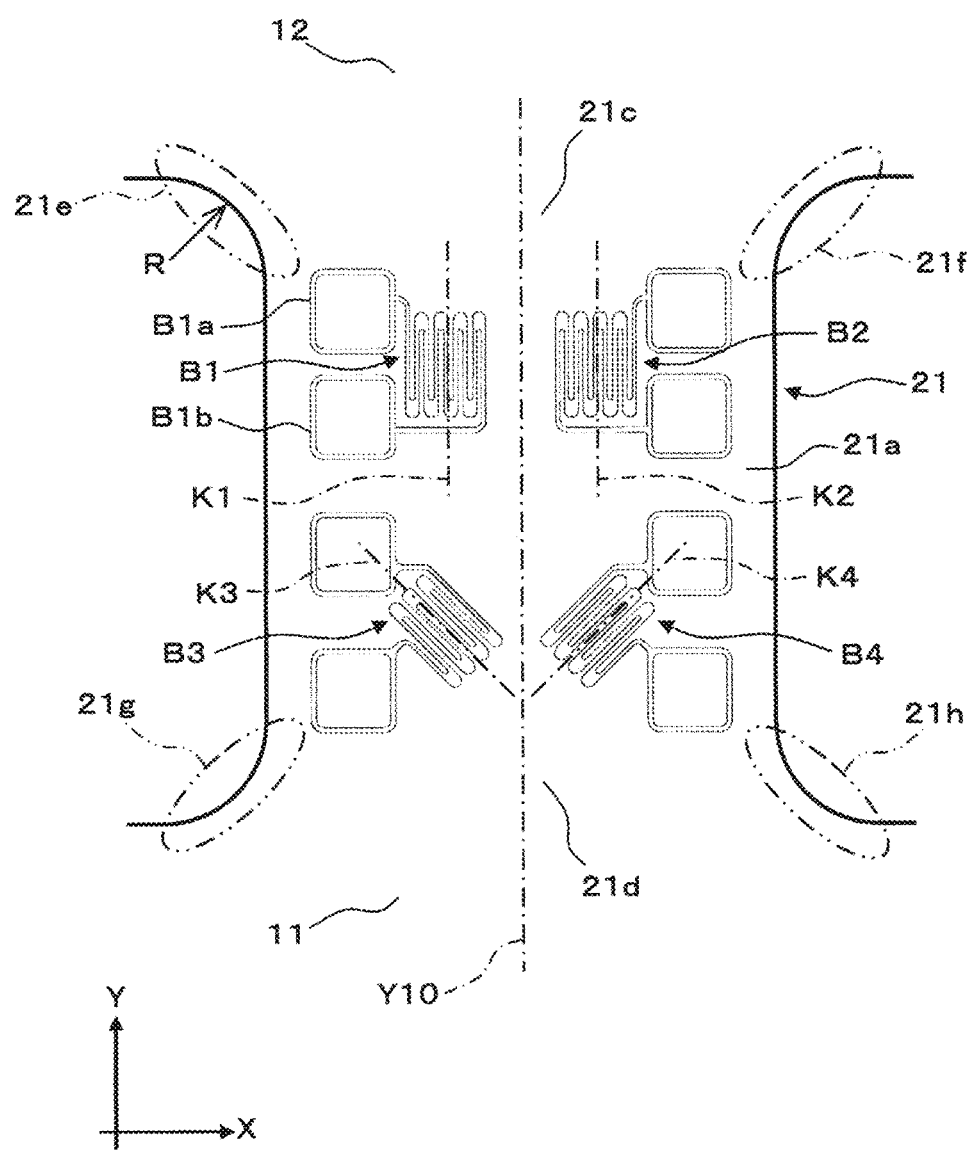
FIG. 6 is an enlarged view illustrating a manner in which strain gauges are disposed on one arm portion of the strain element on the front side.
Figure 7:
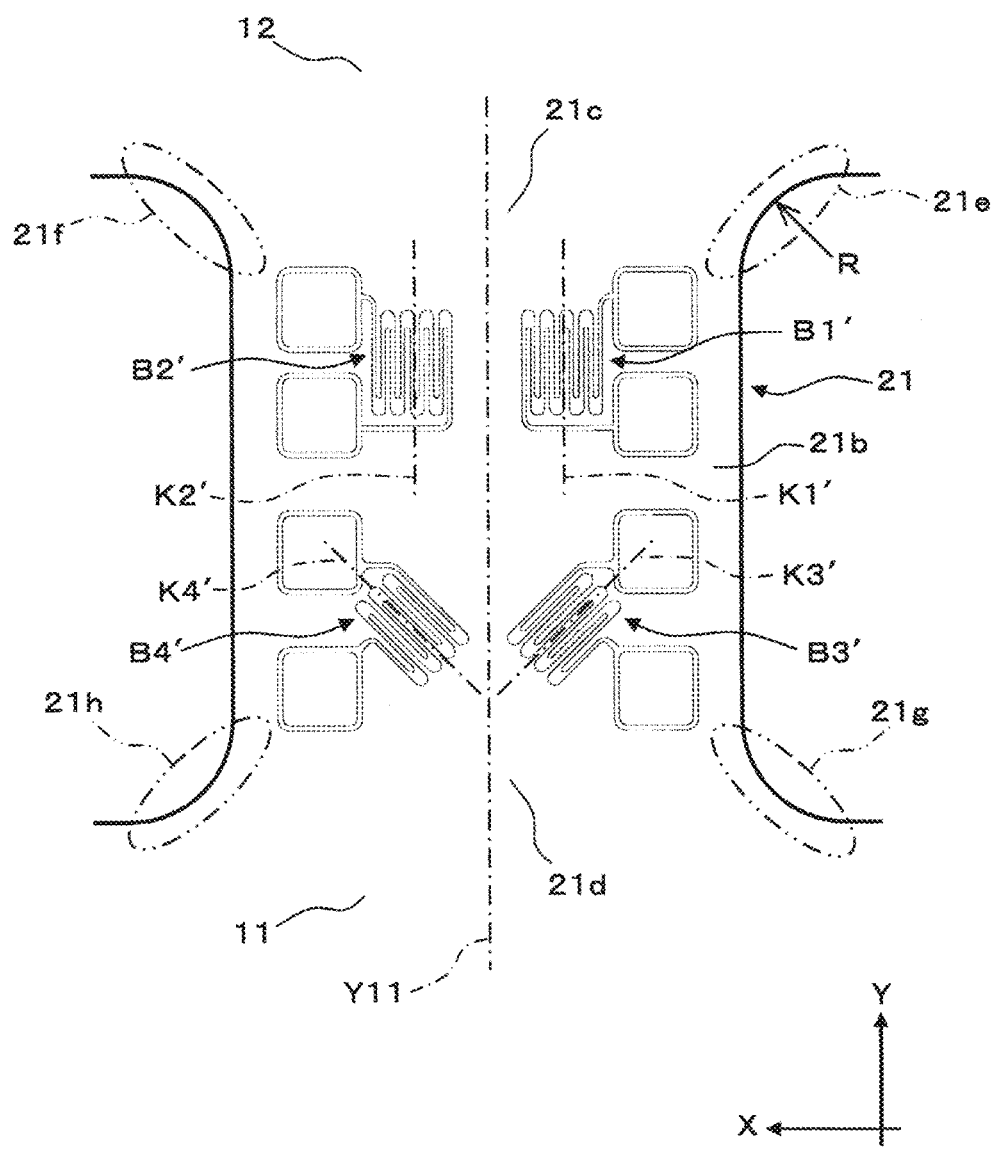
FIG. 7 is an enlarged view illustrating a manner in which strain gauges are disposed on one arm portion of the strain element on the back side.

FIG. 6 illustrates, with use the arm portion 21 parallel to the Y axis direction as an example, a manner in which strain gauges are disposed on an arm front face corresponding to the front side of the strain element 10. The arm portion 21 has the strain gauges B1 to B4 disposed on the arm front face 21a (corresponding to one face of the arm portion). On the arm portion 21, the strain gauges B1 to B4 are disposed such that they are symmetrical with respect to center line Y10 which extends along the direction of extension of the arm portion 21 (corresponding to a direction which connects the central portion 12 with the frame portion 11) (line that is parallel to the Y axis on the arm front face 21a and that passes through the center of the strain element 10).

Specifically, the strain gauges B1 and B2 (corresponding to the first strain gauge and the second strain gauge), of the set of four strain gauges B1 to B4, are disposed in an area close to the central portion 12 such that their detection directions K1 and K2 are parallel to the center line Y10. Note that, in FIG. 6, square-shaped parts disposed vertically on the left-hand side of the strain gauge B1 are connection parts B1a and B1b (positive and negative connection parts) for electrical connection to the strain gauge B1. These connection parts B1a and B1b have a lead wire (not illustrated) connected thereto (the same applies to square-shaped parts adjacent to the other strain gauges B2 to B4 illustrated in FIG. 6).

The strain gauges B3 and B4 (corresponding to the third strain gauge and the fourth strain gauge), of the set of four strain gauges B1 to B4, are disposed in an area close to the frame portion 11 such that their detection directions K3 and K4 are at an angle to the center line Y10 so as to diverge away from each other with decreasing distance to the central portion 12. Note that, in Embodiment 1, the detection directions K3 and K4 are each at an angle of 45 degrees to the center line Y10. The manner of disposition has been discussed using the strain gauges B1 to B4 on the arm front face 21a of the arm portion 21 as an example. However, the same applies to the disposition of the strain gauges C1 to C4 on the arm front face 20a of the arm portion 20 and to the disposition of the strain gauges A1 to A4 on the arm front face 22a of the arm portion 22.

FIG. 7 illustrates, with use of the arm portion 21 parallel to the Y axis direction as an example, a manner in which strain gauges are disposed on an arm back face corresponding to the back side of the strain element 10, similarly to the case of FIG. 6. The disposition illustrated in FIG. 7 is one obtained by flipping the disposition illustrated in FIG. 6 about center line Y11 (center line of the arm back face, corresponding to the center line Y10 illustrated in FIG. 6).

Specifically, the strain gauges B1' and B3', of the four strain gauges B1' to B4', are positioned on the right-hand side of the center line Y11, and the strain gauges B2' and B4' of the four strain gauges B1' to B4' are positioned on the left-hand side of the center line Y11, such that the strain gauges B1' and B3' and the strain gauges B2' and B4' are symmetrical with respect to the center line Y11. Furthermore, the strain gauges B1' and B2' (corresponding to the first strain gauge and the second strain gauge) are disposed in an area close to the central portion 12 such that their respective detection directions K1' and K2' are parallel to the center line Y11. The strain gauges B3' and B4' (corresponding to the third strain gauge and the fourth strain gauge) are disposed in an area close to the frame portion 11 such that their detection directions K3' and K4' are at an angle to the center line Y11 so as to diverge away from each other with decreasing distance to the central portion 12. Note that the angle here is the same as that of FIG. 6, and is 45 degrees.

Note that square-shaped parts illustrated adjacent to each strain gauge, such as the strain gauge B1', illustrated in FIG. 7 are electrical connection parts, as with the case of FIG. 6. The manner of disposition has been discussed using the strain gauges B1' to B4' on the arm back face 21b of the arm portion 21 as an example. However, the same applies to the disposition of the strain gauges C1' to C4' on the arm back face 20b of the arm portion 20 and to the disposition of the strain gauges A1' to A4' on the arm back face 22b of the arm portion 22.

Figure 8:
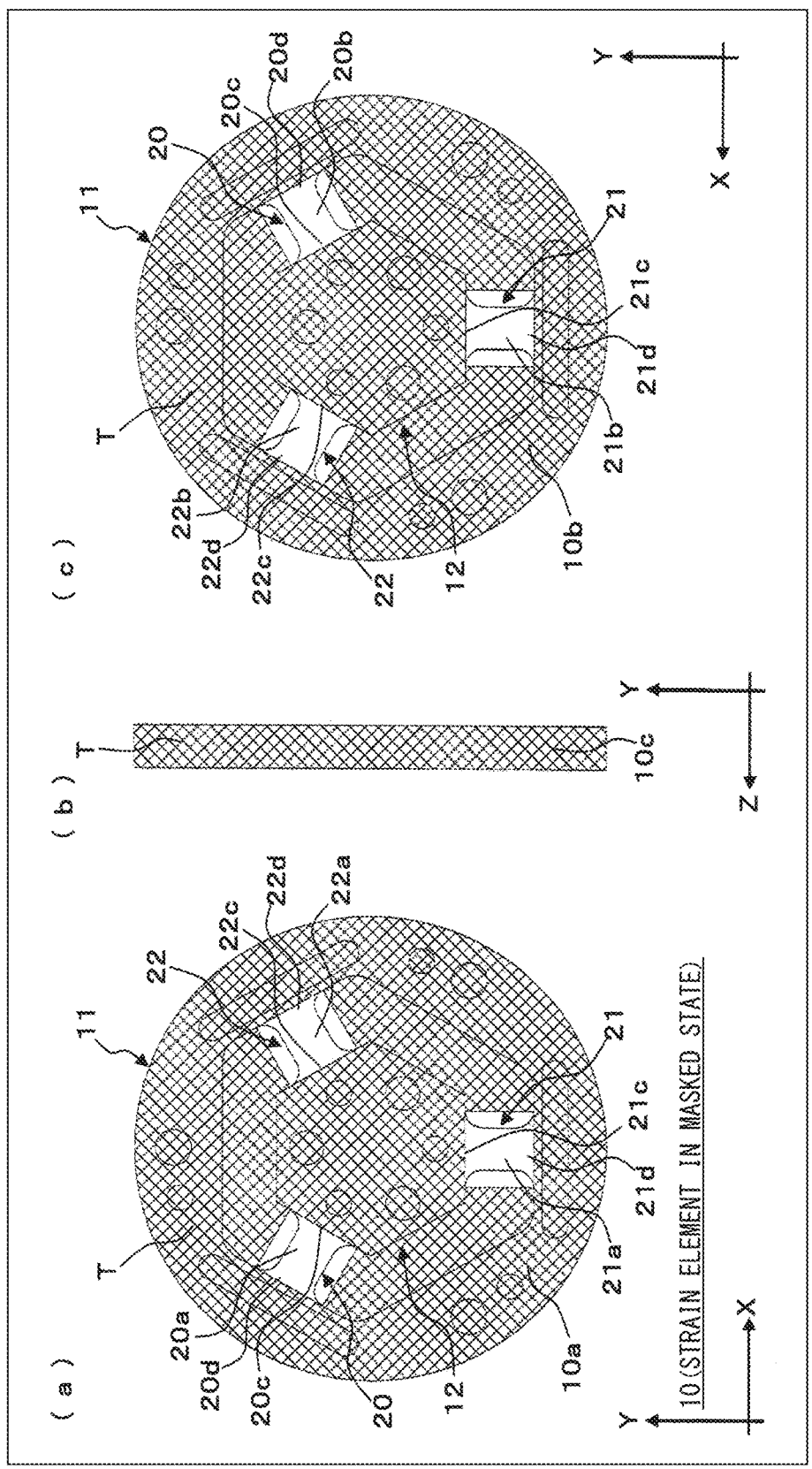
FIG. 8 illustrates the strain element which has been masked. (a) of FIG. 8 is a front view, (b) of FIG. 8 is a side view, and (c) of FIG. 8 is a back view.

(a) to (c) of FIG. 8 illustrate a masked state in a surface processing step of a process of producing the strain element 10 on which the strain gauges A1 to C4' are to be disposed (such a process corresponds to a method of producing a strain element in accordance with Embodiment 1 of the present invention). The strain element 10 itself is made mainly from a lightweight, elastically deformable metal material. For example, by cutting an aluminum-based material (such as A5052) or a stainless-steel-based material (such as SUS304) by machining, it is possible to form the material into the shape illustrated in the foregoing drawings such as FIGS. 4 and 5.

However, machining (cutting) alone is insufficient to avoid, for example, generation of burrs on peripheries of a processed product (unfinished strain element 10), and portions shaped like corners (corner portions) are likely to undergo stress concentration when a load (external force) is exerted. To address this, the step of corner easing is carried out with respect to a machined, processed product, and thereby burrs and the like are removed from edges, corners, and the like, at each of which two or more faces meet, of the peripheries of the processed product. Note that such corner easing may be carried out by any of slight chamfering, chamfering, or filleting; however, it is preferable that the corners of the portions that are likely to undergo stress concentration are eased by filleting to eliminate sharp corners and thereby the occurrence of stress concentration is prevented as much as possible.

In Embodiment 1, areas enclosed by dot-dot-dash lines illustrated in FIGS. 6 and 7 are filleted. Specifically, the strain element 10, which has a shape illustrated in the drawings such as FIGS. 4 and 5, is structured such that the frame portion 11 and the central portion 12 are connected by the arm portions 20 to 22. Corner portions (for example, corner portions corresponding to the areas enclosed by dot-dot-dash lines with signs 21g and 21h in FIGS. 6 and 7) at edges of a junction where the frame portion 11 and the arm portion 20, 21, or 22 connect to each other (the junction is, for example, the area indicated by sign 21d in FIGS. 6 and 7) are portions where stress concentration is likely to occur. Also, corner portions (for example, corner portions corresponding to the areas enclosed by dot-dot-dash lines with signs 21e and 21f in FIGS. 6 and 7) of edges of a junction where the central portion 12 and the arm portion 20, 21, or 22 connect to each other (the junction is, for example, the area indicated by sign 21c in FIGS. 6 and 7) are portions where stress concentration is likely to occur. Therefore, these corner portions corresponding to the areas with the signs 21e, 21f, 21g, and 21h, enclosed by dot-dot-dash lines, are filleted and stress concentration is to be reduced. Note that the radius of filleting can be a value within the range of about 0.1 to 0.3 mm, and, because of, for example, the relationship in dimensions between the strain element 10 and the arm portions 20 to 22, a value around 0.2 mm is preferred. Note that the radius of curvature (for example, the radius of curvature R corresponding to the sign 21e in FIGS. 6 and 7) of each of the corner portions indicated by the signs 21e to 21h illustrated in FIGS. 6 and 7 can have a value within the range of about 1.5 to 3.5 mm, and, in one example, a value of about 2 mm can be employed.

After the foregoing machining and corner easing are carried out, surface processing is carried out. Before the surface processing step is carried out, the strain element 10 is masked as illustrated in (a) to (c) of FIG. 8. Note that the cross-hatched areas in (a) to (c) of FIG. 8 correspond to masked areas. Also in the following descriptions, the cross-hatched areas correspond to masked areas.

In this masking step, the strain element 10 is masked by adhesive tape T except for the arm portions 20 to 22 which include areas for disposition of the strain gauges A1 to C4' (i.e., the frame portion 11 and the central portion 12 are masked). Note that side faces in the thickness direction, such as outwardly facing faces of the central portion 12, inwardly facing faces of the frame portion 11, and an outwardly facing face 10c of the strain element 10 (frame portion 11), are also masked. Therefore, with regard to each of the arm portions 20 to 22 which are left unmasked, an area extending from a corresponding one of central junctions 20c to 22c (where the arm portion connects to the central portion 12) to a corresponding one of outer junctions 20d to 22d (where the arm portion connects to the frame portion 11) of a corresponding one of the arm front faces 20a to 22a is exposed. Also, on each of the arm back faces 20b to 22b, an area extending from a corresponding one of the central junctions 20c to 22c to a corresponding one of the outer junctions 20d to 22d (where the arm portion connects to the frame portion 11) is exposed. Furthermore, opposite side faces of each of the arm portions 20 to 22 are also exposed. As such, all four sides of each of the arm portions 20 to 22 are exposed.

Next, the strain element 10 which has been masked is inserted into a shot blasting machine (or shot peening machine), and the step of projecting a shot material at the strain element 10 and thereby causing the shot material to collide with the strain element 10 is carried out. Examples of the shot material include abrasive grains, steel shots, steel grids, cut wires, glass beads, and organic matter. In this step, the four sides of each of the arm portions 20 to 22, which are left unmasked, are only struck directly with the shot material. Therefore, the four sides (surfaces) of each of the arm portions 20 to 22 undergo plastic deformation due to collision with the shot material, and a residual stress layer having compressive residual stress (negative residual stress) (compressive residual stress layer which will become a hardened surface layer) is formed. Also, the four sides (surfaces) of each of the arm portions 20 to 22 are given a surface roughness rougher than those of the masked areas.

In the above step, the shot material collides also with the masked areas; however, the force of the collision is weakened by the mask. Thus, the collision is indirect collision, and the residual stress occurring in the non-masked arm portions 20 to 22 is greater (in absolute value of the compressive residual stress) than those in the other masked portions. The main material for use in masking is preferably one that enables easy masking operation, like a tape material such as adhesive tape. However, any material that can cover the strain element and thereby alleviate the colliding force of the shot material can be employed (besides tape, various kinds of coating materials can be employed).

Note that the following description will discuss an example in which the projection was carried out (shot blasting was carried out) with respect to a stainless-steel-based member (SUS304) as the strain element 10 with use of abrasive grains as the shot material. On each of the arm portions 20 to 22, a residual stress layer having a −938 MPa residual stress (negative residual stress) is formed. Also, the surface roughness, whose value before processing was Rz (maximum roughness depth)=1.020 μm, became Rz=7.682 μm after the processing. The surface roughness after the processing was about 7 times as much as that before the processing.

With regard to the strain element 10 which has undergone such surface processing, on each of the non-masked arm portions 20 to 22, a residual stress layer having a negative residual stress greater in absolute value than those in the other masked portions was formed. With this, the arm portions 20 to 22 increase in fatigue strength against elastic deformation, fatigue life is prolonged, and this makes it possible to achieve a long-term stable use of the force sensor 1 (physical quantity measurement sensor).

Furthermore, the surface roughness of the arm portions 20 to 22 is rougher than those of portions other than the arm portions 20 to 22. Therefore, in a case where the strain gauges A1 to C4' are attached (bonded) with an adhesive to the arm front faces 20a to 22a and the arm back faces 20b to 22b of the arm portions 20 to 22 in the foregoing manners after the step of projecting the shot material, because of the roughness of the arm front faces 20a to 22a and the arm back faces 20b to 22b, the bonded strain gauges A1 to C4' are well anchored, and adhesiveness becomes greater than conventional techniques. With this, the strain gauges A1 to C4' are more likely to conform to elastic deformation of the arm portions 20 to 22, and the accuracy of detection by the strain gauges A1 to C4' improves.

Next, the following description will discuss how the foregoing table block 2, base block 6, and strain element 10 are assembled to form the force sensor 1 (see the drawings such as FIGS. 1 to 4). First, the strain element 10 and the base block 6 are stacked together such that a back face 10b of the strain element 10 (back face 11b of the frame portion 11) faces and makes contact with the back face 6b of the base block 6.

Before doing so, locating pins P are press-fit into the locating holes 9a to 9c of the base block 6. The strain element 10 and the base block 6 are positioned so that the locating pins P in the respective locating holes 9a to 9c are press-fit into the locating through-holes 19a to 19c in the frame portion 11 of the strain element 10 when the strain element 10 is placed on the base block 6, and then the strain element 10 and the base block 6 are stacked together (see FIG. 3). When the strain element 10 and the base block 6 are stacked together after they are positioned like above, the bolt through-holes 18a to 18c in the frame portion 11 of the strain element 10 are brought into a condition in which they are in communication with the screw holes 8a to 8c of the base block 6. Therefore, bolts N (hexagon socket head bolts) are put through the bolt through-holes 18a to 18c of the strain element 10 and fastened to the screw holes 8a to 8c of the base block 6, and the strain element 10 is fixed to the base block 6 such that the strain element 10 is placed on the base block 6 (see (b) of FIG. 2).

Next, the strain element 10 and the table block 2 are stacked together such that a front face 10a of the strain element 10 (front face 12a of the central portion 12) faces and makes contact with the back face 2b of the table block 2. Before doing so, locating pins P are press-fit into the locating through-holes 14a to 14c in the central portion 12 of the strain element 10. When the table block 2 is placed on the strain element 10, the table block 2 is placed on the strain element 10 such that the locating pins P in the respective locating through-holes 14a to 14c are press-fit into the locating through-holes 4a to 4c in the table block 2.

When the table block 2 and the strain element 10 are stacked together such that they are positioned like above, the bolt through-holes 3a to 3c in the table block 2 are brought into a condition in which they are in communication with the screw through-holes 13a to 13c of the strain element 10. Therefore, bolts N (hexagon socket head bolts) are put through the bolt through-holes 3a to 3c of the table block 2 and fastened to the screw through-holes 13a to 13c of the strain element. The table block 2 is fixed to and attached to the strain element 10 in a state in which the table block 2 is placed on the strain element 10, thereby completing the force sensor 1.

The general shape of the finished force sensor 1 is in the form of a cylinder as shown in (a) of FIG. 2. On the other hand, the table block 2 is shaped such that, as described earlier, the center portion 2d of the back face 2b protrudes more than the peripheral portion of the back face 2b. Because of this, there is clearance S between the peripheral portion of the table block 2 and the front face 10a of the strain element 10 (front face 11a of the frame portion 11).

Then, with regard to the finished force sensor 1, the front face 6a of the base block 6 is attached to an end face at an end portion of an industrial robot arm, and the front face 2a of the table block 2 is attached to a back end face of a robot hand. Then, when the industrial robot arm operates and the robot hand grabs an object such as a workpiece, a load (external force) caused by an impact resulting from the grabbing or the like is transmitted from the robot hand to the table block 2. The load having been transmitted to the table block 2 is transmitted to the central portion 12, of the strain element 10, which is in contact with the center portion 2d of the table block 2.

The central portion 12 of the strain element 10 is a rigid body having a predetermined rigidity, whereas the frame portion 11 of the strain element 10 is also fixed to the base block 6. Therefore, the load having been transmitted to the central portion 12 as described above is exerted on the arm portions 20 to 22, which are lower in rigidity than the central portion 12 and the frame portion 11. With this, the arm portions 20 to 22 elastically deform. The manner in which the arm portions 20 to 22 elastically deform depends on the area of the central portion 12 of the strain element 10 to which the load is transmitted. For example, when the central portion 12 receives a depressing load at or near the junction where the central portion 12 connects to the arm portion 20, the arm portion 20 elastically deforms in a manner such that its portion connected to the central portion 12 flexes toward the base block 6. On the contrary, the other arm portions 21 and 22 elastically deform in a manner such that their portion connected to the central portion 12 flexes toward the table block 2.

According to the strain element 10 in accordance with Embodiment 1 of the present invention, even if the arm portions 20 to 22 elastically deform repeatedly, each of the arm portions 20 to 22 has a residual stress layer formed on its four sides as described earlier. Therefore, the strain element 10 is less likely to undergo fatigue failure over a long period of time. Furthermore, as described earlier, in the strain element 10, the strain gauges A1 to C4' disposed on the arm portions 20 to 22 are good at conforming to elastic deformation of the arm portions 20 to 22.

The degree of flexion of the arm portions 20 to 22, which are elastically deformable under a load, is detected by the strain gauges A1 to C4' disposed on the arm portions 20 to 22. With this, at the force sensor 1, forces and moments in respective directions (six-axis forces) exerted on the central portion 12 of the strain element 10 are measured. The six-axis forces measured include: force Fx in the X axis direction; force Fy in the Y axis direction; force Fz in the Z axis direction; moment Mx about the X axis direction; moment My about the Y axis direction; and moment Mz about the Z axis direction, which are exerted on the central portion 12. Next, an electrical system for measurement of these six-axis forces is discussed.

Figure 9:
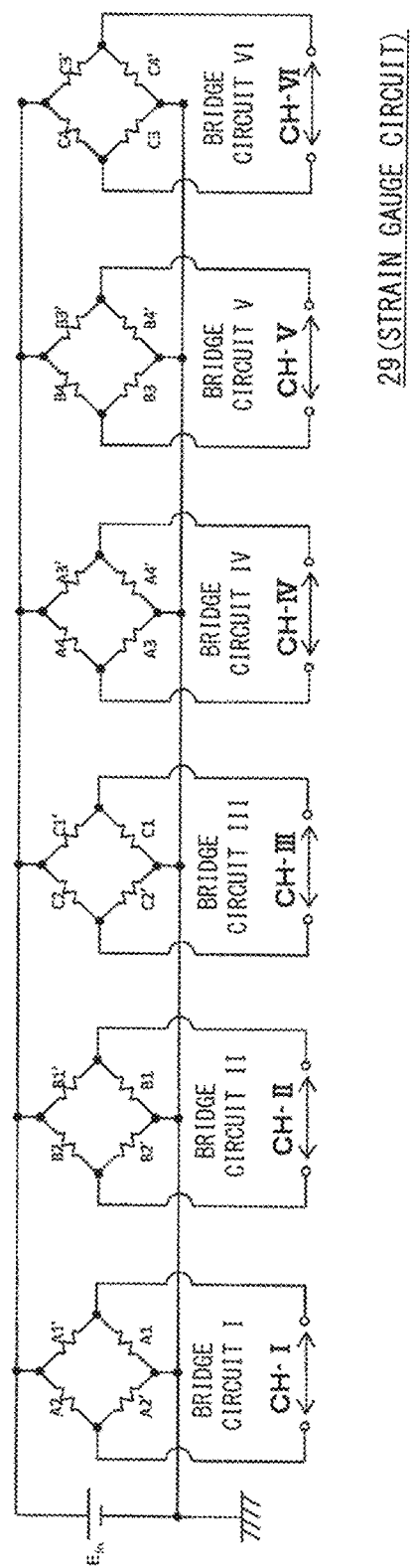
FIG. 9 is a circuit diagram for a strain gauge circuit, illustrating a manner in which strain gauges are electrically connected.

FIG. 9 is a circuit diagram for a strain gauge circuit 29, illustrating a manner in which the twenty-four strain gauges A1 to C4' disposed on the strain element 10 as described earlier are electrically connected. The strain gauge circuit 29, in which the twenty-four strain gauges A1 to C4' are connected, includes six bridge circuits I to VI. Each of the first to third bridge circuits I to III is a bridge circuit constituted by strain gauges, which are disposed in areas close to the central portion 12, of the strain gauges disposed on the arm portions 20 to 22. Each of the fourth to sixth bridge circuits IV to VI is a bridge circuit constituted by strain gauges, which are disposed in areas close to the frame portion 11, of the strain gauges disposed on the arm portions 20 to 22.

Specifically, the first bridge circuit I is a bridge circuit in which the strain gauges A1 and A2 (which are disposed in the area close to the central portion 12 on the arm front face 22a of the arm portion 22) and the strain gauges A1' and A2' (which are disposed in the area close to the central portion 12 on the arm back face 22b of the arm portion 22) are connected together. In the first bridge circuit I illustrated in FIG. 9, the manner of connection is such that the strain gauges A1 and A2 are opposite each other and the strain gauges A1' and A2' are opposite each other (the second bridge circuit II and the third bridge circuit III also employ similar manners of connection.)

The second bridge circuit II is a bridge circuit in which the strain gauges B1 and B2 (which are disposed in the area close to the central portion 12 on the arm front face 21a of the arm portion 21) and the strain gauges B1' and B2' (which are disposed in the area close to the central portion 12 on the arm back face 21b of the arm portion 21) are connected together. The third bridge circuit III is a bridge circuit in which the strain gauges C1 and C2 (which are disposed in the area close to the central portion 12 on the arm front face 20a of the arm portion 20) and the strain gauges C1' and C2' (which are disposed in the area close to the central portion 12 on the arm back face 20b of the arm portion 20) are connected together.

Furthermore, the fourth bridge circuit IV is a bridge circuit in which the strain gauges A3 and A4 (which are disposed in the area close to the frame portion 11 on the arm front face 22a of the arm portion 22) and the strain gauges A3' and A4' (which are disposed in the area close to the frame portion 11 on the arm back face 22b of the arm portion 22) are connected together. In the fourth bridge circuit I illustrated in FIG. 9, the manner of connection is such that the strain gauges A3 and A3' are opposite each other and the strain gauges A4 and A4' are opposite each other (the second bridge circuit II and the third bridge circuit III also employ similar manners of connection.)

The fifth bridge circuit V is a bridge circuit in which the strain gauges B3 and B4 (which are disposed in the area close to the frame portion 11 on the arm front face 21a of the arm portion 21) and the strain gauges B3' and B4' (which are disposed in the area close to the frame portion 11 on the arm back face 21b of the arm portion 21) are connected together. The sixth bridge circuit VI is a bridge circuit in which the strain gauges C3 and C4 (which are disposed in the area close to the frame portion 11 on the arm front face 20a of the arm portion 20) and the strain gauges C3' and C4' (which are disposed in the area close to the frame portion 11 on the arm back face 20b of the arm portion 20) are connected together.

The above-described strain gauge circuit 29 is arranged such that an input power supply voltage Ein is applied to each of the bridge circuits I to VI. Then, during the application of this voltage, the first bridge circuit I outputs an output voltage signal CH-I through its output terminal. Similarly, the second bridge circuit II outputs an output voltage signal CH-II, the third bridge circuit III outputs an output voltage signal CH-III, the fourth bridge circuit IV outputs an output voltage signal CH-IV, the fifth bridge circuit V outputs an output voltage signal CH-V, and the sixth bridge circuit VI outputs an output voltage signal CH-VI.

Figure 10:
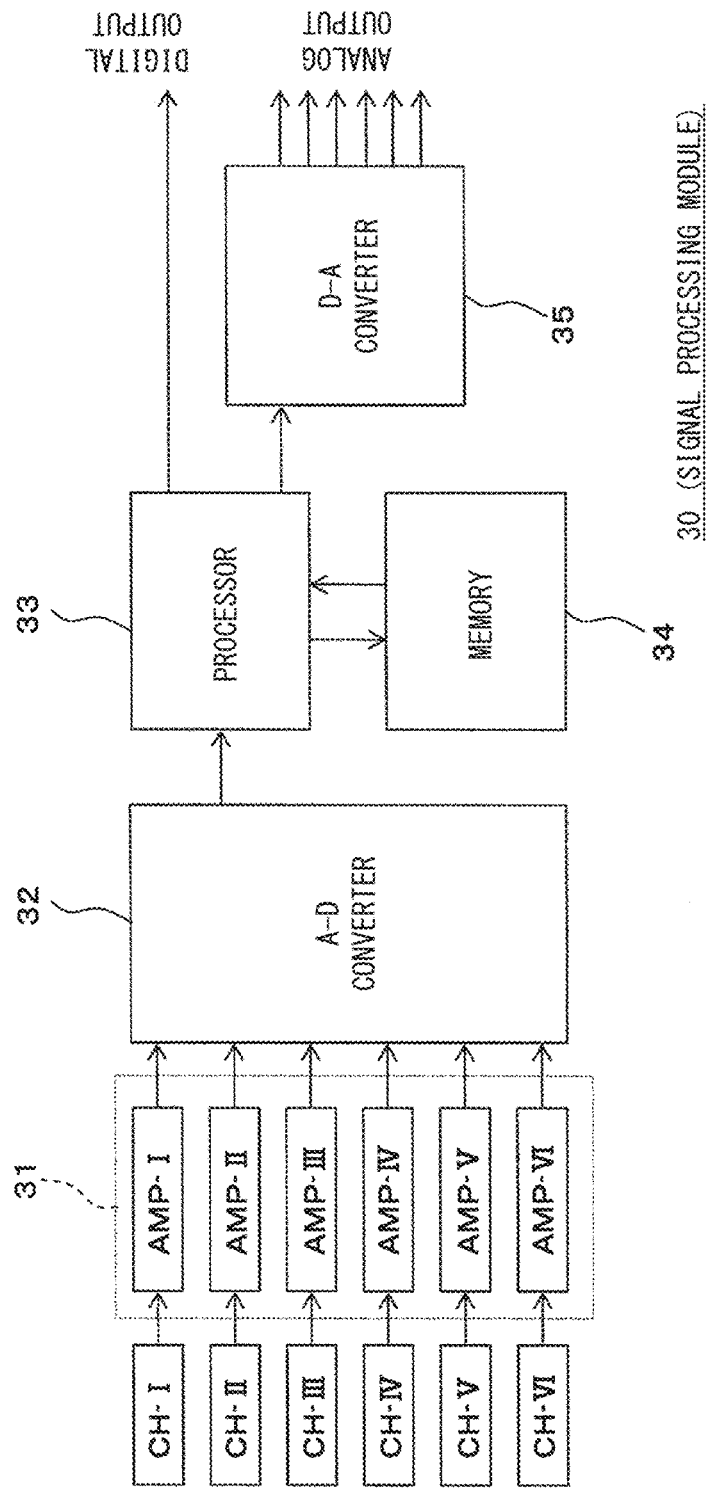
FIG. 10 is a block diagram illustrating an internal configuration of main parts of a signal processing module, which processes output voltage signals from the strain gauge circuit.

FIG. 10 is a block diagram illustrating an internal configuration of main parts of a signal processing module 30, which processes the output voltage signals CH—I to CH-VI outputted from the foregoing strain gauge circuit 29 illustrated in FIG. 9. The signal processing module 30 includes an amplifier 31, an A-D converter 32, a processor 33, a memory 34, and a D-A converter 35. The amplifier 31 is electrically connected to the output terminal of the strain gauge circuit 29 illustrated in FIG. 9, and contains AMP-I to AMP-VI for individually amplifying the output voltage signals CH—I to CH-VI from the strain gauge circuit 29, respectively.

Amplified signals (analog signals) amplified by the AMP-I to AMP-VI of the amplifier 31, respectively, are converted into digital signals through the A-D converter 32, and then inputted to the processor 33. The processor 33 serves to carry out a process of calculating the foregoing six-axis forces (Fx, Fy, Fz, Mx, My, and Mz) exerted on the central portion 12 of the strain element 10. The forces are the results of measurement by the force sensor 1. The processor 33 carries out the calculation process based on the following equation (1) while referring to a calibration matrix C stored in the memory 34.

$$F = C \times E \tag{1}$$

In the equation (1) above, F is a matrix of equation (2) below, which represents the foregoing six-axis forces (Fx, Fy, Fz, Mx, My, and Mz) exerted on the central portion 12. C is a calibration matrix of equation (3) below. E is a matrix of values obtained by converting the output voltage signals CH—I to CH-VI of the strain gauge circuit 29 from analog to digital (see equation (4) below).

$$F = \begin{pmatrix} Fx \\ Fy \\ Fz \\ Mx \\ My \\ Mz \end{pmatrix} \tag{2}$$

$$C = \begin{pmatrix} C_{11} & C_{12} & C_{13} & C_{14} & C_{15} & C_{16} \\ C_{21} & C_{22} & C_{23} & C_{24} & C_{25} & C_{25} \\ C_{31} & C_{32} & C_{33} & C_{34} & C_{35} & C_{36} \\ C_{41} & C_{42} & C_{43} & C_{44} & C_{45} & C_{46} \\ C_{51} & C_{52} & C_{53} & C_{54} & C_{55} & C_{56} \\ C_{61} & C_{62} & C_{63} & C_{64} & C_{65} & C_{66} \end{pmatrix} \tag{3}$$

$$E = \begin{pmatrix} E_{11} \\ E_{21} \\ E_{31} \\ E_{41} \\ E_{51} \\ E_{61} \end{pmatrix} \tag{4}$$

Note that, in the calibration matrix C represented by the above equation (3), values (pre-calculated values) specific to each force sensor are used. Specifically, specific values of the elements of the calibration matrix C are found from (i) conditions in which the six-axis forces (Fx, Fy, Fz, Mx, My, and Mz) are exerted on the force sensor and (ii) the results of detection by the strain gauges A1 to C4' associated with elastic deformation of the arm portions 20 to 22 in those conditions.

As shown in the foregoing equation (1), the processor 33 multiplies the calibration matrix C of the equation (3) by the matrix E of the A-D converted values which are based on the output voltage signals from the A-D converter 32, and thereby finds F which is a matrix of the six-axis forces (Fx, Fy, Fz, Mx, My, and Mz). The processor 33 makes it possible to output the result of the calculation (corresponding to physical quantity corresponding to elastic deformation of the strain element 10 under a load) as a digital signal. The processor 33 also makes it possible to output the result of the calculation by analog signal through the D-A converter 35. Such an output value (output value by digital or analog signal) serves as a physical quantity measured by the force sensor 1.

Note that the signal processing module 30 illustrated in FIG. 10 is disposed in the hollow 6c of the base block 6 of the force sensor 1 (see (b) of FIG. 2). Also, the signal processing module 30 is arranged such that lead wires for transmission of the output signal from the processor 33 and the output signal from the D-A converter 35 extend outward through a cutout 6e in a peripheral wall 6d of the base block 6 (see (a) of FIG. 2).

(a) to (f) of FIG. 11 are tables for the respective bridge circuits I to VI, in each of which, with regard to the foregoing force sensor 1, cases where an external force and/or a moment (Fx, Fy, Fz, Mx, My, and/or Mz) is/are applied to the table block 2 with the base block 6 fixed are compared with no-load conditions. The tables show how the resistances of the strain gauges A1 to C4' change and whether or not voltage values of the output voltage signals CH—I to CH-V from the bridge circuits I to VI have changed, that is, whether or not there is unbalanced output.

In the force sensor 1, in a case where the external force Fy in the Y axis direction is exerted on the central portion 12 while the frame portion 11 is fixed, forces act on the arm portions 20 and 22 and the arm portions 20 and 22 become deformed; however, strain does not occur in the arm portion 21 because the junction where the arm portion 21 connects to the frame portion 11, near the through-opening 26, flexes. In a case where the external force Fx in the X axis direction is exerted on the central portion 12 while the frame portion 11 is fixed, forces act on the arm portions 20 to 22, respectively, and strain occurs. In a case where the external force Fz in the Z axis direction is exerted on the central portion 12 while the frame portion 11 is fixed, the arm portions 20 to 22 flex in a uniform manner.

Furthermore, in the force sensor 1, in a case where the moment My about the Y axis direction is exerted on the central portion 12 while the frame portion 11 is fixed, the arm portion 21 is merely twisted and does not flex, whereas moments act on the arm portions 20 and 22 and the arm portions 20 and 22 flex. In a case where the moment Mx about the X axis direction is exerted on the central portion 12 while the frame portion 11 is fixed, moments act on the arm portions 20 to 22, respectively, and the arm portions 20 to 22 flex. In a case where the moment Mz about the Z axis direction is exerted on the central portion 12 while the frame portion 11 is fixed, the arm portions 20 to 22 flex in a uniform manner.

As has been described, according to the force sensor 1 in accordance with Embodiment 1, a compressive residual stress layer (layer having negative residual stress) is formed on surfaces (four sides) of each of the arm portions 20 to 22 of the strain element 10, and therefore the force sensor 1 has improved metal fatigue strength associated with elastic deformation. Furthermore, since stress concentration is reduced in corner portions at edges of junctions where the respective arm portions 20 to 22 connect to the frame portion 11 and in corner portions at edges of junctions where the respective arm portions 20 to 22 connect to the central portion 12, working life of the force sensor 1 as a whole as a sensor is longer than conventional sensors. Furthermore, in the force sensor 1 in accordance with Embodiment 1, the strain gauges A1 to C4' disposed on the arm portions 20 to 22 are good at conforming to the arm portions 20 to 22 when the arm portions 20 to 22 elastically deform. Therefore, when the arm portions 20 to 22 elastically deform, sliding is less likely to occur between the strain gauges A1 to C4' and the arm portions 20 to 22, and thereby measurement accuracy is improved as compared to conventional sensors. In addition, since the strain gauges A1 to C4' are disposed in a special manner (see the disposition of the strain gauges B3, B4, B3' and B4' and the like in FIGS. 6 and 7), the accuracy of detection and measurement concerning strain when the moment and external force in and about Mz, Fx, and Fy directions are exerted is improved as compared to conventional sensors. Note that the present invention is not limited to the foregoing statements in Embodiment 1, and various variations are available.

For example, the foregoing description discussed a case in which the force sensor 1 is attached to an industrial robot arm; however, needless to say, for example, besides the industrial robot arm, the force sensor 1 can be used in applications such as tactile sensing by a remote-controlled robot and detection of resistance/external force exerted on wind tunnel test model. Furthermore, according to the foregoing description, the base block 6 and the frame portion 11 of the strain element 10 of the force sensor 1 are fixed, whereas the table block 2 and the central portion 12 of the strain element 10 serve to receive an external force (load). However, such conditions may be reversed so that the table block 2 and the central portion 12 of the strain element 10 are fixed whereas the base block 6 and the frame portion 11 of the strain element 10 serve to receive an external force and thereby the force sensor 1 may be used in applications of measurement subjects. Moreover, as the outer circumference of the central portion 12, besides the shape of substantially a hexagon, some other polygonal shape, circular shape, or the like shape may be employed.

Furthermore, the foregoing manner in which the strain gauges A1 to C4' are disposed on the arm portions 20 to 22 (see FIGS. 6 and 7) is an example, and, needless to say, some other manner of disposition can be employed. For example, with regard to the strain gauges A3 and A4 and the like disposed in the area close to the frame portion 11, such strain gauges may be at an angle (at an angle of 45 degrees to the center line Y10) so as to diverge away from each other with decreasing distance to the frame portion 11, instead of being disposed so as to diverge away from each other with decreasing distance to the central portion 12 (see FIGS. 1 to 3 and 7 to 10 of Patent Literature 1). Furthermore, in the foregoing descriptions, the strain gauges A1 to C4', which are of a type in which a strain gauge main material is deposited on a base material for a strain gauge, are bonded to the arm portions 20 to 22 with an adhesive. However, strain gauges made of a thin metal film may be formed by directly or indirectly forming a film by vacuum deposition, sputtering method, or the like on the front faces and the back faces of the arm portions 20 to 22.

Moreover, a residual stress layer may be formed on the four sides of each of the arm portions 20 to 22 by, instead of shot peening by which a shot material is allowed to collide, laser peening by which laser light (laser beam) is applied. Also in a case of carrying out laser peening, masking for blocking laser is put on the areas illustrated in FIG. 8 (cross-hatched areas). However, in a case where an apparats capable of controlling the range (area) irradiated with laser is used, masking is not necessary, and laser peening is carried out by controlling the apparatus so that laser is applied only to the four sides of each of the arm portions 20 to 22.

Furthermore, the three through-openings 25, 26, and 27 in the frame portion 11 may be omitted, provided that the condition is such that the arm portions 20 to 22 are likely to elastically deform near the frame portion 11. The condition in which the arm portions 20 to 22 are likely to elastically deform is, for example, a case in which the dimensions of the arm portions 20 to 22 in the direction of their extension are long in relation to the diameter of strain element 10, sizes of the first space 15 to the third space 17 between the frame portion 11 and the central portion 12, and the like. Other examples include a case in which the width of each arm portion orthogonal to the direction of extension is small and a case in which the thickness of each arm portion is small.

(a) and (b) of FIG. 12 illustrate a strain element 10' in accordance with a variation. The strain element 10' in accordance with the variation is the same in the main configuration and the like as the foregoing strain element 10 illustrated in FIGS. 4 and 5, and includes a frame portion 11', a central portion 12', and arm portions 20' to 22' (strain gauges are disposed on arm portions). A difference is that the strain element 10' in accordance with the variation does not have the through-openings 25, 26, and 27 of the frame portion 11 illustrated in FIGS. 4 and 5 but has near-center through-openings 50' to 52' (corresponding to second through-openings) formed in the central portion 12'.

The near-center through-openings 50' to 52', in the central portion 12', are provided between (i) locating through-holes 14$a'$ to 14$c'$ provided in areas corresponding to the extensions of the respective arm portions 20' to 22' extending toward the central portion 12' and (ii) central junctions 20$c'$ to 22$c'$ where the respective arm portions 20' to 22' connect to the central portion 12'. Each of the near-center through-openings 50' to 52' is in the form of a straight line, and is in parallel to and slightly shorter than a corresponding one of outer peripheral edge portions 12$c'$, 12$d'$, and 12$e'$ which form the outer contour of the hexagonal central portion 12'.

In the strain element 10' in accordance with the variation, the central portion 12' has the foregoing near-center through-openings 50' to 52', and thereby deformability of the arm portions 20' to 22' in stretch directions corresponding to the directions of extension of the arm portions 20' to 22' is reduced. This makes it possible to ensure detection accuracy in the stretch directions. Also, the central junctions 20$c'$ to 22$c'$, where the respective arm portions 20' to 22' connect to the central portion 12', have a smaller rigidity than in the case of the strain element 10 illustrated in the drawings such as FIG. 4, and are capable of sensitively detecting strain even when a load is small.

(a) and (b) of FIG. 13 illustrate a strain element 10" in accordance with another variation. The strain element 10" in accordance with another variation is the same in the main configuration and the like as the strain element 10 illustrated in FIGS. 4 and 5. Also, a frame portion 11" has through-openings 25" to 27" corresponding to the through-openings 25 to 27 of the frame portion 11 which are characteristic of the strain element 10. Also, a central portion 12" has near-center through-openings 50" to 52" corresponding to the near-center through-openings 50' to 52' of the central portion 12' which are characteristic of the strain element 10' of Variation 10 illustrated in (a) and (b) of FIG. 12.

The strain element 10" has the through-openings 25" to 27" in the frame portion 11" and has the near-center through-openings 50" to 52" (second through-openings provided between locating through-holes 14$a"$ to 14$c"$ and junctions where the respective arm portions 20" to 22" connect to the central portion 12") in the central portion 12". This achieves both the advantage provided by the foregoing through-openings 25 to 27 of the strain element 10 and the advantage provided by the near-center through-openings 50' to 52' of the strain element 10'. This is particularly preferable in a case where, for example, measurement of a small external force is carried out. This is because the strain element 10" is arranged such that: the deformability of the arm portions 20" to 22" in stretch directions corresponding to the directions of extension of the arm portions 20" to 22" is further reduced; and that the opposite ends of each of the arm portions 20"

to 22″ are relatively smaller in rigidity and elastically deform more sensitively in response to an external force (load).

In the strain element 10 illustrated in FIGS. 4 and 5, in the strain element 10' illustrated in FIG. 12, and in the strain element 10″ illustrated in FIG. 13, the three locating through-holes 14a to 14c, the three locating through-holes 14a' to 14c', and the three locating through-holes 14a″ to 14c″ are provided in the central portions 12, 12', and 12″, respectively. Note, however, that the number of locating through-holes can be reduced to two, depending on specifications (for example, in the strain elements 10, 10', and 10″, the locating through-holes 14c, 14c', and 14c″ can be omitted, respectively. See locating through-holes 114a and 114b of a strain element 110 in accordance with Embodiment 2 illustrated in FIGS. 19 and 20 described later). As such, when the number of locating through-holes is two, it is possible to, for example, reduce the number of processing areas and the number of man-hours for assembly. Note that, in a case where the number of locating through-holes of a strain element (for example, strain element 10) is reduced, a locating through-hole (for example, locating through-hole 4c) of the table block 2 corresponding to that omitted locating through-hole (for example, locating through-hole 14c) is also omitted.

Moreover, in the above descriptions, the number of hand-attaching screw holes for attachment of a robot hand to the table block 2 is three in total (the hand-attaching screw holes 5a to 5c). However, in a case where it is necessary to attach the robot hand more firmly, four hand-attaching screw holes may be provided in a circumferential direction so as to be spaced apart from each other by 90 degrees (see hand-attaching screw through-holes 105a to 105d of a table block 102 of the force sensor 101 in accordance with Embodiment 2 illustrated in FIG. 16 described later). Similarly, also with regard to the three arm-attaching screw holes 7a to 7c for attachment of the base block 6 to the robot arm, in a case where it is necessary to attach the base block 6 to the robot arm more firmly, four arm-attaching screw holes may be provided in a circumferential direction so as to be spaced apart from each other by 90 degrees.

(a) to (c) of FIG. 14 illustrate a variation of masking of the strain element 10, in which non-masked portions are broader than those of the masked strain element 10 illustrated in (a) to (c) of FIG. 8. Specifically, areas including the outer peripheral edge portions 12c, 12d, and 12e, where the respective central junctions 20c to 22c (which are the central portion 12-side ends of the respective arm portions 20 to 22) connect to the central portion 12, are also left unmasked. These areas including the outer peripheral edge portions 12c, 12d, and 12e, where the respective central junctions 20c to 22c (which are the central portion 12-side ends of the respective arm portions 20 to 22) connect to the central portion 12, are areas in the form of straight lines parallel to the edges corresponding to the outer peripheral edge portions 12c, 12d, and 12e. Furthermore, areas including the inner peripheral edge portions 11c, 11d, and 11e, where respective outer junctions 20d to 22d (which are the frame portion 11-side ends of the respective arm portions 20 to 22) connect to the frame portion 11 (such areas are areas in the form of straight lines parallel to the edges corresponding to the inner peripheral edge portions 11c, 11d, and 11e), are also left unmasked.

Specifically, the central junctions 20c to 22c and the outer junctions 20d to 22d, from which the arm portions 20 to 22 extend, are likely to undergo stress concentration. Because of this, there is a tendency that the vicinities of the outer peripheral edge portions 12c, 12d, and 12e of the central portion 12, where the respective central junctions 20c to 22c connect to the central portion 12, and the vicinities of the inner peripheral edge portions 11c, 11d, and 11e of the frame portion 11, where the respective junctions 20d to 22d connect to the frame portion 11, are also subjected to a large burden due to stress concentration. To address this, the step of projecting a shot material at the strain element 10 may be carried out under a condition in which, as illustrated in (a) to (c) of FIG. 14, the areas including the outer peripheral edge portions 12c, 12d, and 12e and the areas including the inner peripheral edge portions 11c, 11d, and 11e are also left unmasked. With this, a residual stress layer having negative residual stress is formed also in the areas corresponding to these edge portions, and the resistance to fatigue failure resulting from elastic deformation can be further improved. Note that, in this variation, the linear areas parallel to the edges corresponding to the respective inner peripheral edge portions 11c to 11e and outer peripheral edge portions 12c to 12e are also included in strain portions in addition to the arm portions 20 to 22.

(a) to (c) of FIG. 15 illustrate another variation of masking of the strain element 10, in which non-masked portions are even broader than the variation illustrated in (a) to (c) of FIG. 14. Specifically, areas including corners of edges of the outer peripheral edge portions 12c, 12d, and 12e, where the respective central junctions 20c to 22c of the respective arm portions 20 to 22 connect to the central portion 12, are also left unmasked. These areas including the corners of the edges of the outer peripheral edge portions 12c, 12d, and 12e, where the respective central junctions 20c to 22c of the respective arm portions 20 to 22 connect to the central portion 12, are areas each in the form of a straight line including the opposite corners of the edge of a corresponding one of the outer peripheral edge portions 12c, 12d, and 12e. Furthermore, areas of the inner peripheral edge portions 11c, 11d, and 11e (where the outer junctions 20d to 22d of the respective arm portions 20 to 22 connect to the frame portion 11), corresponding to the regions in longitudinal directions of the respective through-openings 25 to 27, are also left unmasked. These areas of the inner peripheral edge portions 11c, 11d, and 11e (where the respective outer junctions 20d to 22d of the respective arm portions 20 to 22 connect to the frame portion 11), corresponding to the regions in the longitudinal directions of the respective through-openings 25 to 27, are areas in the form of straight lines corresponding to the regions in the longitudinal directions of the respective through-openings 25 to 27, near the inner peripheral edge portions 11c, 11d, and 11e.

As described earlier with regard to the variation of masking in (a) to (c) of FIG. 14, the vicinities of the outer peripheral edge portions 12c, 12d, and 12e of the central portion 12 are structurally subjected to a large burden due to stress concentration. Similarly, the vicinities of the inner peripheral edge portions 11c, 11d, and 11e of the frame portion 11 are likely to undergo stress concentration due to the presence of the through-openings 25 to 27 in the form of slots. To address this, the step of projecting a shot material at the strain element 10 may be carried out under a condition in which, as illustrated in (a) to (c) of FIG. 15, the areas including corners of edges of the outer peripheral edge portions 12c, 12d, and 12e are also left unmasked. The step of projecting a shot material at the strain element 10 may be carried out under a condition in which also the areas including the regions of the inner peripheral edge portions 11c, 11d, and 11e corresponding to the longitudinal directions of the through-openings 25 to 27 are also left unmasked. With this, a residual stress layer having negative residual stress is formed also in these areas, and the resistance to fatigue failure resulting from elastic deformation can be further improved. Note that, in this variation, non-masked portions of the inner peripheral edge portions 11c to 11e and outer peripheral edge portions 12c to 12e are also included in strain portions.

Embodiment 2

FIGS. 16 to 18 illustrate a force sensor 101, which is a specific example of a physical quantity measurement sensor in accordance with Embodiment 2 of the present invention. The force sensor 101 in accordance with Embodiment 2 is for application in an industrial robot arm, similarly to the force sensor 1 in accordance with Embodiment 1 illustrated in the drawings such as FIG. 1. Note, however, that the force sensor 101 in accordance with Embodiment 2 is characterized as employing a strain element 110 (see FIGS. 17 to 20) which is a single member serving both as the strain element 10 and the base block 6 of the force sensor 1 in accordance with Embodiment 1. The force sensor 101 in accordance with Embodiment 2, which employs such a structure, thereby also achieves a reduction in parts count, a reduction in the number of man-hours for assembly, a reduction in dimension in the Z axis direction, improvement in mountability of an electrical system board, and a reduction in the number of man-hours for processing, as compared to the force sensor 1 in accordance with Embodiment 1. The following description will discuss the force sensor 101 in accordance with Embodiment 2 in detail. Note that the X, Y, and Z axis directions in Embodiment 2 are the same as those of Embodiment 1.

As illustrated in (a) and (b) of FIG. 17, the force sensor 101 is configured such that a table block 102 located on a robot-hand side (front side) and a strain element 110 located on a robot-arm side (back side) are stacked together.

The table block 102 is constituted by a disk-shaped member having a certain thickness, is in the shape of a circle when viewed from front side (see (a) of FIG. 16), and has many holes (through-holes) in a flat front face 102a corresponding to the front side. Specifically, the table block 102 has, in the vicinity of the center of a circle, bolt through-holes 103a, 103b, and 103c (countersunk through-holes for passage of bolts) which are arranged to form an equilateral triangle symmetrical with respect to center line Y2 in the height direction. Also, the table block 102 has locating holes 104a and 104b (holes with fit tolerance) on the left-hand side of the bolt through-hole 103a and below the bolt through-hole 103a.

The table block 102 further has hand-attaching screw through-holes 105a, 105b, 105c, and 105d (internally threaded through-holes) which are arranged in the vicinity of the outer circumference to substantially form a square. These hand-attaching screw through-holes 105a, 105b, 105c, and 105d are used for attachment to the robot hand. The table block 102 further has hand-locating holes 104d and 104e on a horizontal line orthogonal to the center line Y2 extending in the height direction such that the hand-locating holes 104d and 104e are symmetrical with respect to the center line Y2. These hand-locating holes 104d and 104e are used for positioning relative to the robot hand. Furthermore, the table block 102 is shaped such that, in the back face 102d, there is a hollow 102c with a rim portion 102f remaining (see (b) of FIG. 17).

On the other hand, the strain element 110 is, as also illustrated in FIGS. 19 and 20, constituted by a disk-shaped member which is thicker than the strain element 10 in accordance with Embodiment 1. The strain element 110 has a circular outer circumference when seen front side (see (a) of FIG. 19) and from back side (see FIG. 20), similarly to the strain element 10 in accordance with Embodiment 1. The strain element 110 is structured such that the central portion 112 and the frame portion 111 surrounding the central portion 112 are connected by three arm portions 120, 121, and 122 (corresponding to strain portions) (see (a) of FIG. 19 and FIG. 20). Note that the configurations of the arm portions 120 to 122 are basically the same as those of Embodiment 1, and elastically deform in response to an external load or moment. The strain element 110 in accordance with Embodiment 2 is characterized in that the dimension in the Z axis direction (thickness) is greater than that of Embodiment 1 and that the central portion 112 protrudes from the front face 110a of the strain element 110. Another characteristic is, for example, the back face 110b has a cavity 110e in the form of a recess in the central area excluding the peripheral area.

The central portion 112 has screw through-holes 113a, 113b, and 113c (internally threaded through-holes) which are arranged to form an equilateral triangle and locating through-holes 114a and 114b (through-holes with fit tolerance) in the vicinities of junctions where the central portion 112 connects to the respective arm portions 120 and 121. The screw through-holes 113a to 113c correspond to the foregoing bolt through-holes 103a to 103c of the table block 102, whereas the locating through-holes 114a and 114b correspond to the locating holes 104a and 104b of the table block 102. Furthermore, the central portion 112, whose outline is in the shape of substantially a hexagon, is connected to the arm portions 120, 121, and 122 at middle portions of respective outer peripheral edge portions 112c, 112d, and 112e, which are three of the six edges of the hexagon and which do not face the screw through-holes 113a, 113b, and 113c.

The frame portion 111 has an outer contour in the form of a circle, and an inner contour in the form of a hexagon which is obtained by uniformly enlarging the contour of the foregoing central portion 112. Furthermore, the frame portion 111 has bolt through-holes 118a, 118b, 118c, and 118d which are arranged to from a quadrangle. Furthermore, the frame portion 111 is connected to the arm portions 120, 121, and 122 at middle portions of respective inner peripheral edge portions 111c, 111d, and 111e located opposite the respective outer peripheral edge portions 112c, 112d, and 112e of the foregoing central portion 112. Because of the presence of such arm portions 120, 121, and 122, the space between the frame portion 111 and the central portion 112 is divided into three, resulting in formation of a first space 115, a second space 116, and a third space 117.

The frame portion 111 further has three through-openings 125, 126, and 127 (each corresponding to first through-opening) in the junctions where the frame portion 111 connects to the respective arm portions 120 to 122. These through-openings 125 to 127 are in the shape of straight lines along the inner peripheral edge portions 111c, 111d, and 111e at the inner circumference in the form of a hexagon, and are equal to or slightly greater in length than the edges of the respective inner peripheral edge portions 111c, 111d, and 111e, similarly to the through-openings 25 to 27 of Embodiment 1.

Furthermore, as illustrated in FIG. 20, the strain element 110 has a hollow 110e, which is in a large circular shape, in the central area when seen from the back face 110b. The hollow 110e has a dimension in a radial direction that is long enough to include the foregoing through-openings 125 to 127. Therefore, in the strain element 110, a ring-shaped area including the arm portions 120 to 122 and the through-openings 125 to 127 in the frame portion 111 has the smallest thickness (dimension in the Z axis direction). This thickness is the thickness from a bottom 110$d$ of the hollow 110$e$ to the front face 110$a$ of the strain element 110. The second thinnest is the thickness of the central portion 112. This thickness is from the bottom 110$d$ of the hollow 110$e$ to a raised face 112$a$ of the central portion. The thickest is the thickness of an outer circumference area (ring-shaped area) of the frame portion 111. This thickness is from the front face 110$a$ of the strain element 110 (identical to frame portion's front face 111$a$) to the back face 110$b$ of the strain element 110.

The strain element 110 in accordance with Embodiment 2 has thicknesses as described above. This ensures, in the thinnest ring-shaped area including the arm portions 120 to 122 and the through-openings 125 to 127 of the frame portion 111, the ability to easily elastically deform in response to an external load or moment. Furthermore, the second thickest central portion 112 ensures rigidity that is necessary to function as, when the force sensor 101 is combined with the foregoing table block 102, a force receiver serving to receive an external force from the table block 102. Moreover, the outer circumference area (ring-shaped area) of the frame portion 111, which is the thickest, is a portion directly joined to the robot arm, and therefore has a thickness corresponding to a rigidity required for operation of the robot arm.

Note that the strain element 110 has, in the back face 110$b$ illustrated in FIG. 20, locating holes 119$a$ and 119$b$ for the robot arm, in the outer circumference area of the frame portion 111. Also, the strain element 110 has a recess 110$f$ and a groove 110$g$ for passage of lead wires for connections of the electrical system board accommodated in the hollow 110$e$. Moreover, a substrate constituting an electrical signal processing module (see signal processing module 30 in accordance with Embodiment 1 illustrated in FIG. 10) is disposed in the hollow 110$e$ of the finished strain element 110. Also, lead wires for external connection, running from the substrate, are accommodated and disposed in the groove 110$g$, within the hollow 110$e$ of the finished strain element 110. With this, as illustrated in (b) of FIG. 16, the hollow 110$e$ is closed by attaching a circular cover 160 to the hollow 110$e$. Also, a recess cover 107 is attached to the recess 110$f$, and thereby the recess 110$f$ and the groove 110$g$ are closed.

The strain element 110 configured as described above has been formed by machining (cutting) an elastically deformable metal material, similarly to Embodiment 1, and corner easing to removed burrs on peripheries, edges, corners, and the like of the strain element 110 has also been carried out. With regard to this corner easing, careful corner easing is carried out also with respect to the strain element 110 in accordance with Embodiment 2, similarly to Embodiment 1. The corner easing is carried out with respect to, for example, corners of edges of junctions where the frame portion 11 and the respective arm portions 120 to 122 connect together, corresponding to the areas enclosed by dot-dot-dash lines in FIGS. 6 and 7 of Embodiment 1. The corner easing is carried out also with respect to corners of edges of junctions where the central portion 112 and the respective arm portions 120 and 122 connect together. Note that the radius of curvature forming each of such corners, and the like, are also the same as those of Embodiment 1. Furthermore, when such machining and corner easing are carried out, also in Embodiment 2, surface processing (processing by projecting shot material) is to be carried out after masking.

FIG. 21 illustrates the strain element 110 (unfinished strain element) which has been masked for surface processing. In the masking step involving masking, as illustrated in FIG. 21, the strain element 110 is masked by adhesive tape T except for the arm portions 120 to 122 including areas for disposition of strain gauges A11 to C14' (i.e., the strain element 110 is masked except for strain portions. In Embodiment 2, the frame portion 111 and the central portion 112 are masked). Note that side faces in the thickness direction, such as outwardly facing faces of the central portion 112, inwardly facing faces of the frame portion 111, and a outwardly facing face 110$c$ of the strain element 110 (frame portion 111), are also masked. Therefore, on each of the arm front faces 120$a$ to 122 of the arm portions 120 to 122 which are left unmasked, an area extending from a corresponding one of central junctions 120$c$ to 122$c$ (where the arm portion connects to the central portion 112) to a corresponding one of outer junctions 120$d$ to 122$d$ (where the arm portion connects to the frame portion 111) is exposed. Also, on each of the arm back faces 120$b$ to 122$b$ of the arm portions 120 to 122 which are left unmasked, an area extending from a corresponding one of central junctions 120$c$ to 122$c$ to a corresponding one of outer junctions 120$d$ to 122$d$ (where the arm portion connect to the frame portion 11) is exposed. Furthermore, opposite side faces of each of the non-masked arm portions 120 to 122 are also exposed. Therefore, all four sides of each of the arm portions 120 to 122 are exposed.

Then, similarly to Embodiment 1, the step of projecting a shot material at the strain element 110 which has been masked, illustrated in FIG. 21, is carried out, and thereby a residual stress layer having compressive residual stress is formed in the non-masked portions (strain portions). Moreover, the strain portions in which such a residual stress layer is formed has a surface roughness rougher than those of the non-masked areas.

When the step of projecting a shot material is completed as described above, the masking material is removed, and then the strain gauges A11 to C14' are bonded with an adhesive to the arm front faces 120$a$ to 122$a$ and the arm back faces 120$b$ to 122$b$ of the arm portions 120 to 122. The strain gauges A11 to C14' in accordance with Embodiment 2 correspond to the strain gauges A1 to C4' in accordance with Embodiment 1, and are the same as the strain gauges A1 to C4' in accordance with Embodiment 1 in terms of the manner in which the strain gauges A11 to C14' are disposed, the manner in which they are bonded, the manner in which they are electrically connected (see strain gauge circuit illustrated in FIG. 9), and the like. Also, a signal processing module for processing output voltage signal from a strain gauge circuit constituted by connecting the strain gauges A11 to C14', in the force sensor 101 in accordance with Embodiment 2, is also the same as that used in Embodiment 1 (see FIG. 10).

With regard to the strain element 110 having gone through such production steps, as described earlier, a substrate of an electrical signal processing module is accommodated in the hollow 110$e$ and the lead wires extending from the substrate are also accommodated in the groove 110$g$, and then the hollow 110$e$ and the recess 110$f$ are closed with the cover 106 and the recess cover 107. Next, the following description discusses, with reference to FIGS. 17 and 18, a procedure by which the force sensor 101 constituted by the strain element 110 and the table block 102 is attached to the industrial robot arm.

First, as illustrated in (a) and (b) of FIG. 18, the strain element 110 is attached to the robot arm-side of the industrial robot arm. Before doing so, locating pins P2 are press-fit into the locating holes 119a and 119b in the back face 110b of the strain element 110. The tips of the locating pins P2 are press fit into locating through-holes in the robot arm provided so as to correspond to the locating holes 119a and 119b, and the back face 110b of the strain element 110 is placed on the end face at an end portion of the robot arm (see (b) of FIG. 18). Then, bolts N2 (hexagon socket head bolts) are put through the four bolt through-holes 118a to 118d in the front face 110a of the strain element 110, and fastened to screw holes which are provided in the robot arm so as to correspond to the bolt through-holes 118a to 118d. This fixes the strain element 110 to the robot arm (see (a) of FIG. 18).

Next, the table block 102 is attached to the strain element 110 to assemble the force sensor 101. Specifically, locating pins P are press fit into the locating holes 104a and 104b in the table block 102 from the back face 102d, in advance. The tips of the locating pins P are press fit into the locating through-holes 114a and 114b which are provided in the raised face 112a of the central portion 112 of the strain element 110 so as to correspond to the locating holes 104a and 104b. The back face 102d of the table block 102 is placed on the raised face 112a of the central portion 112 of the strain element 110 (see (b) of FIG. 17). Note that, in the drawings such as (b) of FIG. 17, the covers 106 and 107 which cover the hollow 110e and the recess 110f in the strain element 110 are not illustrated.

Next, bolts N (hexagon socket head bolts) are put through the three bolt through-holes 103a to 103c in the front face 102a of the table block 102. The bolts N are fastened to the three screw through-holes 113a, 113b, and 113c which are provided in the raised face 112a of the central portion 112 of the strain element 110 so as to correspond to the bolt through-holes 103a to 103c. With this, the table block 102 is fixed to the strain element 110, and thereby the force sensor 101 in accordance with Embodiment 2 is completed.

Note that, with regard to a procedure by which the robot hand-side of the industrial robot arm is attached to the force sensor 101, locating pins P1 are press-fit into locating holes in the robot hand in advance. The tips of such locating pins P1 are press-fit into the hand-locating holes 104d and 104e in the front face 102a of the table block 102. The robot hand is placed on the front face 102a of the table block 102 (see (b) of FIG. 18). Then, bolts Ni (hexagon socket head bolts) are put through the four bolt through-holes in the robot hand, and fastened to the four hand-attaching screw through-holes 105a, 105b, 105c, and 105d in the front face 102a of the table block 102. This fixes the robot hand to the table block 102.

According to the force sensor 101 in accordance with Embodiment 2 configured as described above, a load against the robot hand is first exerted on the table block 102. The load exerted on the table block 102 is received, as an external force, by the central portion 112 of the strain element 110 whose raised face 112a is in contact with the back face 102d of the table block 102. Upon receipt of the external force by the central portion 112 of the strain element 110, the arm portions 120 to 122, which connect the central portion 112 and the frame portion 111 fixed to the robot arm, elastically deform, and the strain gauges A11 to C14' carry out detection of strain associated with such elastic deformation.

Furthermore, also in the frame portion 111 included in the force sensor 101 in accordance with Embodiment 2, a residual stress layer having compressive residual stress is formed on each of the arm portions 120 to 122. Therefore, metal fatigue strength associated with elastic deformation is improved. Moreover, since stress concentration is reduced in corner portions at edges of junctions where the respective arm portions 120 to 122 connect to the frame portion 111 and in corner portions at edges of junctions where the respective arm portions 120 to 122 connect to the central portion 112, working life can be prolonged. Moreover, Embodiment 2, which employs the frame portion 111 configured as described above, thereby achieves, in addition to the effects which are the same as the above-mentioned effects of Embodiment 1, a reduction in parts count, a reduction in the number of man-hours for assembly, a reduction in dimension in the Z axis direction, improvement in mountability of electrical system board, and a reduction in the number of man-hours for processing.

Note that, also in Embodiment 2, the adhesiveness of the strain gauges A11 to C14' disposed on the arm portions 120 to 122 is increased, and therefore measurement accuracy is also improved as compared to conventional techniques. Note that, also in Embodiment 2, various variations described earlier in Embodiment 1 can be employed.

FIGS. 22 and 23 illustrate variations of masking of the strain element 110 in accordance with Embodiment 2. (a) to (c) of FIG. 22 correspond to the variation of masking in accordance with Embodiment 1 described with reference to (a) to (c) of FIG. 14. (a) to (c) of FIG. 23 correspond to the another variation of masking in accordance with Embodiment 1 described with reference to (a) to (c) of FIG. 15. Each variation shows a state in which each non-masked area illustrated in FIG. 21 has been broadened from the opposite ends of each of the arm portions 120 to 122.

Specifically, in the variation of masking illustrated in (a) to (c) of FIG. 22, areas including the outer peripheral edge portions 112c, 112d, and 112e, where the respective central junctions 120c to 122c (which are the central portion 112-side ends of the respective arm portions 120 to 122) connect to the central portion 112, are also left unmasked. These areas including the outer peripheral edge portions 112c, 112d, and 112e, where the respective central junctions 120c to 122c (which are the central portion 112-side ends of the respective arm portions 120 to 122) connect to the central portion 112, are areas in the form of straight lines parallel to the edges corresponding to the outer peripheral edge portions 112c, 112d, and 112e. Furthermore, areas including inner peripheral edge portions 111c, 111d, and 111e, where respective outer junctions 120d to 122d (which are the frame portion 111-side ends of the respective arm portions 120 to 122) connect to the frame portion 111, are also left unmasked. The areas including the inner peripheral edge portions 111c, 111d, and 111e, where the respective outer junctions 120d to 122d (which are the frame portion 111-side ends of the respective arm portions 120 to 122) connect to the frame portion 111, are areas in the form of straight lines parallel to the edges corresponding to the inner peripheral edge portions 111c, 111d, and 111e.

The central junctions 120c to 122c and the outer junctions 120d to 122d, from which such arm portions 120 to 122 extend, are likely to undergo stress concentration. Because of this, there is a tendency that the vicinities of the outer peripheral edge portions 112c, 112d, and 112e of the central portion 112, where the respective central junctions 120c to 122c connect to the central portion 112, and the vicinities of the inner peripheral edge portions 111c, 111d, and 111e of the frame portion 111, where the respective junctions 120d to 122d connect to the frame portion 111, are also subjected to a large burden due to stress concentration. To address this, the step of projecting a shot material at the strain element 110 may be carried out under a condition in which, as illustrated in (a) to (c) of FIG. 22, the areas including the outer peripheral edge portions 112c, 112d, and 112e and the areas including the inner peripheral edge portions 111c, 111d, and 111e are also left unmasked. With this, a residual stress layer having negative residual stress is formed also in the areas corresponding to these edge portions, and the resistance to fatigue failure resulting from elastic deformation can be further improved. Note that, in this variation, the linear areas parallel to the edges corresponding to the respective inner peripheral edge portions 111c to 111e and outer peripheral edge portions 112c to 112e are also included in strain portions in addition to the arm portions 120 to 122.

In the another variation of masking illustrated in (a) to (c) of FIG. 23, areas including corners of edges of the outer peripheral edge portions 112c, 112d, and 112e, where the respective central junctions 120c to 122c of the respective arm portions arm portions 120 to 122 connect to the central portion 112, are also left unmasked. These areas including the corners of the edges of the outer peripheral edge portions 112c, 112d, and 112e, where the respective central junctions 120c to 122c of the respective arm portions 120 to 122 connect to the central portion 112, are areas each in the form of a straight line including the opposite corners of the edge of a corresponding one of the outer peripheral edge portions 112c, 112d, and 112e. Areas of the inner peripheral edge portions 111c, 111d, and 111e (where the respective outer junctions 120d to 122d of the respective arm portions 120 to 122 connect to the frame portion 111), corresponding to the regions in longitudinal directions of the respective through-openings 125 to 127, are also left unmasked. These areas of the inner peripheral edge portions 111c, 111d, and 111e, corresponding to the regions in the longitudinal directions of the respective through-openings 125 to 127, are areas in the form of straight lines corresponding to the ranges in the longitudinal directions of the respective through-openings 125 to 127, near the inner peripheral edge portions 111c, 111d, and 111e.

As described earlier, the vicinities of the outer peripheral edge portions 112c, 112d, and 112e of the central portion 112 are structurally subjected to a large burden due to stress concentration. Similarly, the vicinities of the inner peripheral edge portions 111c, 111d, and 111e of the frame portion 111 are likely to undergo stress concentration due to the presence of the through-openings 125 to 127 in the form of slots. To address this, the step of projecting a shot material at the strain element 110 may be carried out under a condition in which, as illustrated in (a) to (c) of FIG. 23, the areas including corners of edges of the outer peripheral edge portions 112c, 112d, and 112e are also left unmasked. The step of projecting a shot material at the strain element 110 may be carried out under a condition in which also the areas including the regions of the inner peripheral edge portions 111c, 111d, and 111e corresponding to the longitudinal directions of the through-openings 125 to 127 are also left unmasked. With this, a residual stress layer having negative residual stress is formed also in these areas, and the resistance to fatigue failure resulting from elastic deformation can be further improved. Note that, in this variation, non-masked areas of the inner peripheral edge portions 111c to 111e and the outer peripheral edge portions 112c to 112e are also included in strain portions.

Embodiment 3

(a) to (c) of FIG. 24 illustrate a strain element 55 in accordance with Embodiment 3 of the present invention, which is for application to a load cell (load converter and force converter) as a physical quantity measurement sensor. The strain element 55 in accordance with Embodiment 3 is constituted by a cylindrical member 56. The strain element 55 is configured such that, on its front side 56a of the outer circumferential surface extending from top to bottom beyond center line X5 parallel to the X axis direction (horizontal direction), areas each intersecting center line Y5 parallel to the Y axis direction (vertical direction) (i.e., a front-side upper area 56c and a front-side lower area 56d) are used as areas for attachment of strain gauges. The strain element 55 is also configured such that, on its back side 56b of the outer circumferential surface extending from top to bottom beyond the center line X5 parallel to the X axis direction, areas each intersecting the center line Y5 parallel to the Y axis direction (i.e., a back-side upper area 56e and a back-side lower area 56f) are used as areas for attachment of strain gauges. These areas for attachment of the strain gauges are four quadrangular regions cross-hatched in (b) and (c) of FIG. 24.

Note that each area (the front-side upper area 56c, the front-side lower area 56d, the back-side upper area 56e, and the back-side lower area 56f) is in the shape of a quadrangle (rectangle), and, while the longitudinal directions of the front-side upper area 56c and the back-side upper area 56e are parallel to the center line Y5, the longitudinal directions of the front-side lower area 56d and the back-side lower area 56f are parallel to the center line X5. Also in Embodiment 3, the main material for the strain element 55, specifications of strain gauges, the manner in which the strain gauges are disposed, and the like are the same as those of Embodiment 1.

(a) to (c) of FIG. 25 illustrate the strain element 55 in accordance with Embodiment 3 which has been masked. Also in the production of the strain element 55 in accordance with Embodiment 3, the foregoing cylindrical member 56 is made from a material by machining (including corner easing), and then, as illustrated in (a) to (c) of FIG. 25, the member 56 is masked. Specifically, assume that the quadrangular regions including the front-side upper area 56c, the front-side lower area 56d, the back-side upper area 56e, and the back-side lower area 56f, which are areas for attachment of strain gauges, are a front-side upper strain portion 56r, a front-side lower strain portion 56s, a back-side upper strain portion 56t, and a back-side lower strain portion 56u, respectively. These strain portions, which correspond to regions subject to strain associated with elastic deformation under a load (such strain portions are the front-side upper strain portion 56r, the front-side lower strain portion 56s, the back-side upper strain portion 56t, and the back-side lower strain portion 56u), are left unmasked, and portions other than these strain portions (the front-side upper strain portion 56r, the front-side lower strain portion 56s, the back-side upper strain portion 56t, and the back-side lower strain portion 56u) are masked. Note that the masked areas are the areas cross-hatched in (a) to (c) of FIG. 25.

The strain portions (the front-side upper strain portion 56r, the front-side lower strain portion 56s, the back-side upper strain portion 56t, and the back-side lower strain portion 56u), which are left unmasked, are regions obtained by uniformly enlarging, about 1.5- to 4-fold, the front-side upper area 56c, the front-side lower area 56d, the back-side upper area 56e, and the back-side lower area 56f which are areas for disposition of strain gauges, respectively. In this example, the strain portions which are left unmasked are about 2-fold enlarged regions. Note that the masked areas of the strain element 55 are the front side 56a and the back side 56b of the outer circumferential surface (side surface) and circular top and bottom faces 56g and 56h of the member 56 excluding the strain portions (the front-side upper strain portion 56r, the front-side lower strain portion 56s, the back-side upper strain portion 56t, and the back-side lower strain portion 56u).

With respect to the strain element 55 which has been masked, shot peening or laser peening is carried out. By such peening, a residual stress layer having negative residual stress is formed in each of the strain portions (the front-side upper strain portion 56r, the front-side lower strain portion 56s, the back-side upper strain portion 56t, and the back-side lower strain portion 56u). With this, even when the strain portions (the front-side upper strain portion 56r, the front-side lower strain portion 56s, the back-side upper strain portion 56t, and the back-side lower strain portion 56u) of the front side 56a and the back side 56b elastically deform in response to an external force (load), the strain portions are resistant to fatigue failure resulting from metal fatigue. Furthermore, in a case where shot peening involving projecting a shot material is carried out as peening, the strain portions (the front-side upper strain portion 56r, the front-side lower strain portion 56s, the back-side upper strain portion 56t, and the back-side lower strain portion 56u) are given a surface roughness rougher than those of other portions. Therefore, even in a case where the strain gauges are disposed by bonding with an adhesive, the strain gauges have improved adhesiveness and become better at conforming to elastic deformation, and the accuracy of strain detection can be maintained. Note that, also in Embodiment 3, the variations described earlier in the embodiments such as Embodiment 1 may be used if applicable.

Embodiment 4

(a) and (b) of FIG. 26 illustrate a strain element 60 in accordance with Embodiment 4 of the present invention, which is for application to a load cell (load converter and force converter) as a physical quantity measurement sensor similarly to the foregoing Embodiment 3. The strain element 60 in accordance with Embodiment 4 is constituted by a cube-shaped member 61, and has a hollow extending through the member 61 from a front face 61b to a back face 61d. The hollow, when seen from the front face 61b illustrated in (b) of FIG. 26, is constituted by (i) a left through-opening 62 and a right through-opening 63 each in the form of a circle and (ii) a connecting through-opening 64 which connects the left through-opening 62 and the right through-opening 63. Since the hollow constituted by such through-openings (the left through-opening 62, the right through-opening 63, and the connecting through-opening 64) is formed, when a top face 61a or a bottom face 61c of the cube-shaped member 61 receives a load, the top face 61a or the bottom face 61c elastically deforms. For carrying out detection of strain associated with such elastic deformation, the top face 61a and the bottom face 61c are provided with areas for disposition of strain gauges.

Specifically, on the top face 61a of the member 61, a top left area 65a and a top right area 65b, which are arranged along center line X8 parallel to the X axis direction (horizontal direction) and which correspond to the left through-opening 62 and the right through-opening 63, are used as areas for attachment of strain gauges. Furthermore, on the bottom face 61c, a bottom left area 65c and a bottom right area 65d, which are arranged along the center line X8 parallel to the X axis direction and which correspond to the left through-opening 62 and the right through-opening 63, are used as areas for attachment of strain gauges (four quadrangular regions cross-hatched in (a) and (b) of FIG. 26). Note that the areas (the top left area 65a, the top right area 65b, the bottom left area 65c, and the bottom right area 65d) are each in the shape of a quadrangle (rectangle), and their longitudinal directions are each parallel to the center line X8. Also in Embodiment 4, the main material for the strain element 60, specifications of strain gauges, the manner in which the strain gauges are disposed, and the like are the same as those of Embodiment 1.

(a) to (c) of FIG. 27 illustrate the strain element 60 in accordance with Embodiment 4 which has been masked. Also in the production of the strain element 60 in accordance with Embodiment 4, first, the cube-shaped member 61 having the hollow constituted by the through-openings (the left through-opening 62, the right through-opening 63, and the connecting through-opening 64) is made from a material by machining (including corner easing). Then, as illustrated in (a) to (c) of FIG. 27, the member 61 is masked. Specifically, quadrangular regions including the top left area 65a, the top right area 65b, the bottom left area 65c, and the bottom right area 65d, which are areas for attachment of strain gauges and are referred to as a top left strain portion 61r, a top right strain portion 61s, a bottom left strain portion 61t, and a bottom right strain portion 61u, respectively, are left unmasked. Portions other than these strain portions, which correspond to regions subject to strain associated with elastic deformation under a load (such strain portions are the top left strain portion 61r, the top right strain portion 61s, the bottom left strain portion 61t, and the bottom right strain portion 61u), are masked (masked areas are the areas cross-hatched in (a) to (c) of FIG. 27).

The strain portions (the top left strain portion 61r, the top right strain portion 61s, the bottom left strain portion 61t, and the bottom right strain portion 61u), which are left unmasked, are regions obtained by uniformly enlarging, about 1.5- to 4-fold, the top left area 65a, the top right area 65b, the bottom left area 65c, and the bottom right area 65d, respectively, which are areas for disposition of strain gauges. In this Example, the strain portions which are left unmasked are about 2-fold enlarged regions. Note that the masked areas of the strain element 60 are outer surfaces of the member 61 excluding the foregoing strain portions (the top left strain portion 61r, the top right strain portion 61s, the bottom left strain portion 61t, and the bottom right strain portion 61u). The outer surfaces are the top face 61a, the front face 61b, the bottom face 61c, the back face 61d, a left side face 61e, a right side face 61f, and inner walls of the through-openings (the left through-opening 62, the right through-opening 63, and the connecting through-opening 64) constituting the hollow.

With respect to the strain element 60 which has been masked, shot peening or laser peening is carried out. By such peening, a residual stress layer having negative residual stress is formed in each of the strain portions (the top left strain portion 61r, the top right strain portion 61s, the bottom left strain portion 61t, and the bottom right strain portion 61u). With this, even when the strain portions (the top left strain portion 61r, the top right strain portion 61s, the bottom left strain portion 61t, and the bottom right strain portion 61u) of the top face 61a and the bottom face 61c elastically deform in response to an external force (load), the strain portions are resistant to fatigue failure resulting from metal fatigue. Furthermore, in a case where shot peening involving projecting a shot material is carried out as peening, the strain portions (the top left strain portion 61r, the top right strain portion 61s, the bottom left strain portion 61t, and the bottom right strain portion 61*u*) are given a surface roughness rougher than those of other portions. Therefore, even in a case where the strain gauges are disposed by bonding with an adhesive, the strain gauges have improved adhesiveness and become better at conforming to elastic deformation, and the accuracy of strain detection can be maintained. Note that, also in Embodiment 4, the variations described earlier in the embodiments such as Embodiment 1 may be used if applicable.

Embodiment 5

(a) to (c) of FIG. 28 illustrate a strain element 70 in accordance with Embodiment 5 of the present invention, which is for application to a torque sensor as a physical quantity measurement sensor. The strain element 70 in accordance with Embodiment 5 includes, similarly to the strain element 10 in accordance with Embodiment 1, a frame portion 71 having a circular circumferential outline when seen from front, and includes a central portion 72 (having a circular outline when seen from front side) which is located in the space defined by the frame portion 71 such that there are spaces 78*a* to 78*d* between the frame portion 71 and the central portion 72. The strain element 70 is characterized in that four arm portions 73 to 76, which connect the frame portion 71 and the central portion 72, are arranged in a circumferential direction so as to be spaced apart from each other by 90 degrees. Note that, in (a) to (c) of FIG. 28, bolt holes, locating through-holes, and the like illustrated in the drawings such as FIGS. 4 and 5 are not illustrated, for clear illustration of the configuration of main parts of the strain element 70.

According to the foregoing strain element 10 in accordance with Embodiment 1, the thickness (dimension in Z axis direction) is substantially the same among the frame portion 11, the central portion 12, and the arm portions 20 to 22. However, according to the strain element 70 in accordance with Embodiment 5, the thicknesses of the frame portion 71 and the central portion 72 are greater, because, for example, the strain element 70 is for application to a torque sensor. Therefore, the thicknesses of the arm portions 73 to 76 are less than those of the frame portion 71 and the central portion 72 (see (b) and (c) of FIG. 28).

Areas of the strain element 70 for disposition of strain gauges are opposite side faces 73*a* and 73*b* of the arm portion 73 extending parallel to the Y axis direction and opposite side faces 75*a* and 75*b* of the arm portion 75 extending parallel to the Y axis direction. With regard to the areas of the strain element 70 for disposition of strain gauges, specifically, the regions cross-hatched in (a) and (b) of FIG. 28 are areas 73*e*, 73*f*, 75*e*, and 75*f* for disposition of strain gauges. Note that, in Embodiment 5, the main material for the strain element 70, specifications of strain gauges, the manner in which the strain gauges are disposed, and the like are the same as those of Embodiment 1.

(a) to (c) of FIG. 29 illustrate the strain element 70 in accordance with Embodiment 5 which has been masked. Also in the production of the strain element 70 in accordance with Embodiment 5, with respect to the strain element 70 which has been made into the shape illustrated in (a) to (c) of FIG. 29 from a material by machining (including corner easing), masking is carried out to mask the regions cross-hatched in (a) to (c) of FIG. 29. These regions are portions other than the opposite side faces 73*a* and 73*b* of the arm portion 73 extending parallel to the Y axis direction and the opposite side faces 75*a* and 75*b* of the arm portion 75 extending parallel to the Y axis direction including the foregoing areas 73*e*, 73*f*, 75*e*, and 75*f* for disposition of strain gauges (the side faces 73*a* and 73*b* and the side faces 75*a* and 75*b* correspond to strain portions corresponding to regions subject to strain).

Each of the non-masked opposite side faces 73*a* and 73*b* of the arm portion 73 is a region extending from a junction 73*c* where the arm portion 73 connects to the frame portion 71 to a junction 73*d* where the arm portion 73 connects to the central portion 72 in the direction of extension of the arm portion 73 (the direction parallel to the Y axis), and each of the non-masked opposite side faces 75*a* and 75*b* of the arm portion 75 is a region extending from a junction 75*c* where the arm portion 75 connects to the frame portion 71 to a junction 75*d* where the arm portion 75 connects to the central portion 72 in the direction of extension of the arm portion 75 (the direction parallel to the Y axis). Note that the masked areas are the whole circumferences of the frame portion 71 and the central portion 72, four sides of each of the arm portions 74 and 76 extending parallel to the X axis direction, and surfaces of the arm portions 73 and 75 excluding the opposite side faces 73*a* and 73*b* of the arm portion 73 extending parallel to the Y axis direction and the opposite side faces 75*a* and 75*b* of the arm portion 75 extending parallel to the Y axis direction.

With respect to the strain element 70 which has been masked, shot peening or laser peening described in Embodiment 1 is carried out. By such peening, a residual stress layer having negative residual stress is formed on the opposite side faces 73*a* and 73*b* of the arm portion 73 and the opposite side faces 75*a* and 75*b* of the arm portion 75 including the areas 73*e*, 73*f*, 75*e*, and 75*f* for disposition of strain gauges. With this, even when the opposite side faces 73*a* and 73*b* of the arm portion 73 and the opposite side faces 75*a* and 75*b* of the arm portion 75 elastically deform in response to an external force (load), these faces are resistant to fatigue failure resulting from metal fatigue.

Furthermore, in a case where shot peening involving projecting a shot material is carried out as peening, the opposite side faces 73*a* and 73*b* of the arm portion 73 and the opposite side faces 75*a* and 75*b* of the arm portion 75 are given a surface roughness rougher than those of other portions. Therefore, even in a case where the strain gauges are disposed on the opposite side faces 73*a* and 73*b* and the opposite side faces 75*a* and 75*b* by bonding, the strain gauges become better at conforming to elastic deformation of the arm portions 73 and 75, and the accuracy of strain detection can be maintained.

Note that, also in Embodiment 5, various variations are available. For example, depending on the purpose of use or the like, the number of arm portions can be more than four. Furthermore, arm portions can be unequally spaced apart from each other in the circumferential direction instead of being equally spaced. Moreover, the shape of the outline of the strain element may be a polygon such as a quadrangle instead of a circle. Note that, also in Embodiment 5, the variations described earlier in Embodiment 1 can be employed.

Embodiment 6

(a) to (c) of FIG. 30 illustrate a strain element 80 in accordance with Embodiment 6 of the present invention, which is for application to a load cell as a physical quantity measurement sensor. The strain element 80 in accordance with Embodiment 6 is constituted by a frame part 81 having a circular (ring-shaped) outline when seen from front. The strain element 80 is arranged such that opposite ends 81*c* and

81*d* of an outer circumferential face 81*b*, intersecting center line X10 (horizontal line H10 in side view) parallel to the X axis direction (horizontal direction) (such ends are hereinafter referred to as outer-circumferential horizontal ends 81*c* and 81*d*), and opposite ends 81*e* and 81*f* of an inner circumferential face 81*a*, intersecting the center line X10 (such ends are hereinafter referred to as inner-circumferential horizontal ends 81*e* and 81*f*), i.e., four areas in total, are areas for attachment of strain gauges (areas 81*g*, 81*h*, 81*i*, and 81*j*). The areas 81*g*, 81*h*, 81*i*, and 81*j* for disposition of strain gauges are the regions cross-hatched in (a) to (c) of FIG. 30. Note that, also in Embodiment 6, the main material for the strain element 80, specifications of strain gauges, and the like are the same as those of Embodiment 1. The manner in which the strain gauges are disposed is the same as those (including variations) described in Embodiment 1. The strain gauges can be disposed such that their detection directions are each parallel to the Y axis direction.

(a) to (c) of FIG. 31 illustrate the strain element 80 in accordance with Embodiment 6 which has been masked. Also in the production of the strain element 80 in accordance with Embodiment 6, a material is made into the strain element 80 having the shape illustrated in (a) to (c) of FIG. 31 by machining (including corner easing). With regard to the strain element 80, the regions cross-hatched in (a) to (c) of FIG. 31 are masked. These regions are portions other than quadrangular outer-circumferential strain portions 81*r* and 81*s* and inner-circumferential strain portions 81*t* and 81*u* including the respective areas 81*g*, 81*h*, 81*i* and 81*j* for disposition of strain gauges at the outer-circumferential horizontal ends 81*c* and 81*d* intersecting the center line X10 and the inner-circumferential horizontal ends 81*e* and 81*f* intersecting the center line X10.

The outer-circumferential strain portions 81*r* and 81*s* and the inner-circumferential strain portions 81*t* and 81*u* (corresponding to strain portions corresponding to regions subject to strain), which are left unmasked, are regions obtained by uniformly enlarging, about 1.5- to 4-fold, the areas 81*g*, 81*h*, 81*i*, and 81*j* for disposition of strain gauges, respectively. In this Example, the strain portions which are left unmasked are about 2-fold enlarged regions. Note that the masked areas of the strain element 80 are all the faces of the frame part 81 excluding the foregoing outer-circumferential strain portions 81*r* and 81*s* and the inner-circumferential strain portions 81*t* and 81*u*.

With respect to the strain element 80 which has been masked, shot peening or laser peening is carried out. By such peening, a residual stress layer having negative residual stress is formed in the outer-circumferential strain portions 81*r* and 81*s* and the inner-circumferential strain portions 81*t* and 81*u* including the areas 81*g*, 81*h*, 81*i*, and 81*j* for disposition of strain gauges. With this, even when the outer-circumferential strain portions 81*r* and 81*s* and the inner-circumferential strain portions 81*t* and 81*u* of the frame part 81 elastically deform in response to an external force (load), the strain portions are resistant to fatigue failure resulting from metal fatigue.

Furthermore, in a case where shot peening involving projecting a shot material is carried out as peening, the outer-circumferential strain portions 81*r* and 81*s* and the inner-circumferential strain portions 81*t* and 81*u* of the frame part 81 are given a surface roughness rougher than those of other portions. Therefore, even in a case where the strain gauges are disposed by bonding, the strain gauges become better at conforming to elastic deformation of the outer-circumferential strain portions 81*r* and 81*s* and the inner-circumferential strain portions 81*t* and 81*u* of the frame part 81, and the accuracy of strain detection can be maintained. Note that, also in Embodiment 6, the variations described earlier in Embodiment 1 can be employed.

Embodiment 7

(a) to (c) of FIG. 32 illustrate a strain element 90 in accordance with Embodiment 7 of the present invention, which is for application to a load cell as a physical quantity measurement sensor. In the strain element 90 in accordance with Embodiment 7, a protruding portion 92 protruding in the form of a cylinder is provided at the center of a top end face 94 of a short-length cylindrical base portion 91. Also, the strain element 90 has a hollow 93 in the bottom face opposite the end face 94. The strain element 90 is configured such that four areas on an inner face 95, which is the ceiling of the hollow 93 and which is opposite the end face 94, are used as areas 96 to 99 for disposition of strain gauges. The four areas are arranged along center line X20 (in the X axis direction) and center line Y20 (in the Y axis direction) each passing through a center 95*a* of the inner face 95, and are each distant from the center 95*a*. The areas 96 to 99 for disposition of strain gauges are the regions cross-hatched in (a) to (c) of FIG. 32. Note that, also in Embodiment 7, the main material for the strain element 90, specifications of strain gauges, the manner in which the strain gauges are disposed, and the like are the same as those of Embodiment 1.

(a) to (c) of FIG. 33 illustrate the strain element 90 in accordance with Embodiment 7 which has been masked. Also in the production of the strain element 90 in accordance with Embodiment 7, a material is made into the strain element 90 having the shape illustrated in (a) to (c) of FIG. 33 by machining (including corner easing). This strain element is masked except for quadrangular strain portions 90*a* to 90*d* including the respective areas 96 to 99 for disposition of strain gauges (masked areas are the regions cross-hatched in (a) and (b) of FIG. 33).

The strain portions 90*a* to 90*d* (corresponding to strain portions in accordance with an aspect of the present invention), which are left unmasked, are regions obtained by uniformly enlarging (about 1.5- to 4-fold) the areas 96 to 99 for disposition of strain gauges. In this example, the strain portions which are left unmasked are about 2-fold enlarged regions. Note that the masked areas of the strain element 90 are all the faces of the base portion 91 and the protruding portion 92 excluding the foregoing quadrangular strain portions 90*a* to 90*d*.

With respect to the strain element 90 which has been masked, shot peening or laser peening is carried out. By such peening, a residual stress layer having negative residual stress is formed in the quadrangular strain portions 90*a* to 90*d* including the respective areas 96 to 99 for disposition of strain gauges. With this, even when the end face 94 and the inner face 95 of the base portion 91 elastically deform in response to an external force (load), the faces are resistant to fatigue failure resulting from metal fatigue.

Furthermore, in a case where shot peening involving projecting a shot material is carried out as peening, the quadrangular strain portions 90*a* to 90*d* are given a surface roughness rougher than those of other portions. Therefore, even in a case where the strain gauges are disposed by bonding, the strain gauges become better at conforming to elastic deformation of the end face 94 and the inner face 95 of the base portion 91, and the accuracy of strain detection can be maintained. Note that, also in Embodiment 7, the variations described earlier in Embodiment 1 can be employed.

Aspects of the present invention can also be expressed as follows.

An aspect of the present invention is directed to a strain element which is elastically deformable in response to a load and which is configured to have a strain gauge disposed thereon, the strain gauge being configured to detect strain associated with deformation, the strain element including a strain portion which corresponds to a region subject to strain and which includes an area for disposition of the strain gauge, the strain portion being provided with a residual stress layer having negative residual stress.

According to an aspect of the present invention, a residual stress layer having negative residual stress (compressive residual stress) has been formed in a strain portion which is in a region where the strain element elastically deforms and which includes an area for disposition of the strain gauge. Therefore, the resistance to fatigue failure in the portion that elastically deforms, in which the strain gauge carries out detection, increases. Since the resistance to fatigue failure increases like this, a physical quantity measurement sensor including the strain element can be used stably over a long period of time. Note that the residual stress layer may be formed by, for example, causing a shot material to collide with the surface of the strain portion or irradiating the surface of the strain portion with laser.

An aspect of the present invention is arranged such that the strain portion has a surface roughness rougher than a portion other than the strain portion.

According to an aspect of the present invention, the strain portion, which includes the area for disposition of the strain gauge, has a surface roughness greater than a portion other than the strain portion. Therefore, the surface area of the strain portion where an adhesive makes contact with the strain portion increases, and, in a case where the strain gauge is bonded to the strain element with an adhesive or the like, the adhesiveness to the surface of the strain element (surface of the strain portion) increases, and the strain gauge is firmly bonded. Because of this, even when the strain element elastically deforms, the strain gauge firmly bonded to the surface of the strain element with the adhesive better conforms to the deformation, and the accuracy of strain detection can be increased as compared to conventional techniques.

An aspect of the present invention includes: a frame portion; a central portion which is located in a space defined by the frame portion so as to be spaced apart from the frame portion; and an arm portion which connects the frame portion with the central portion and which corresponds to the strain portion, and is arranged such that the frame portion has a first through-opening in a junction where the frame portion connects to the arm portion, the arm portion has, disposed on one face thereof, four of the strain gauges consisting of a first strain gauge, a second strain gauge, a third strain gauge, and a fourth strain gauge, the first strain gauge and the second strain gauge are disposed in an area close to the central portion such that (i) the first strain gauge and the second strain gauge are symmetrical to each other with respect to a center line of the one face, the center line extending in a direction of extension of the arm portion, and (ii) detection directions of the first strain gauge and the second strain gauge are parallel to the center line, and the third strain gauge and the fourth strain gauge are disposed in an area close to the frame portion such that (i) the third strain gauge and the fourth strain gauge are symmetrical to each other with respect to the center line and (ii) detection directions of the third strain gauge and the fourth strain gauge are at an angle to the center line so as to diverge away from each other with decreasing distance to the central portion.

According to an aspect of the present invention, the strain element is arranged such that: the frame portion and the central portion are connected by the arm portion; the frame portion has the first through-opening facing the arm portion; the arm portion has, disposed on one face thereof, the four strain gauges consisting of a first strain gauge, a second strain gauge, a third strain gauge, and a fourth strain gauge, the third strain gauge and the fourth strain gauge are located in an area close to the frame portion such that (i) the third strain gauge and the fourth strain gauge are symmetrical to each other with respect to the center line in the direction of extension of the arm portion and (ii) detection directions of the third strain gauge and the fourth strain gauge are at an angle to the center line so as to diverge away from each other with decreasing distance to the central portion. Therefore, in a case where an external force that causes moment in the thickness direction of the strain element is exerted, the third strain gauge and the fourth strain gauge, which are disposed at an angle to the center line so as to diverge away from each other with decreasing distance to the central portion, easily detect strain associated with deformation that occurs when an external force is exerted on the arm portion in the foregoing specific directions (the foregoing Mz, Fx, and Fy directions). That is, the directions at an angle to the center line, in which the third strain gauge and the fourth strain gauge are disposed, are directions in which strain associated with deformation that occurs when an external force is exerted on the arm portion in the foregoing specific directions is detected well. This makes it possible to ensure highly sensitive measurement.

An aspect of the present invention includes: a frame portion; a central portion which is located in a space defined by the frame portion so as to be spaced apart from the frame portion; and an arm portion which connects the frame portion with the central portion and which corresponds to the strain portion, and is arranged such that the central portion has (i) a locating through-hole in an area corresponding to an extension of the arm portion and (ii) a second through-opening located between the locating through-hole and a junction where the central portion connects to the arm portion.

According to an aspect of the present invention, the strain element is arranged such that: the frame portion and the central portion are connected by the arm portion; the central portion has the locating through-hole; and there is the second through-opening between the locating through-hole and the junction where the central portion connects to the arm portion. Therefore, in the region corresponding to an area of the central portion from which the arm portion extends (in the region corresponding to the junction where the central portion connects to the arm portion), the vicinity of the locating through-hole increases in rigidity, whereas the vicinity of the second through-opening has a relatively low rigidity and is likely to flex. Because of this, the portion of the arm portion where the arm portion connects to the central portion is likely to elastically deform, and strain detection by the strain gauge becomes easy. Accordingly, the accuracy of measurement of values of physical quantities regarding external forces and moments improves.

According to an aspect of the present invention, the strain element is masked except for the strain portion, and then the shot material is projected. As such, the shot material directly collides with the strain portion. Because of such direct collision, a residual stress layer having negative residual stress is formed in the strain portion, and the strain portion is given a surface roughness rougher than a portion other than the strain portion. The residual stress layer results in an increase in resistance to fatigue failure, and a physical quantity measurement sensor including such a strain element can be used stably over a long period of time. Furthermore, since the shot material directly collides with the strain portion and thereby the strain portion is given a surface roughness rougher than a portion other than the strain portion, the strain gauge disposed on the strain portion becomes better at conforming to deformation because of the anchor effect provided by the adhesive, and the accuracy of strain detection improves.

An aspect of the present invention is arranged such that the strain element includes (i) a frame portion, (ii) a central portion which is located in a space defined by the frame portion so as to be spaced apart from the frame portion, and (iii) an arm portion which connects the frame portion with the central portion and which corresponds to the strain portion, and includes the step of corner easing comprising easing (i) a corner of an edge of a junction where the frame portion and the arm portion connect to each other or (ii) a corner of an edge of a junction where the central portion and the arm portion connect to each other.

According to an aspect of the present invention, in the strain element configured such that the frame portion and the central portion are connected by the arm portion, the corner at which the frame portion and the arm portion connect to each other or the corner at which the central portion and the arm portion connect to each other is eased. This reduces stress concentration that is likely to occur in such corners, and thereby further increases the resistance to fatigue failure.

A physical quantity measurement sensor in accordance with an aspect of the present invention includes the strain element described above, and measures a physical quantity corresponding to deformation of the strain element in response to a load.

According to an aspect of the present invention, a physical quantity measurement sensor including the foregoing strain element measures a physical quantity corresponding to deformation of the strain element in response to a load. This makes it possible to provide a physical quantity measurement sensor that maintains stable, highly accurate measurement over a long period of time.

According to an aspect of the present invention, a residual stress layer having compressive residual stress has been formed in a strain portion. Therefore, the resistance to fatigue failure in the portion that elastically deforms, in which the strain gauge carries out detection, can be improved. This makes it possible to achieve a long-term stable use of a physical quantity measurement sensor in which the strain element in accordance with an aspect of the present invention is employed.

According to an aspect of the present invention, the area for attachment of the stain gauge has a large surface roughness. Therefore, the strain gauge becomes better at conforming to the elastic deformation of the strain element because of the anchor effect provided by the adhesive. This makes it possible to achieve stable measurement accuracy of a physical quantity measurement sensor in which the strain element in accordance with an aspect of the present invention is employed.

According to an aspect of the present invention, in the strain element arranged such that the frame portion and the central portion are connected by the arm portion and that the frame portion has the first through-opening facing the arm portion, the third strain gauge and the fourth strain gauge disposed on the arm portion are disposed such that they are at an angle to the center line so as to diverge away from each other with decreasing distance to the central portion. This makes it possible to improve the accuracy of detection of strain associated with elastic deformation that occurs when an external force is exerted on the arm portion in the foregoing specific directions (the foregoing Mz, Fx, and Fy directions).

According to an aspect of the present invention, in the strain element arranged such that the frame portion and the central portion are connected by the arm portion, the locating through-hole and the second through-opening have been formed corresponding to the area of the central portion where the central portion connects to the arm portion. This achieves a structure in which the portion of the arm portion where the arm portion connects to the central portion is likely to elastically deform in response to a load. This makes it possible to increase measurement accuracy of a physical quantity measurement sensor in which the strain element in accordance with an aspect of the present invention is employed.

According to an aspect of the present invention, a shot material is projected under the condition in which the strain element is masked except for the strain portion. Therefore, a residual stress layer can be formed in the strain portion which is left unmasked. Furthermore, it is also possible to increase the surface roughness of the strain portion. This makes it possible to efficiently produce a strain element which is highly resistant to fatigue failure and in which a strain gauge of a bonded type is better at conforming to deformation because of the anchor effect provided by the adhesive.

According to an aspect of the present invention, in the strain element configured such that the frame portion and the central portion are connected by the arm portion, a corner at which the frame portion and the arm portion connect to each other or a corner at which the central portion and the arm portion connect to each other has been eased. This reduces stress concentration that is likely to occur in such corners, and thereby further increases the resistance to fatigue failure.

According to an aspect of the present invention, a physical quantity measurement sensor including the foregoing strain element measures a physical quantity corresponding to deformation of the strain element in response to a load. This makes it possible to ensure the condition in which stable, highly accurate measurement is available over a long period of time.

INDUSTRIAL APPLICABILITY

The prevent invention is suitable for use in applications in which a physical quantity measurement sensor including an elastically deformable strain element increases the resistance to fatigue failure and ensures long-term stable use.

REFERENCE SIGNS LIST

1, 101 force sensor
2, 102 table block
6 base block
10, 10', 10", 55, 60, 70, 80, 90, 110 strain element
11, 11', 11", 71, 111 frame portion
12, 12', 12", 72, 112 central portion
14a to 14c, 114a, 114b locating through-hole 20 to 22, 20' to 22', 20" to 22", 73 to 76, 120 to 122 arm portion
25 to 27, 25" to 27", 125 to 127 through-opening
29 strain gauge circuit
30 signal processing module
31 amplifier
A-D converter
33 processor
34 memory
35 D-A converter
50' to 52', 50" to 52" near-center through-opening
A1 to C4', A11 to C14' strain gauge

The invention claimed is:

1. A strain element which is elastically deformable in response to a load and which is configured to have a strain gauge disposed thereon, the strain gauge being configured to carry out detection of strain associated with deformation,
the strain element comprising a strain portion which corresponds to a region subject to strain and includes an area for disposition of the strain gauge,
the strain portion including an arm portion, and
the strain portion being provided with a residual stress layer having negative residual stress and extending on all four sides of the arm portion.

2. The strain element according to claim 1, wherein the strain portion has a surface roughness rougher than a portion other than the strain portion.

3. The strain element according to claim 1, comprising:
a frame portion; and
a central portion which is located in a space defined by the frame portion such that the central portion is spaced apart from the frame portion, wherein
the arm portion connects the frame portion with the central portion,
the frame portion has a first through-opening in a junction where the frame portion connects to the arm portion,
the arm portion has, disposed on one face thereof, a first strain gauge, a second strain gauge, a third strain gauge, and a fourth strain gauge,
the first strain gauge and the second strain gauge are disposed in an area close to the central portion such that (i) the first strain gauge and the second strain gauge are symmetrical to each other with respect to a center line of the one face, the center line extending in a direction of extension of the arm portion, and (ii) detection directions of the first strain gauge and the second strain gauge are parallel to the center line, and
the third strain gauge and the fourth strain gauge are disposed in an area close to the frame portion such that (i) the third strain gauge and the fourth strain gauge are symmetrical to each other with respect to the center line and (ii) detection directions of the third strain gauge and the fourth strain gauge are at an angle to the center line so as to diverge away from each other with decreasing distance to the central portion.

4. The strain element according to claim 1, comprising:
a frame portion; and
a central portion which is located in a space defined by the frame portion such that the central portion is spaced apart from the frame portion, wherein
the arm portion connects the frame portion with the central portion, and
the central portion has (i) a locating through-hole in an area corresponding to an extension of the arm portion and (ii) a through-opening located between the locating through-hole and a junction where the central portion connects to the arm portion.

5. A method of producing a strain element which is elastically deformable in response to a load and which is configured to have a strain gauge disposed thereon, the strain gauge being configured to carry out detection of strain associated with deformation, the method comprising the steps of:
masking the strain element except for a strain portion which corresponds to a region subject to strain and which includes an area for disposition of the strain gauge, the strain portion including an arm portion and the strain element being masked such that all four sided of the arm portion are not masked and exposed; and
projecting a shot material at the strain element which has been masked, the projecting of the shot material at the strain element including causing the shot material to collide with the strain portion and thereby producing the strain element in which the strain portion is provided with a residual stress layer having negative residual stress which extends on the all four sides of the arm portion and has a surface roughness rougher than a portion other than the strain portion.

6. The method according to claim 5, wherein
the strain element includes (i) a frame portion and (ii) a central portion which is located in a space defined by the frame portion such that the central portion is spaced apart from the frame portion,
the arm portion connects the frame portion with the central portion, and
the method further comprising the step of:
corner easing, the corner easing including easing at least one of (i) a corner of an edge of a junction where the frame portion and the arm portion connect to each other or (ii) a corner of an edge of a junction where the central portion and the arm portion connect to each other.

7. A physical quantity measurement sensor comprising the strain element according to claim 1, the physical quantity measurement sensor being configured to measure a physical quantity corresponding to deformation of the strain element in response to a load.

8. A physical quantity measurement sensor comprising the strain element produced by the method according to claim 5, the physical quantity measurement sensor being configured to measure a physical quantity corresponding to deformation of the strain element in response to a load.

9. The strain element according to claim 1, wherein the residual stress layer is not provided to a portion other than the all four sides of the arm portion.

* * * * *